(12) United States Patent
Takano

(10) Patent No.: US 11,102,675 B2
(45) Date of Patent: Aug. 24, 2021

(54) WIRELESS COMMUNICATION APPARATUS, COMMUNICATION METHOD, COMPUTER PROGRAM, AND WIRELESS COMMUNICATION SYSTEM

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/073,667

(22) PCT Filed: Jan. 17, 2017

(86) PCT No.: PCT/JP2017/001396
§ 371 (c)(1),
(2) Date: Jul. 27, 2018

(87) PCT Pub. No.: WO2017/135026
PCT Pub. Date: Aug. 10, 2017

(65) Prior Publication Data
US 2019/0045394 A1    Feb. 7, 2019

(30) Foreign Application Priority Data

Feb. 3, 2016  (JP) .............................. JP2016-019199

(51) Int. Cl.
*H04W 28/06* (2009.01)
*H04L 5/00* (2006.01)
*H04W 72/04* (2009.01)

(52) U.S. Cl.
CPC .......... *H04W 28/06* (2013.01); *H04L 5/0053* (2013.01); *H04W 72/04* (2013.01); *H04W 72/042* (2013.01); *H04W 72/0446* (2013.01)

(58) Field of Classification Search
CPC ............... H04W 28/06; H04W 72/042; H04W 72/0446; H04W 72/04; H04L 5/0053
(Continued)

(56) References Cited

U.S. PATENT DOCUMENTS

2014/0071954 A1\*  3/2014 Au ..................... H04W 72/0446
                                                          370/336
2015/0085775 A1\*  3/2015 Choi ................... H04W 74/002
                                                          370/329
(Continued)

FOREIGN PATENT DOCUMENTS

JP      2009-212597 A    9/2009
JP      2013528004 A     7/2013
WO   WO2017/136592   \*   2/2017

OTHER PUBLICATIONS

U.S. Appl. No. 62/290,281; Resource Allocation in a Low Latency Wireless System; Date Feb. 2, 2016.\*

(Continued)

*Primary Examiner* — Faisal Choudhury
(74) *Attorney, Agent, or Firm* — Xsensus LLP

(57) ABSTRACT

[Object] To provide a wireless communication apparatus capable of causing transmission and reception of data at an existing transmission time interval and transmission and reception of data at a short transmission time interval shorter than an existing transmission time interval to coexist effectively.

[Solution] Provided is a wireless communication apparatus including: a notification unit configured to notify of a short transmission time field in which data is transmitted at a short transmission time interval which is a transmission time interval shorter than one subframe period in a subframe, and notify of information regarding the short transmission time interval for another communication apparatus in a control field transmitted in units of subframes.

19 Claims, 35 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2016/0352481 | A1* | 12/2016 | Jiang | H04L 5/0048 |
| 2017/0318564 | A1* | 11/2017 | Lee | H04L 5/0092 |
| 2018/0110062 | A1* | 4/2018 | Byun | H04W 72/14 |
| 2018/0167967 | A1* | 6/2018 | Li | H04W 72/1268 |
| 2018/0205534 | A1* | 7/2018 | Yi | H04J 3/02 |
| 2018/0249374 | A1* | 8/2018 | Park | H04W 72/1263 |
| 2018/0294942 | A1* | 10/2018 | Byun | H04L 5/14 |
| 2018/0310282 | A1* | 10/2018 | Shi | H04W 72/042 |
| 2018/0359745 | A1* | 12/2018 | Yeo | H04W 72/14 |
| 2019/0036758 | A1* | 1/2019 | Takeda | H04L 5/14 |

OTHER PUBLICATIONS

Nokia Networks, "On Shorter TTI for Latency Reduction", 3GPP TSG-RAN WG1 Meeting #83, R1-157292, 4 Pages total, (Nov. 15-22, 2015).
Samsung, "Study on Specification Impact for Downlink due to TTI Shortening", 3GPP TSG-RAN WG1 Meeting #83, R1-156819, 5 Pages total, (Nov. 15-22, 2015).
Ericsson, "Study of Shorter TTI for Latency Reduction"; 3GPP TSG-RAN WG2 #91 bis, Tdoc R2-154740, 8 Pages total, (Oct. 5-9, 2015).
ETRI, "Discussion on TTI Shortening", 3GPP TSG-RAN WG1 Meeting #83, R1-157110, 7 Pages total, (Nov. 16-20, 2015).
Huawei, et al., "Control Signalling Enhancements for Short TTI", 3GPP TSG-RAN WG1 Meeting #83, R1-156461, 6 Pages total, (Nov. 15-22, 2015).
International Search Report dated Apr. 18, 2017, in PCT/JP2017/001396, filed Jan. 17, 2017.
Nokia Networks, "On Shorter TTI for Latency Reduction", 3GPP TSG-RAN WG1 Meeting #83, R1-157292, Nov. 15-22, 2015, pp. 1-4.
Samsung, "Study on specification impact for downlink due to TTI shortening", 3GPP TSG-RAN WG1 Meeting #83, R1-156819, Nov. 15-22, 2015, pp. 1-5.
Ericsson, "Study of shorter TTI for latency reduction", 3GPP TSG-RAN WG2 #91 bis, Tdoc R2-154740, Oct. 5-9, 2015, pp. 1-8.
ETRI, "Discussion on TTI shortening", 3GPP TSG RAN WG1 Meeting #83, R1-157110, Nov. 16-20, 2015, pp. 1-7.
Huawei, et al., "Control signaling enhancements for short TTI", 3GPP TSG RAN WG1 Meeting #83, R1-156461, Nov. 15-22, 2015, pp. 1-6.
Office Action dated Jan. 5, 2021 in Japanese Patent Application No. 2017-565459, 3 pages.
Intel Corporation, "Discussion on TTI Shortening", 3GPP TSG RAN WG1 Meeting #83, R1-156540, Anaheim, USA, Nov. 15-22, 2015, 5 pages.

* cited by examiner

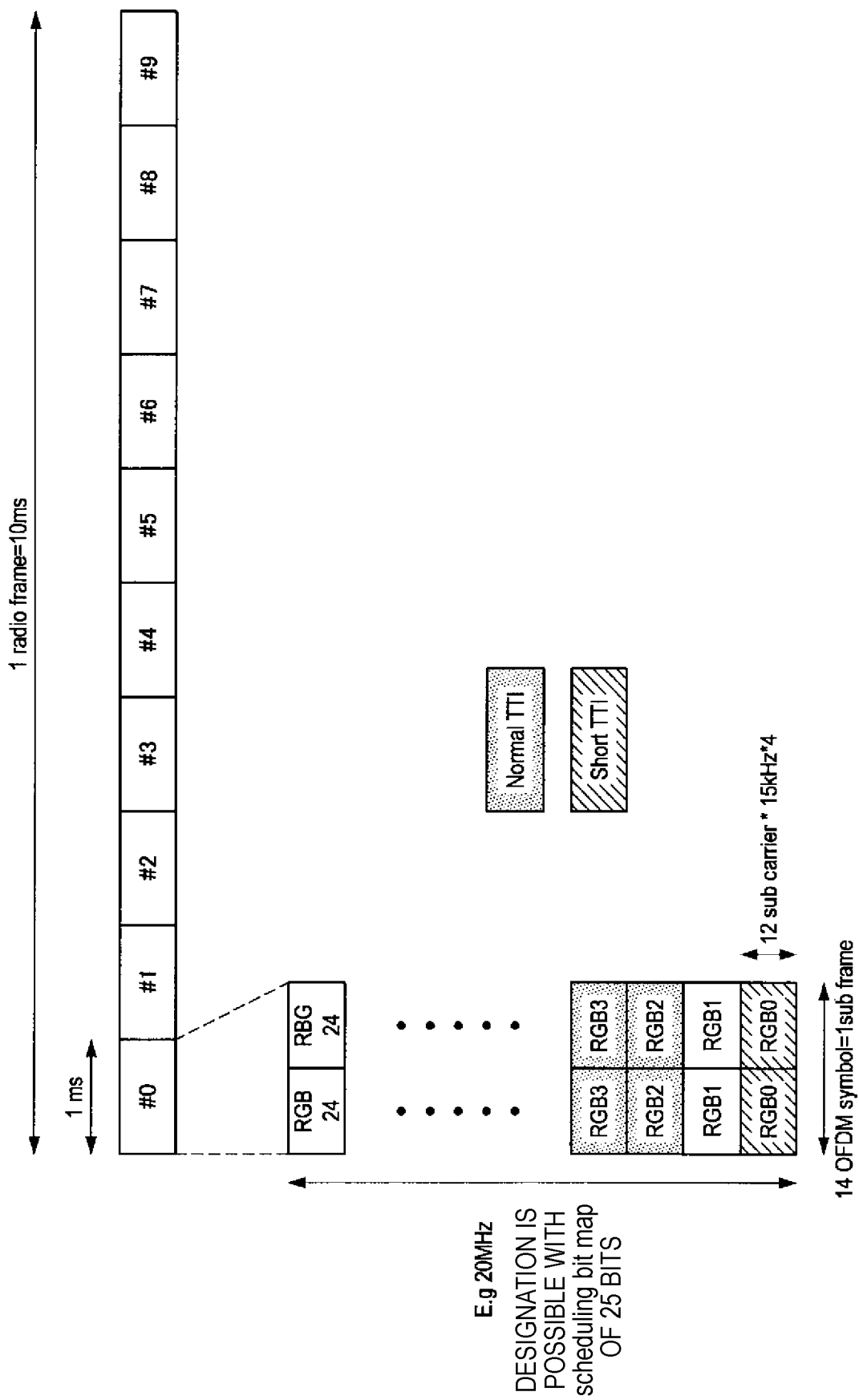

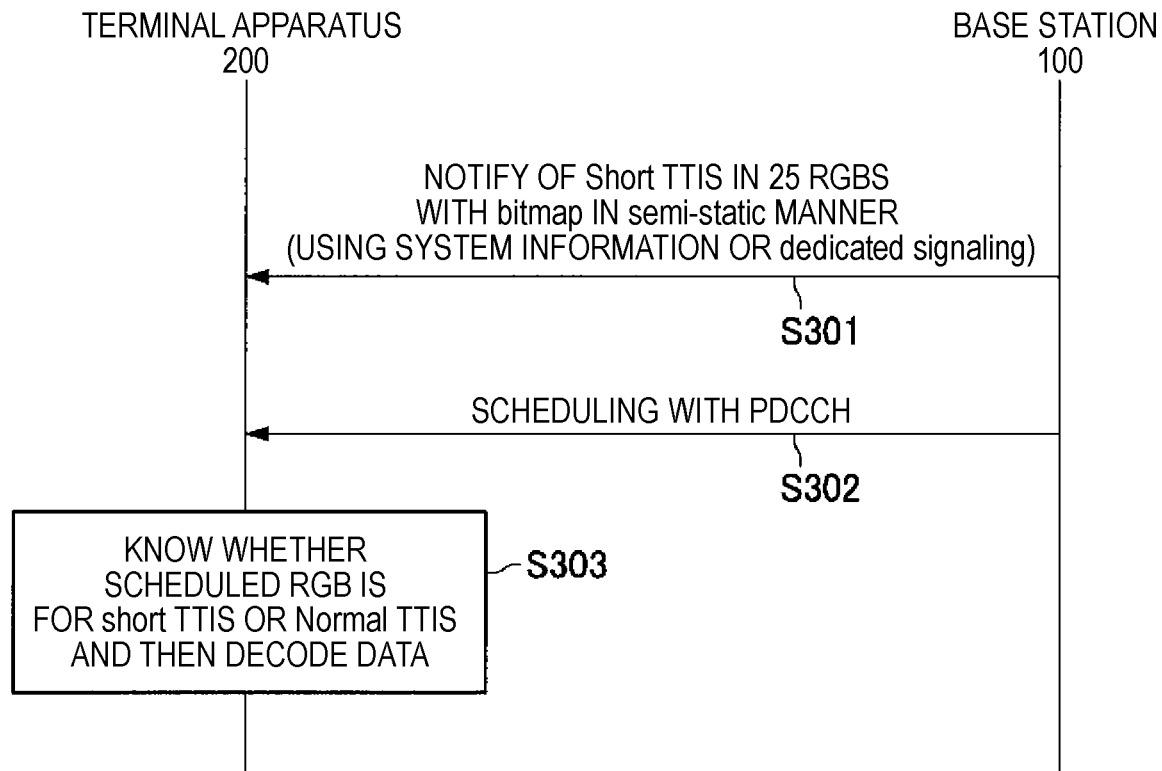
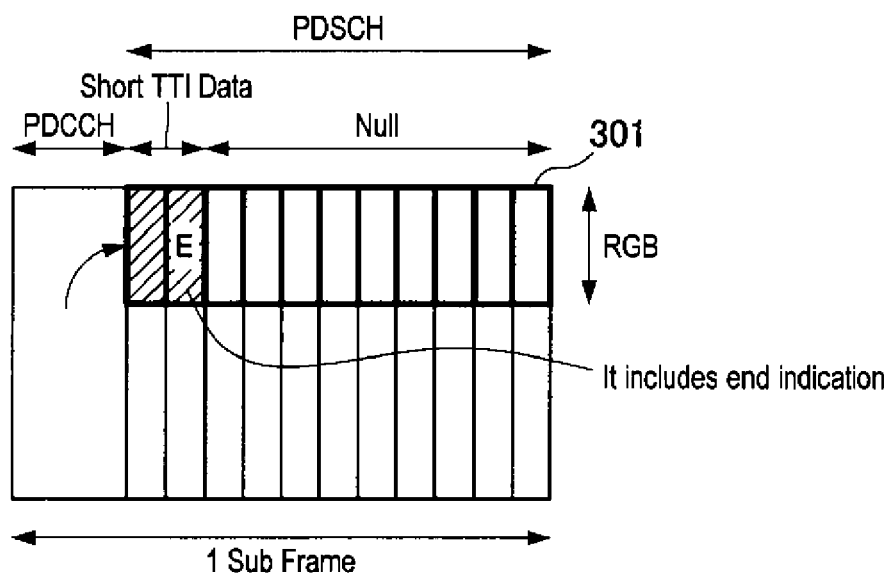

WIRELESS COMMUNICATION APPARATUS, COMMUNICATION METHOD, COMPUTER PROGRAM, AND WIRELESS COMMUNICATION SYSTEM

TECHNICAL FIELD

The present disclosure relates to a wireless communication apparatus, a communication method, a computer program, and a wireless communication system.

BACKGROUND ART

In Long Term Evolution (LTE), a transmission time interval (TTI) is set to 1 ms to realize a high data rate. By shortening the TTI, a round trip time (RTT) necessary for retransmission control is shortened and a system latency is reduced (for example, see Patent Literature 1).

In a case in which the TTI is 1 ms, a time necessary for a terminal apparatus to decode data is 4 ms. When the TTI is further shortened, a decoding time in the terminal apparatus is also shortened. When the decoding time in the terminal apparatus is shortened, a remarkable advantageous effect can be expected in a case in which real time is strongly requested.

CITATION LIST

Patent Literature

Patent Literature 1: JP 2009-212597A

DISCLOSURE OF INVENTION

Technical Problem

At the time of all substitution with transmission and reception of data at the short transmission time interval (short TTI) shorter than the existing transmission time interval, there is an influence on a terminal apparatus which can only transmit and receive data at the existing transmission time interval. In addition, an existing method performs scheduling for individual resource elements using a PDCCH. Introduction of the short TTI increases the number of resources to be allocated to a terminal apparatus, which makes the field of the existing PDCCH short. On the other hand, in a case in which transmission and reception of data at the short transmission time interval are caused to coexist, an effective reception process can be expected in a terminal apparatus by notifying of a location where data is in resources at a short transmission time interval by a base station.

Accordingly, the present disclosure proposes a novel and improved wireless communication apparatus, a novel and improved communication method, a novel and improved computer program, and a novel and improved wireless communication system capable of causing transmission and reception of data at an existing transmission time interval and transmission and reception of data at a short transmission time interval shorter than an existing transmission time interval to coexist effectively.

Solution to Problem

According to the present disclosure, there is provided a wireless communication apparatus including: a notification unit configured to notify of a short transmission time field in which data is transmitted at a short transmission time interval which is a transmission time interval shorter than one subframe period in a subframe, and notify of information regarding the short transmission time interval for another communication apparatus in a control field transmitted in units of subframes.

In addition, according to the present disclosure, there is provided a wireless communication apparatus including: a reception unit configured to receive a short transmission time field in which data is transmitted at a short transmission time interval which is a transmission time interval shorter than one subframe period in a subframe, and receive information regarding the short transmission time interval from another communication apparatus in a control field transmitted in units of subframes.

In addition, according to the present disclosure, there is provided a wireless communication method including: notifying of a short transmission time field in which data is transmitted at a short transmission time interval which is a transmission time interval shorter than one subframe period in a subframe; and notifying of information regarding the short transmission time interval for another communication apparatus in a control field transmitted in units of subframes.

In addition, according to the present disclosure, there is provided a wireless communication method including: receiving a short transmission time field in which data is transmitted at a short transmission time interval which is a transmission time interval shorter than one subframe period in a subframe; and receiving information regarding the short transmission time interval from another communication apparatus in a control field transmitted in units of subframes.

In addition, according to the present disclosure, there is provided a computer program causing a computer to execute: notifying of a short transmission time field in which data is transmitted at a short transmission time interval which is a transmission time interval shorter than one subframe period in a subframe; and notifying of information regarding the short transmission time interval for another communication apparatus in a control field transmitted in units of subframes.

In addition, according to the present disclosure, there is provided a computer program causing a computer to execute: receiving a short transmission time field in which data is transmitted at a short transmission time interval which is a transmission time interval shorter than one subframe period in a subframe; and receiving information regarding the short transmission time interval from another communication apparatus in a control field transmitted in units of subframes.

In addition, according to the present disclosure, there is provided a wireless communication system including: a first communication apparatus; and a second communication apparatus. The first communication apparatus includes a notification unit configured to notify of a short transmission time field in which data is transmitted at a short transmission time interval which is a transmission time interval shorter than one subframe period in a subframe, and notify of information regarding the short transmission time interval for the second communication apparatus in a control field transmitted in units of subframes, and the second communication apparatus includes a reception unit configured to receive a short transmission time field in which data is transmitted at the short transmission time interval, and receive information regarding the short transmission time interval from the first communication apparatus in a control field transmitted in units of subframes.

Advantageous Effects of Invention

According to the present disclosure, as described above, it is possible to provide a novel and improved wireless communication apparatus and a novel and improved communication method capable of causing transmission and reception of data at an existing transmission time interval and transmission and reception of data at a short transmission time interval shorter than an existing transmission time interval to coexist effectively.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 38 is an explanatory diagram illustrating a form in which normal TTIs and short TTIs are scheduled in one terminal apparatus 200.

FIG. 39 is a flowchart illustrating an operation example of the base station 100 and the terminal apparatus 200 according to the embodiment.

FIG. 40 is an explanatory diagram illustrating data of short TTIs put only in the first 2 OFDM symbols among 11 OFDM symbols.

MODE(S) FOR CARRYING OUT THE INVENTION

Figure 1:
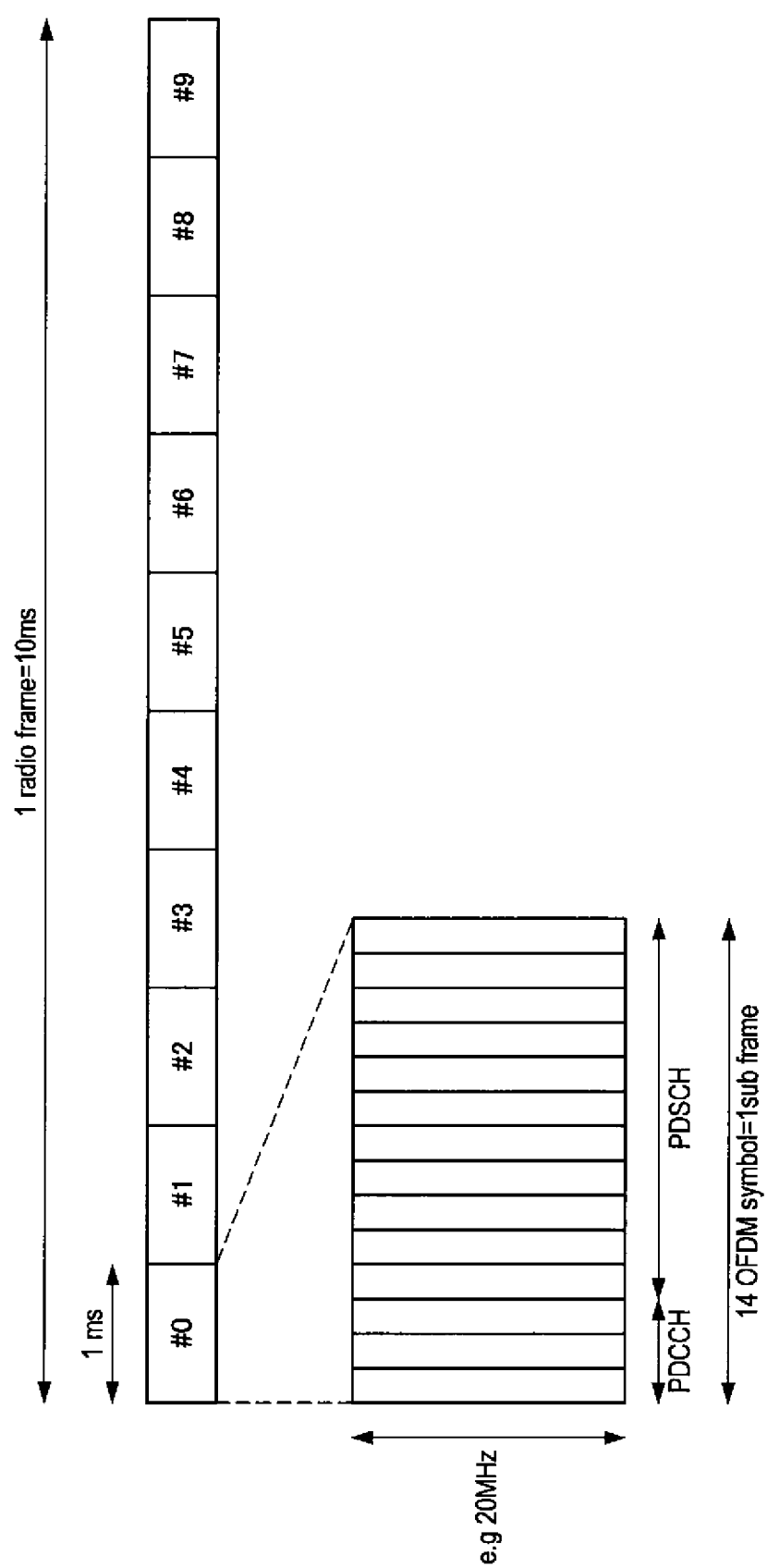
FIG. 1 is an explanatory diagram illustrating a frame format of LTE.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Embodiment of present disclosure
1.1. Overview
1.2. System configuration example
1.3. Functional configuration example
1.4. Operation examples
1.4.1. First operation example
1.4.2. Second operation example
1.4.3. Third operation example
1.4.4. Conclusion of operation examples
2. Application examples
2.1. Application examples for base station
2.2. Application examples for terminal apparatus
4. Conclusion

1. EMBODIMENT OF PRESENT DISCLOSURE

1.1. Overview

An overview of an embodiment of the present disclosure will first be described in the detailed description of the embodiment of the present disclosure. After the overview of the embodiment of the present disclosure is described, the embodiment of the present disclosure will be described in detail.

FIG. 1 is an explanatory diagram illustrating a frame format of LTE. As illustrated in FIG. 1, 1 radio frame of LTE includes 10 subframes. The length of 1 subframe is 1 ms. In addition, 1 subframe includes 14 orthogonal frequency-division multiplexing (OFDM) symbols. A bandwidth is, for example, 20 MHz.

In LTE, data transmitted from a base station (eNodeB) has a configuration in which 1 transport block is formed with 1 subframe. In addition, a cyclic redundancy check (CRC) is suffixed to the end of a transport block. That is, a terminal apparatus (user equipment: UE) receiving data transmitted from the base station can decode data by receiving data of 1 subframe. In other words, the UE can determine whether reception of a transport block succeeds by performing CRC. Accordingly, the UE performs ACK or NACK on the data in 1 subframe to make a request of retransmission referred to as a hybrid auto repeat request (ARQ). A UE responds to the eNodeB with ACK in a case in which reception of data succeeds. A UE responds to the eNodeB with NACK in a case in which reception of data succeeds.

Figure 2:
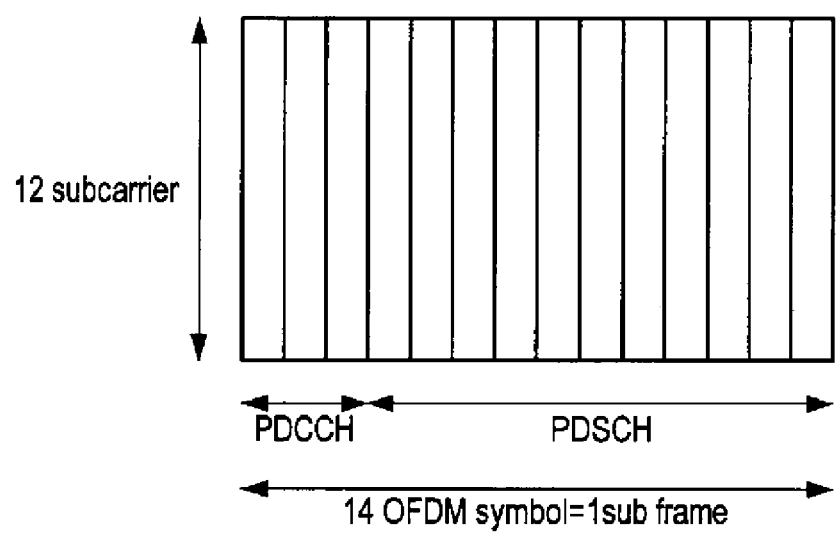
FIG. 2 is an explanatory diagram illustrating a format of a downlink of LTE.

FIG. 2 is an explanatory diagram illustrating a format of a downlink of LTE. In LTE, there are a plurality of resource blocks in 1 subframe. An eNodeB can allocate data to each UE in units of resource blocks. The eNodeB stores control information for allocating data to each UE in units of resource blocks in a control field disposed in the beginning of the subframe referred to as a physical downlink control channel (PDCCH). The PDCCH exists only in 1 subframe.

Figure 3:
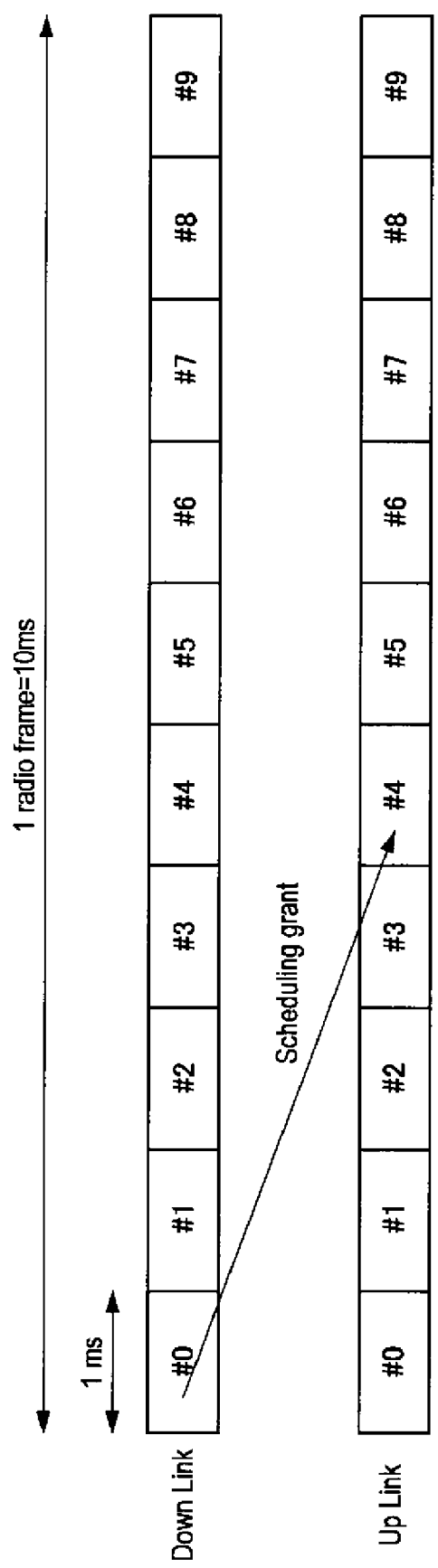
FIG. 3 is an explanatory diagram illustrating an overview of scheduling of an uplink of LTE.

In LTE, a TTI is set to 1 ms to realize a high data rate. That is, the TTI is the same as the time of 1 subframe. A process latency when a UE decodes a transport block in 1 subframe is about 4 subframes. Accordingly, the UE can respond to the eNodeB with ACK or NACK 4 subframes after the received subframe. FIG. 3 is an explanatory diagram illustrating an overview of scheduling of an uplink of LTE. The PDCCH of the subframe received by the UE includes scheduling information of an uplink, but the scheduling information can be scheduled 4 subframes after the received subframe. The reason why the scheduling information can be scheduled 4 subframes after the received subframe in this way is that a process latency in the UE is considered.

Accordingly, when the TTI is shortened, shortening a latency for decoding in the UE and a time for feedback to the eNodeB using an uplink can be expected. More specifically, when the TTI is shortened, the following advantages can be expected.

First, when the TTI is shortened, control for a low latency of an application operating on the UE can be performed. When the TTI is shortened, a decoding time in UE is also shortened. Therefore, the UE can shorten a time necessary for decision based on data transmitted from the eNodeB in a short transmission time interval (short TTI). Note that, in the following description, an existing TTI is also referred to as a normal TTI to distinguish the existing TTI from the short TTI. Accordingly, when the TTI is shortened, the UE can perform certain control at low latency. For example, in a case in which a certain application that is strict on latency is activated in the UE for a reason such as a strong request for real time, shortening a decoding time is a considerable advantage. Even in a case in which the UE is an object such as an automobile or a drone (a flying object that flies autonomously), shortening the TTI is a considerable advantage since real time is strongly requested.

Second, when the TTI is shortened, an RTT of a hybrid ARQ can be reduced. That is, when a decoding time is shortened, the UE can more quickly determine whether reception of data succeeds. When the UE can more quickly determine whether reception of data succeeds, the UE can quickly respond to the eNodeB with ACK or NACK. Accordingly, when the TTI is shortened, the eNodeB can shorten a time taken until retransmission of data which has not been received by the UE after transmission of the data to the UE, which leads to an improvement in throughput. In a hybrid ARQ of LTE, when the UE does not succeed in receiving data, subsequent data may not be transmitted. Therefore, quick transmission of ACK from the UE to the eNodeB also contributes to an improvement in throughput.

Third, latency of feedback of a channel quality indicator (CQI) can be reduced when the TTI is shortened. The UE measures quality of a downlink channel on the basis of a reference signal supplied from the eNodeB and reports a measurement result of the quality to the eNodeB. Then, the eNodeB determines a modulation scheme for downlink data to the UE in consideration of the quality of the downlink channel reported from the UE. When a latency of feedback from the UE is large, the eNodeB transmits data in conformity with a modulation scheme corresponding to quality different from the original quality of the downlink to the UE. Accordingly, when a latency of the measurement of the quality of the downlink channel and a latency of the report of the measurement result can be reduced, the eNodeB can reduce a time taken until an appropriate modulation scheme for the UE is selected. When a time taken until the appropriate modulation scheme is selected can be reduced, an improvement in throughput of the downlink can be prospected.

By transmitting data at a short transmission time interval shorter than an existing transmission time interval, it is possible to prospect the above-described same advantageous effects. However, at the time of all substitution with transmission and reception of data at the short transmission time interval shorter than the existing transmission time interval, there is an influence on a terminal apparatus which can only transmit and receive data at the existing transmission time interval. Therefore, it is necessary to cause transmission and reception of data at the existing transmission time interval and transmission and reception of data at the short transmission time interval to coexist.

Here, in a case in which transmission and reception of data at the short transmission time interval are caused to coexist with transmission and reception of data at the existing transmission time interval, a technology for causing a terminal apparatus supporting transmission and reception of data at the short transmission time interval to perform an effective reception process is necessary.

When a short TTI is introduced, a circuit necessary for decoding on a reception side may not be reused. When certain data is received and decoded and there is time to spare until subsequent data is received and decoded, one multiplier can be used for calculation. However, when there is no time to spare, one multiplier is not sufficient and a plurality of multipliers have to be prepared. Accordingly, to realize the short TTI, calculation cost of a receiver increases and a hardware scale increases in some cases. UEs connected to an eNodeB can be supplied from various makers. Depending on makers, there are cases in which hardware scales are desired to be suppressed to be small and there are cases in which techniques for reducing hardware scales are desired. It is not known whether all the UEs can support the length of the same short TTI. Note that, in the following description, the term "level" can be used as a term meaning a difference in the length of the short TTI. Accordingly, when short TTIs with various levels are prepared on an eNodeB side, terminals supporting the short TTIs can be widespread.

In addition, even when UEs support the short TTIs, it is known, in the first place, whether all the UEs similarly request low latency. Requested latency times depend on high-order applications mounted on UEs. Accordingly, supply of a short TTI formed by 1 OFDM symbol to a UE not requesting low latency to that extent leads to unnecessary occupation of resources.

Accordingly, in view of the above-mentioned circumstances, the disclosers of the present disclosure have thoroughly examined a technology in which an efficient reception process can be expected in a terminal apparatus supporting transmission and reception of data at a short transmission time interval in a case in which transmission and reception of data at a short transmission time interval are caused to coexist with transmission and reception of data at an existing transmission time interval. As a result, as will be described below, the disclosers of the present disclosure have devised a technology in which an effective reception process can be performed in a terminal apparatus by notifying the terminal apparatus of a location where data is in resources at a short transmission time interval in a case in which transmission and reception of data at the short transmission time interval are caused to coexist with transmission and reception of data at an existing transmission time interval.

The overview of the embodiment of the present disclosure has been described above. Next, the embodiment of the present disclosure will be described in detail.

1.2. System Configuration Example

Figure 4:
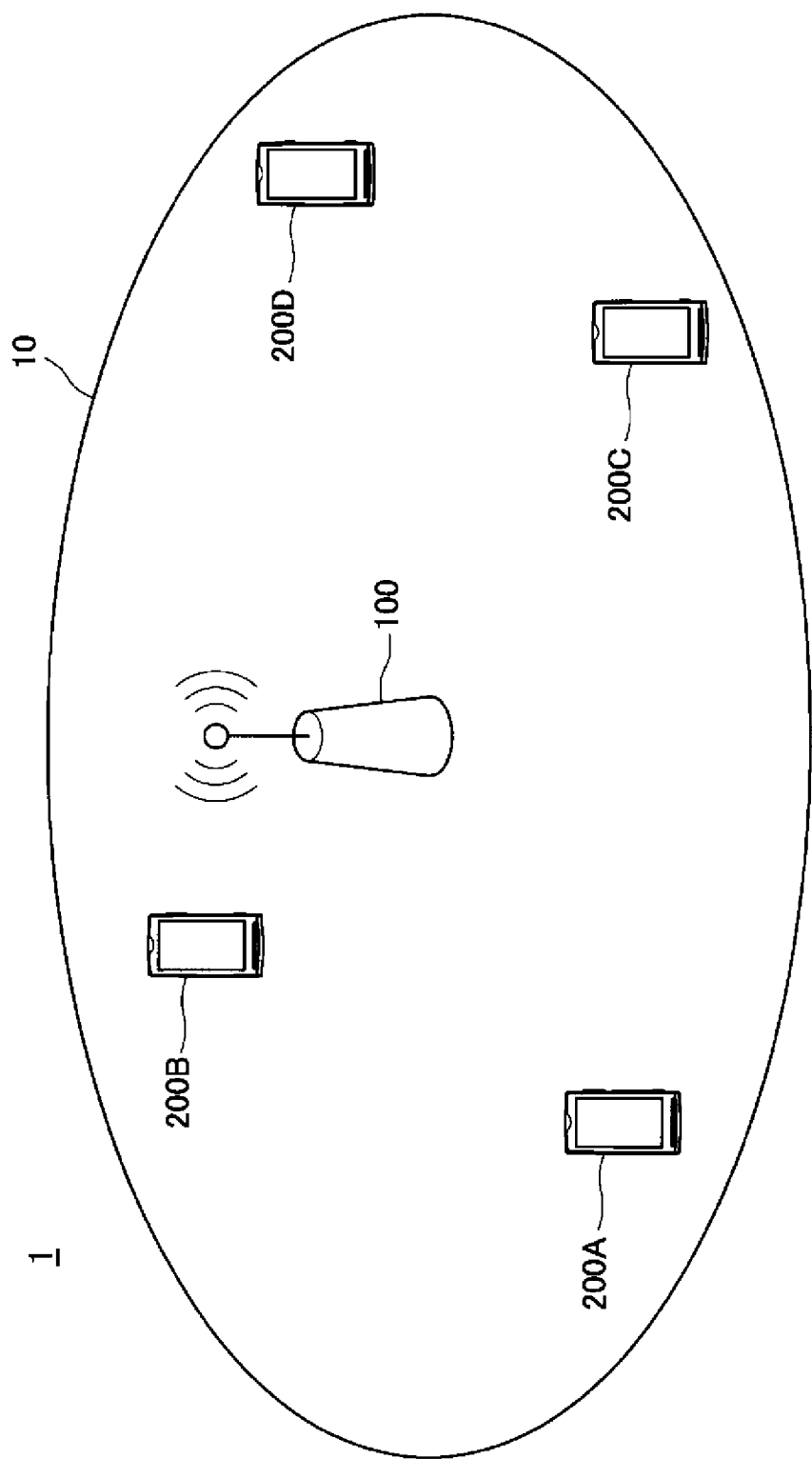
FIG. 4 is an explanatory diagram illustrating an example of a configuration of a system according to an embodiment of the present disclosure.

FIG. 4 is an explanatory diagram illustrating an example of a configuration of a system according to the embodiment of the present disclosure. Hereinafter, the example of the configuration of the system according to the embodiment of the present disclosure will be described with reference to FIG. 4.

Referring to FIG. 4, a system 1 includes a base station 100 and a terminal apparatus 200. Herein, the base station 100 is also referred to as an eNodeB. In addition, herein, the terminal apparatus 200 is also referred to as a user. The user can also be referred to as a user equipment (UE). Herein, the UE may be a UE as defined in LTE or LTE-A or may be more generally a communication equipment.

(1) Base Station 100

The base station 100 is a base station of a cellular system (or a mobile communication system). The base station 100 performs wireless communication with a terminal apparatus (for example, the terminal apparatus 200) located in a cell 10 of the base station 100. For example, the base station 100 transmits a downlink signal to the terminal apparatus and receives an uplink signal from the terminal apparatus.

(2) Terminal Apparatus 200

The terminal apparatus 200 can perform communication in a cellular system (or a mobile communication system). The terminal apparatus 200 performs wireless communication with a base station (for example, the base station 100) of the cellular system. For example, the terminal apparatus 200 receives a downlink signal from the base station and transmits an uplink signal to the base station. FIG. 4 illustrates four terminal apparatuses 200A to 200D. Note that, in the following description, when it is not necessary to distinguish the terminal apparatuses 200A to 200D from each other, the terminal apparatuses 200A to 200D are referred to as terminal apparatuses 200.

1.3. Functional Configuration Example

Figure 5:
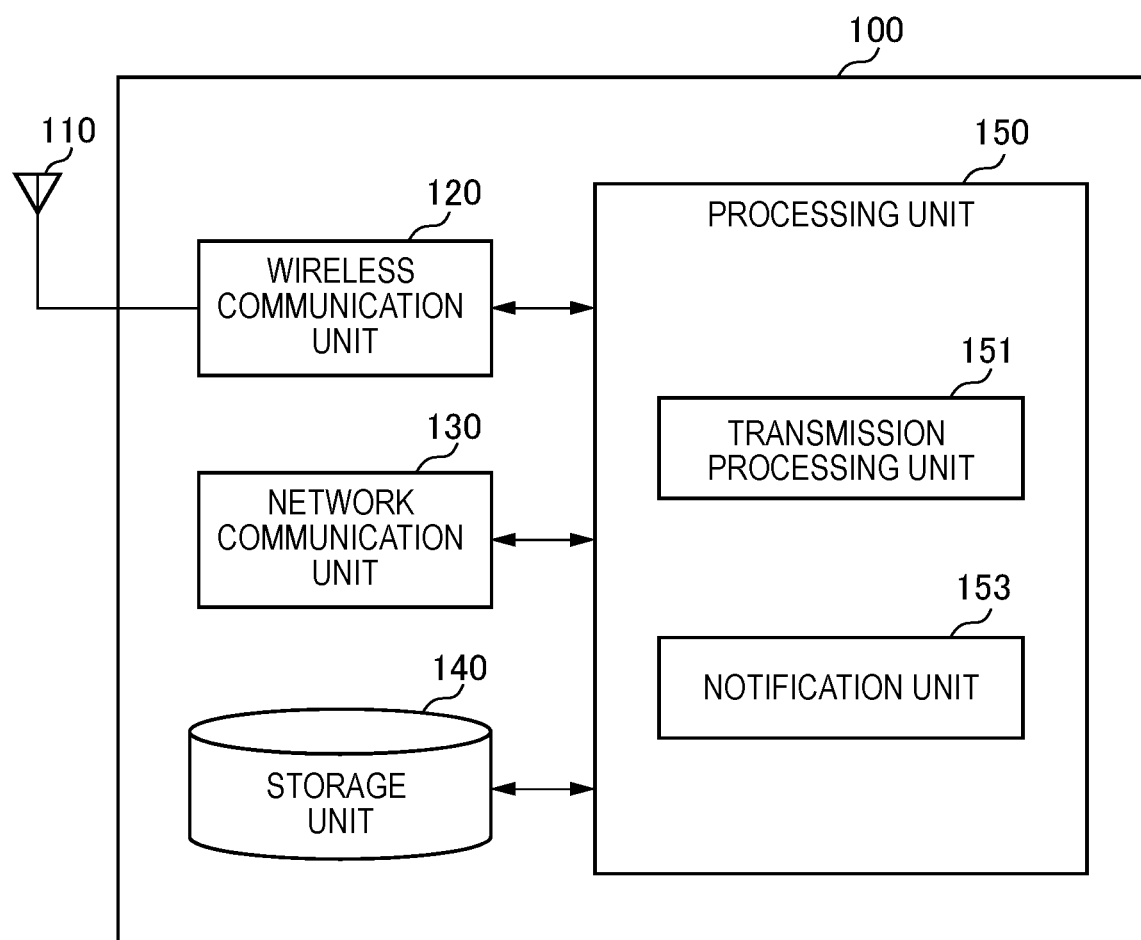
FIG. 5 is a block diagram illustrating an example of a configuration of a base station 100 according to the embodiment.
Figure 6:
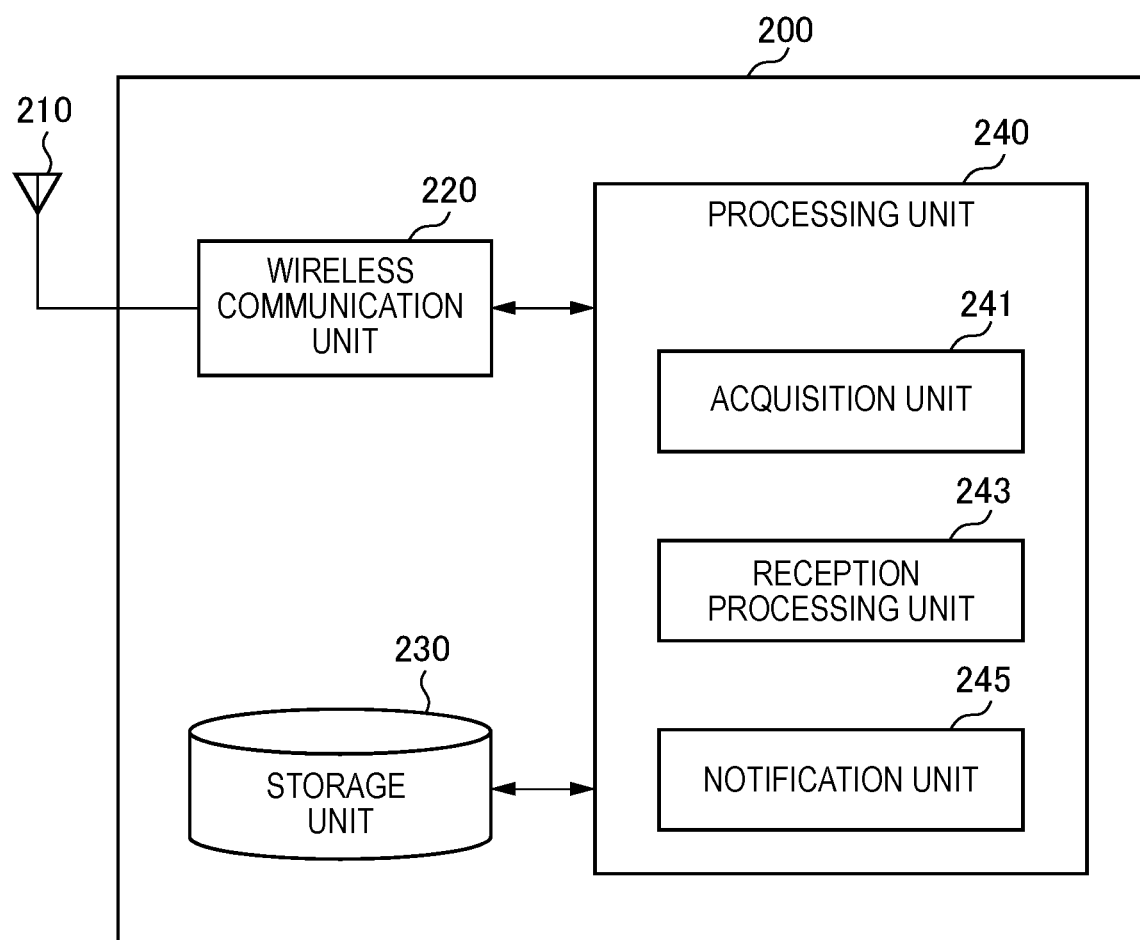
FIG. 6 is a block diagram illustrating an example of a configuration of a terminal apparatus 200 according to the embodiment.

Next, examples of functional configurations of the base station 100 and the terminal apparatus 200 according to the embodiment of the present disclosure will be described with reference to FIGS. 5 and 6.

First, an example of a configuration of the base station 100 according to the embodiment of the present disclosure will be described with reference to FIG. 5. FIG. 5 is a block diagram illustrating an example of a configuration of a base station 100 according to the embodiment of the present disclosure. Referring to FIG. 5, the base station 100 includes an antenna unit 110, a wireless communication unit 120, a network communication unit 130, a storage unit 140, and a processing unit 150.

(1) Antenna Unit 110

The antenna unit 110 radiates a signal output by the wireless communication unit 120 as radio waves to a space.

In addition, the antenna unit 110 converts the radio waves in the space into a signal and outputs the signal to the wireless communication unit 120.

(2) Wireless Communication Unit 120

The wireless communication unit 120 transmits and receives a signal. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to another node and receives information from the other node. For example, the other node includes another base station and a core network node.

(4) Storage Unit 140

The storage unit 140 temporarily or permanently stores various kinds of data and a program for operating the base station 100.

(5) Processing Unit 150

The processing unit 150 supplies various functions of the base station 100. The processing unit 150 includes a transmission processing unit 151 and a notification unit 153. Note that the processing unit 150 may further include other constituent elements other than these constituent elements. That is, the processing unit 150 can also perform operations other than the operations of the constituent elements.

The transmission processing unit 151 performs a process related to transmission of data destined for the terminal apparatus 200. For example, the transmission processing unit 151 generates a frame formed by a plurality of subframes and performs a process of transmitting the generated frame to the terminal apparatus 200. In addition, the notification unit 153 performs a process related to notification of information to the terminal apparatus 200. Note that specific operations of the transmission processing unit 151 and the notification unit 153 will be described in detail later.

Next, an example of a configuration of the terminal apparatus 200 according to the embodiment of the present disclosure will be described with reference to FIG. 6. FIG. 6 is a block diagram illustrating an example of a configuration of a terminal apparatus 200 according to the embodiment of the present disclosure. Referring to FIG. 6, the terminal apparatus 200 includes an antenna unit 210, a wireless communication unit 220, a storage unit 230, and a processing unit 240.

(1) Antenna Unit 210

The antenna unit 210 radiates a signal output by the wireless communication unit 220 as radio waves to a space. In addition, the antenna unit 210 converts the radio waves in the space into a signal and outputs the signal to the wireless communication unit 220.

(2) Wireless Communication Unit 220

The wireless communication unit 220 transmits and receives a signal. For example, the wireless communication unit 220 receives a downlink signal from the base station and transmits an uplink signal to the base station.

(3) Storage Unit 230

The storage unit 230 temporarily or permanently stores various kinds of data and a program for operating the terminal apparatus 200.

(4) Processing Unit 240

The processing unit 240 supplies various functions of the terminal apparatus 200. The processing unit 240 includes an acquisition unit 241, a reception processing unit 243, and a notification unit 245. Note that the processing unit 240 may further include other constituent elements other than these constituent elements. That is, the processing unit 240 can also perform operations other than the operations of the constituent elements.

The acquisition unit 241 performs a process related to acquisition of data transmitted from the base station 100. The reception processing unit 243 performs a process related to reception of the data acquired by the acquisition unit 241. The notification unit 245 performs a process related to notification of information to the base station 100. Note that operations of the acquisition unit 241, the reception processing unit 243, and the notification unit 245 will be described in detail later.

The examples of the functional configurations of the base station 100 and the terminal apparatus 200 according to the embodiment of the present disclosure have been described with reference to FIGS. 5 and 6. Next, examples of operations of the base station 100 and the terminal apparatus 200 according to the embodiment of the present disclosure will be described.

1.4. Operation Examples 1.4.1. First Operation Example

First, a first operation example of the base station 100 and the terminal apparatus 200 according to the embodiment of the present disclosure will be described. As described above, in the case in which transmission and reception of data at the short transmission time interval are caused to coexist with transmission and reception of data at the existing transmission time interval, a technology for causing a terminal apparatus corresponding to transmission and reception of data at the short transmission time interval to perform an effective process is necessary. In the first operation example, an example of an operation in which the terminal apparatus corresponding to transmission and reception of data at the short transmission time interval can perform an effective process will be described.

In a case in which transmission and reception of data in the short TTI are caused to coexist with transmission and reception of data in the existing TTI, it is necessary for the base station 100 to inform the terminal apparatus 200 of a location where a resource to be used to transmit or receive data is in the short TTI. With regard to a location of the resource to be used to transmit or receive data in the short TTI, a semi-static informing method and a dynamically informing method can be considered. In the method of notifying each terminal apparatus 200 of a resource in the semi-static manner, a downlink resource for one terminal apparatus 200 is fixedly allocated in the semi-static manner. Therefore, the downlink resource may be wasteful in a case in which transmission and reception of data in the short TTI are not used. On the other hand, in the method of notifying each terminal apparatus 200 of a resource dynamically, control information to be measured by the terminal apparatus 200 increases. A control field (PDCCH) may be short when the number of terminal apparatuses 200 located in the cell 10 increases.

Accordingly, when resources of the short TTI are allocated, the base station 100 takes three methods, (1) a method of notifying of a location where a field (short TTI field) for performing transmission and reception of data is in the short TTI, (2) a method of notifying whether there is information destined for a specific terminal apparatus in the short TTI field, and (3) a method of notifying of a resource of the short TTI for each terminal apparatus. Note that all the three methods may not be said to be essential in the base station 100. Hereinafter, the details of the three methods will be described.

(1) Method of Notifying of Location where Short TTI Field is

First, the method of notifying of a location where the short TTI field is will be described. The base station 100 notifies the terminal apparatus 200 of the short TTI field in one subframe in a semi-static manner, for example, using system information for which broadcast is used or a dedicated signal for each terminal apparatus 200. Here, "semi-static" means that a short TTI field is not changed before the base station 100 designates the short TTI field again, but the short TTI field is changeable. Note that a plurality of short TTI field may be in one subframe.

The base station 100 notifies the terminal apparatus 200 of the short TTI field in one subframe in the semi-static manner. At this time point, however, the base station 100 does not notify of a way in which each terminal apparatus 200 uses the short TTI field.

Figure 7:
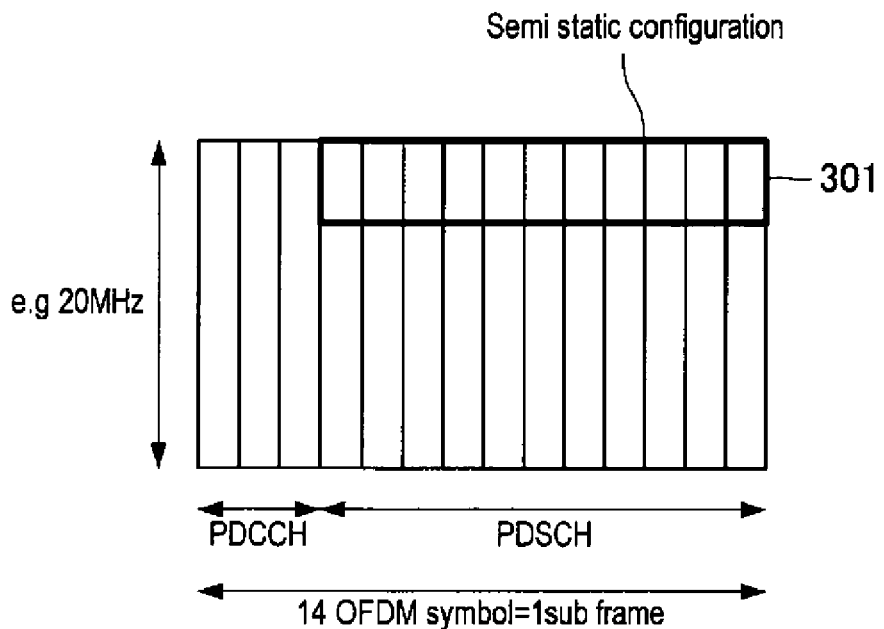
FIG. 7 is an explanatory diagram illustrating an example of a short TTI field.

FIG. 7 is an explanatory diagram illustrating an example of a short TTI field. Reference numeral 301 in FIG. 7 denotes a short TTI field designated in a physical downlink shared channel (PDSCH) in one subframe. FIG. 7 illustrates an example in which the TTI in a frequency domain of a part of a bandwidth of 20 MHz is set to have the same length as 1 OFDM symbol.

Figure 8:
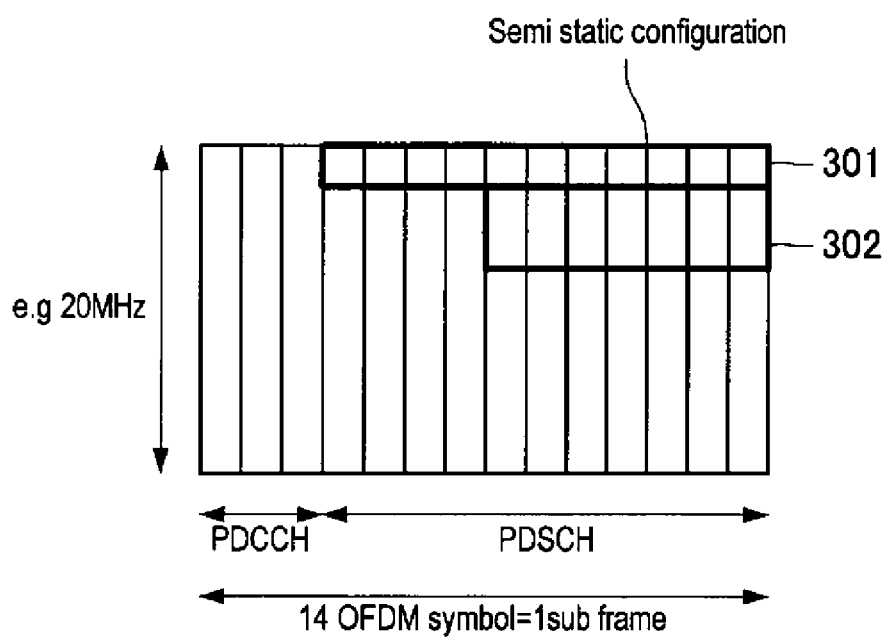
FIG. 8 is an explanatory diagram illustrating an example of a short TTI field.

As described above, the plurality of short TTI fields may be in one subframe. FIG. 8 is an explanatory diagram illustrating an example of the short TTI field. FIG. 8 illustrates an example in which two short TTI fields are in one subframe. Reference numerals 301 and 302 denote short TTI fields designated in the PDSCH in one subframe. The short TTI field denoted by reference numeral 301 spans the whole PDSCH and the short TTI field denoted by reference numeral 302 is in the PDSCH equivalent to the second half 7 OFDM symbols. In addition, FIG. 8 illustrates an example in which the resource of the short TTI field denoted by reference numeral 302 is greater than the resource of the short TTI field denoted by reference numeral 301.

In addition, the short TTI field may be in all the subframes or the short TTI field may be in a specific subframe of 1 frame. This is because there is an application in which the short TTI field which is necessary for all the subframes and there is also an application in which the short TTI field suffices to be in a specific subframe of 1 frame.

For example, the base station 100 transmits a control signal in a specific location in 1 frame to the terminal apparatus 200. However, a use case in which the terminal apparatus 200 is expected to decode the control signal in a short time is considered. This use case is a use case in which the base station 100 uses the short TTI field as a field for transmitting the control signal of the terminal apparatus 200. The control signal of the terminal apparatus 200 to be transmitted in the short TTI field by the base station 100 may be a signal for controlling an application or may be a control signal for receiving a wireless signal.

As described above, the short TTI field may be in all the subframes or the short TTI field may be in a specific subframe of 1 frame. In addition, the base station 100 may change the short TTI field for each subframe. The base station 100 can improve the degree of freedom of setting by changing the short TTI field for each subframe.

Figure 9:
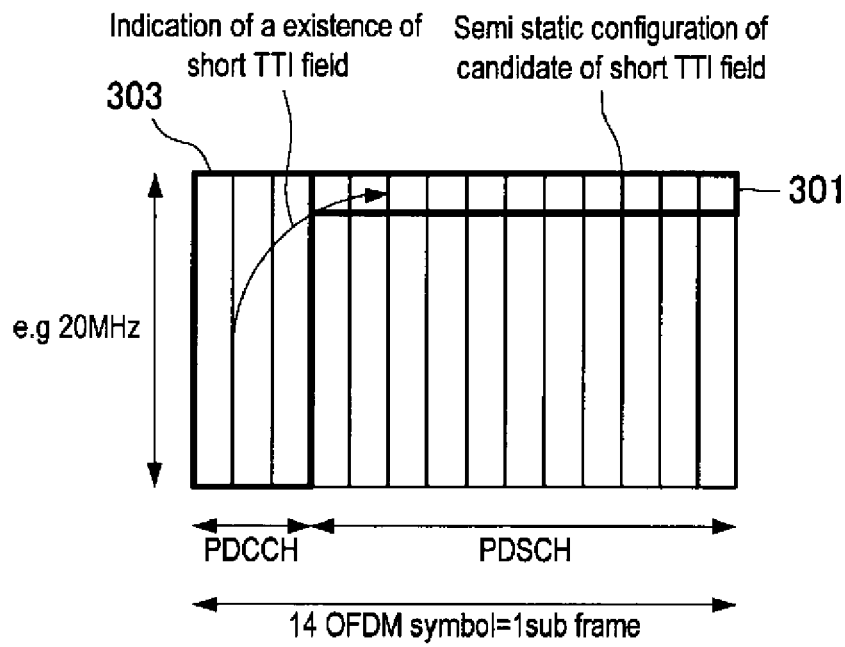
FIG. 9 is an explanatory diagram illustrating an example of a short TTI field.

FIG. 9 is an explanatory diagram illustrating an example of a short TTI field. FIG. 9 illustrates an example in which the base station 100 sets the short TTI field denoted by reference numeral 302 in advance and the base station 100 dynamically sets whether data of the short TTI is actually put in the short TTI field with downlink control information (DCI) in the PDCCH denoted by reference numeral 303.

The base station 100 can prevent resources from being wasteful due to normally fixed disposition of the short TTI field by setting whether data is in the short TTI field with the DCI in the PDCCH denoted by reference numeral 303. That is, even when the short TTI field is set, the base station 100 may normally not put data of the short TTI and transmit the data in the short TTI field. Therefore, it is possible to set whether data is in the short TTI field with the DCI in the PDCCH to prevent resources from being wasteful.

Figure 10:
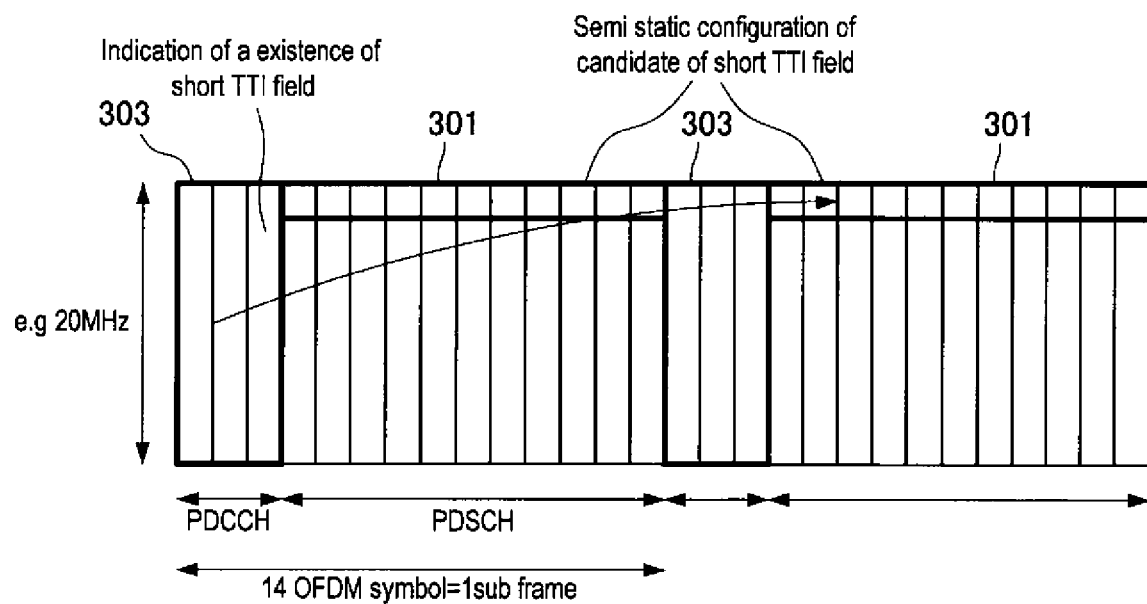
FIG. 10 is an explanatory diagram illustrating an example of a short TTI field.

FIG. 10 is an explanatory diagram illustrating an example of a short TTI field. FIG. 10 illustrates an example of a case in which, as in FIG. 9, the base station 100 sets the short TTI field denoted by reference numeral 302 in advance and the base station 100 dynamically sets whether data of the short TTI is actually put in the short TTI field with the DCI in the PDCCH denoted by reference numeral 303.

The example illustrated in FIG. 10 is different from the example illustrated in FIG. 9 in that presence or absence of data in the short TTI field of another subsequent subframe is set with DCI in the PDCCH denoted by reference numeral 303 rather than the same subframe. In the example illustrated in FIG. 9, since presence or absence of data in the short TTI field of the same subframe is set with DCI in the PDCCH, the terminal apparatus 200 has to decode the PDCCH and instantaneously determine the presence or absence of data in the short TTI field of the same subframe. In the example illustrated in FIG. 10, since presence or absence of data in the short TTI field of another subsequent subframe is set with DCI in the PDCCH, the terminal apparatus 200 knows whether the data of the short TTI is in the short TTI field at a time point at which the short TTI field of the other subsequent subframe arrives. Accordingly, in the example illustrated in FIG. 10, the terminal apparatus 200 can instantaneously start the decoding when there is the data of the short TTI at the time point at which the short TTI field of the other subsequent subframe arrives.

Figure 11:
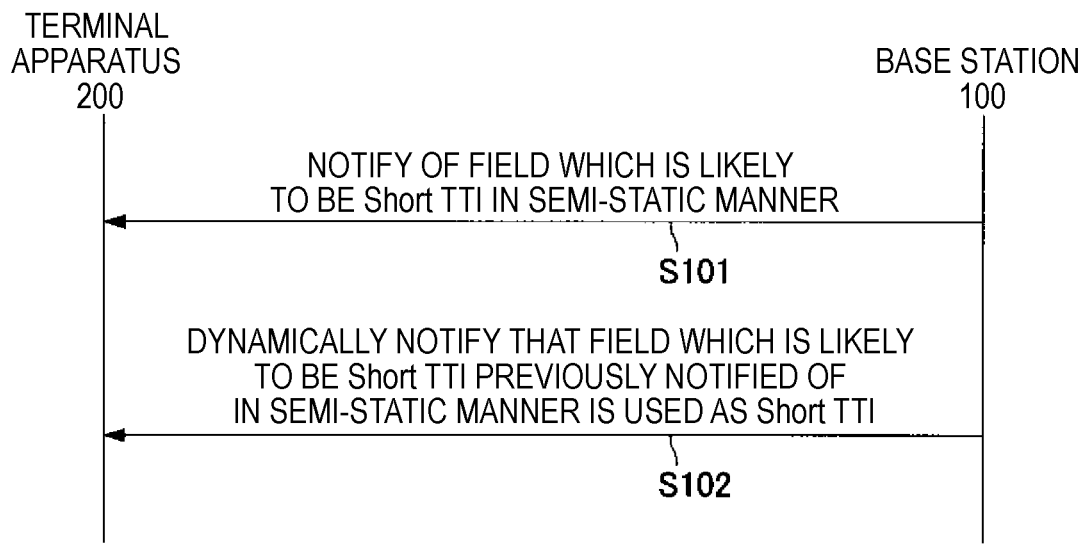
FIG. 11 is a flowchart illustrating an operation example of the base station 100 and the terminal apparatus 200 according to the embodiment.

FIG. 11 is a flowchart illustrating an operation example of the base station 100 and the terminal apparatus 200 according to the embodiment of the present disclosure. FIG. 11 illustrates an example of an operation of the base station 100 when the base station 100 notifies the terminal apparatus 200 of a field which is likely to be used as the short TTI and notifies the terminal apparatus 200 that the notified field is used as the short TTI. Hereinafter, an operation example of the base station 100 and the terminal apparatus 200 according to the embodiment of the present disclosure will be described with reference to FIG. 11.

The base station 100 notifies the terminal apparatus 200 of the short TTI field (which is a field which is likely to be the short TTI) in the subframe (step S101). For example, the notification unit 153 performs the process of step S101. The base station 100 notifies the terminal apparatus 200 of a field which is likely to be used as the short TTI in one subframe in the semi-static manner using system information for which broadcast is used or a dedicated signal for each terminal apparatus 200.

When the terminal apparatus 200 is notified of the field which is likely to be the short TTI, subsequently, the base station 100 dynamically notifies the terminal apparatus 200 that the field which is likely to be the short TTI is actually used as the short TTI for each subframe (step S102). For example, the notification unit 153 performs the process of step S102. For example, the base station 100 designates whether the field which is likely to be used as the short TTI is actually used as the short TTI in DCI in the PDCCH, as described above.

The base station 100 operates in this way. Thus, the base station 100 can efficiently use resources. In a case in which the field which is likely to be the short TTI is actually used as the short TTI, the terminal apparatus 200 may perform an operation for the short TTI. Therefore, a reception process can be efficient.

(2) Method of Notifying Whether There is Information Destined for Specific Terminal Apparatus in Short TTI Field Next, a method of notifying whether information designed for a specific terminal apparatus in the short TTI field is in the short TTI field will be described. For example, the base station 100 dynamically notifies each terminal apparatus 200 whether there is information addressed to the terminal apparatus 200 in the short TTI field notified of in the semi-static method. For example, the base station 100 notifies the terminal apparatus 200 whether there is information addressed to the terminal apparatus 200 in the short TTI field, in a semi-static manner using the dedicated signaling or dynamically using the PDCCH. When the base station 100 performs the notification in the semi-static manner using the dedicated signaling, the base station 100 can notify the terminal apparatus 200 whether there is the information addressed to the terminal apparatus 200 in the short TTI field without changing existing DCI. In addition, when the base station 100 performs the notification dynamically using the PDCCH, the base station 100 may put data of the short TTI in the short TTI field only in a case in which the data of the short TTI is transmitted. Therefore, resources can be efficiently used.

At this time, the base station 100 notifies the terminal apparatus 200 only whether there is the information addressed to the terminal apparatus 200 in the short TTI field. Whether there is data related in each terminal apparatus 200 in the short TTI field is preferably determined with small labor by the terminal apparatus 200. This is because power consumption can be reduced since it is not necessary for the terminal apparatus 200 for which there is no data in the short TTI field to decode the data of the short TTI.

Figure 12:
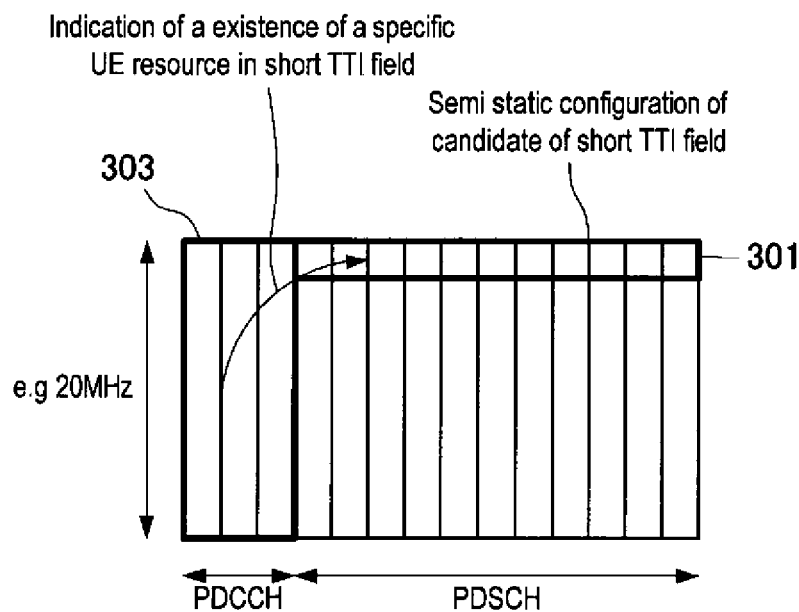
FIG. 12 is an explanatory diagram illustrating a method in which the base station 100 notifies of whether information for a specific terminal apparatus is in a short TTI field.

FIG. 12 is an explanatory diagram illustrating a method in which the base station 100 notifies of whether information destined for a specific terminal apparatus is in a short TTI field. FIG. 12 illustrates a form in which it is notified whether information destined for a specific terminal apparatus is in the short TTI field in the same subframe in the PDCCH of the subframe.

Figure 13:
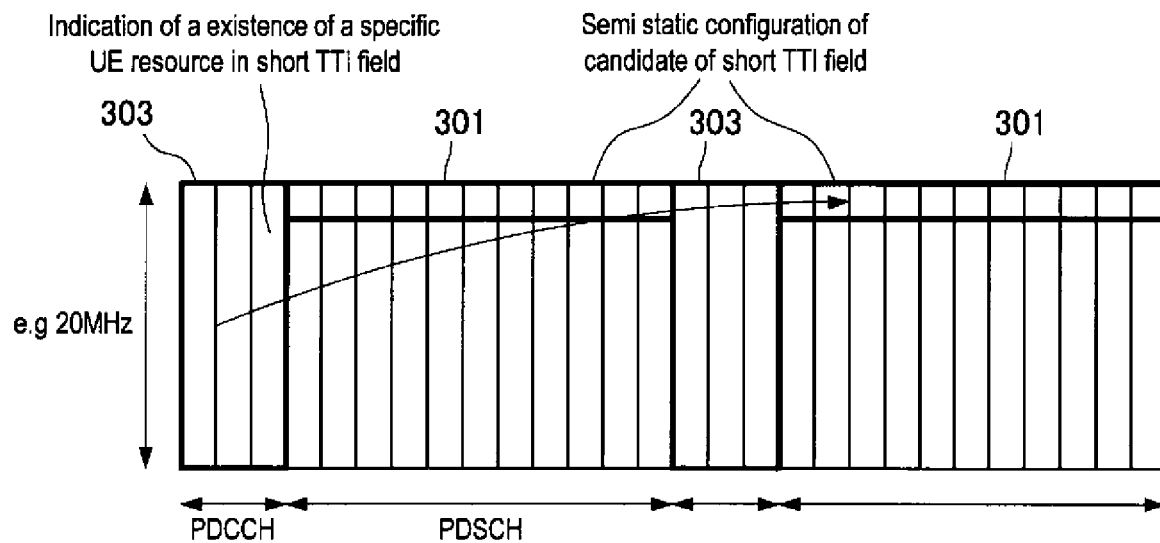
FIG. 13 is an explanatory diagram illustrating a method in which the base station 100 notifies of whether information for a specific terminal apparatus is in a short TTI field.

FIG. 13 is an explanatory diagram illustrating a method in which the base station 100 notifies of whether information for a specific terminal apparatus is in a short TTI field. FIG. 13 illustrates a form in which the base station 100 notifies the terminal apparatus 200 whether the information destined for the specific terminal apparatus is in the short TTI field in a subsequent subframe in the PDCCH of the subframe.

A method illustrated in FIG. 13 is the same method as the method illustrated in FIG. 12, but the base station 100 can advance a start timing of decoding of the data of the short TTI in the terminal apparatus 200 by notifying the terminal apparatus 200 whether the information destined for the specific terminal apparatus is in the short TTI field of the subsequent subframe in the PDCCH of the subframe.

Figure 14:
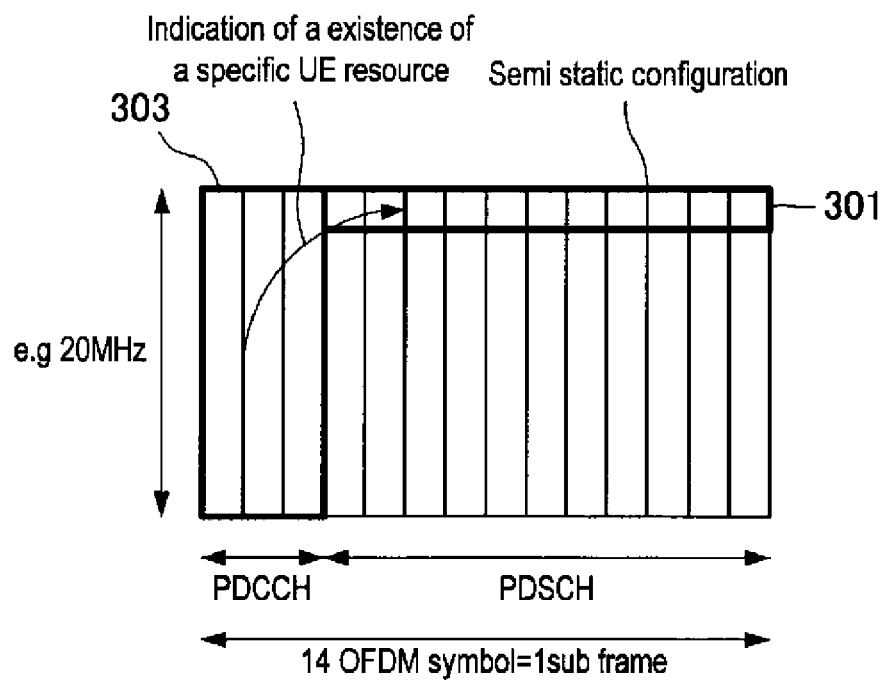
FIG. 14 is an explanatory diagram illustrating an example in which the base station 100 notifies of whether information for a specific terminal apparatus is in a short TTI field using DCI inside a search space unique to the terminal apparatus 200 in a PDCCH.

When the base station 100 notifies the terminal apparatus 200 whether the information destined for the specific terminal apparatus is in the short TTI field, the base station 100 may perform designation using DCI inside a search space unique to the terminal apparatus 200 in the PDCCH (or ePDCCH). FIG. 14 is an explanatory diagram illustrating an example in which the base station 100 notifies of whether information for a specific terminal apparatus is in a short TTI field using DCI inside a search space unique to the terminal apparatus 200 in the PDCCH.

When the base station 100 performs the notification dynamically using the PDCCH, the base station 100 may put the data of the short TTI in the short TTI field only in the case in which the data of the short TTI is transmitted. Therefore, resources can be efficiently used. In addition, whether there is data related in each terminal apparatus 200 in the short TTI field is preferably determined with small labor by the terminal apparatus 200. In addition, this is because power consumption can be reduced since it is not necessary for the terminal apparatus 200 for which there is no data in the short TTI field to decode the data of the short TTI.

(3) Method of Notifying of Resource of the Short TTI for Each Terminal Apparatus The base station 100 may notify the terminal apparatus 200 whether the data of the short TTI is in the short TTI field, using DCI. At the time of notification, the base station 100 may also notify the terminal apparatus 200 of a resource of the short TTI field which is data of the short TTI to be received and decoded by the target terminal apparatus 200.

Figure 15:
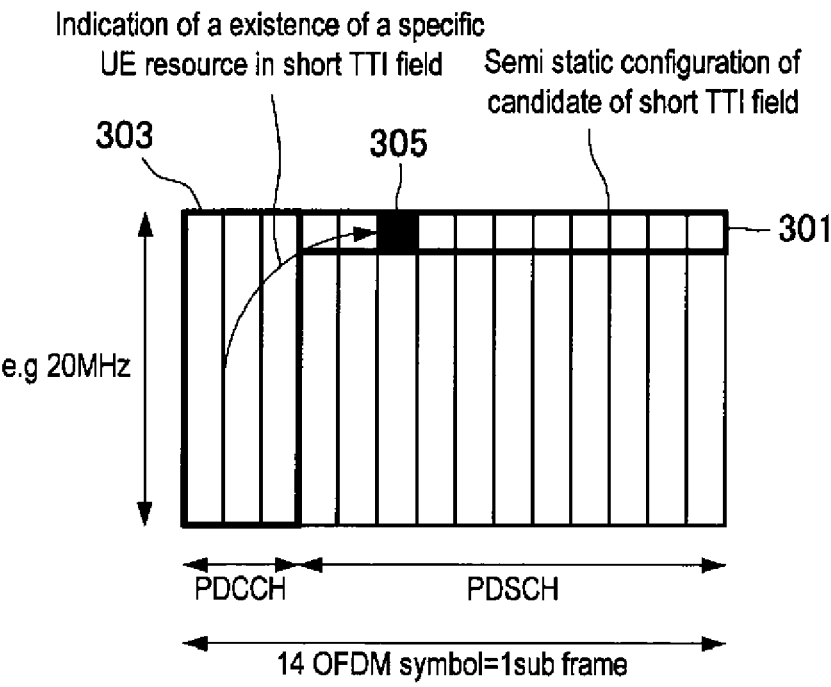
FIG. 15 is an explanatory diagram illustrating a form in which the base station 100 notifies of a location of data of the short TTI in the short TTI field using the DCI.

FIG. 15 is an explanatory diagram illustrating a form in which the base station 100 notifies of a location of data of the short TTI in the short TTI field using DCI. In the example illustrated in FIG. 15, a location denoted by reference numeral 305 in the same subframe is assumed to be a location where the data of the short TTI to be received and decoded by the target terminal apparatus 200 is. The base station 100 notifies the target terminal apparatus 200 that the data of the short TTI to be decoded is in the location denoted by reference numeral 305, using DCI. By performing the notification in this way, the terminal apparatus 200 receiving DCI can perform decoding with reference to only the location.

Figure 16:
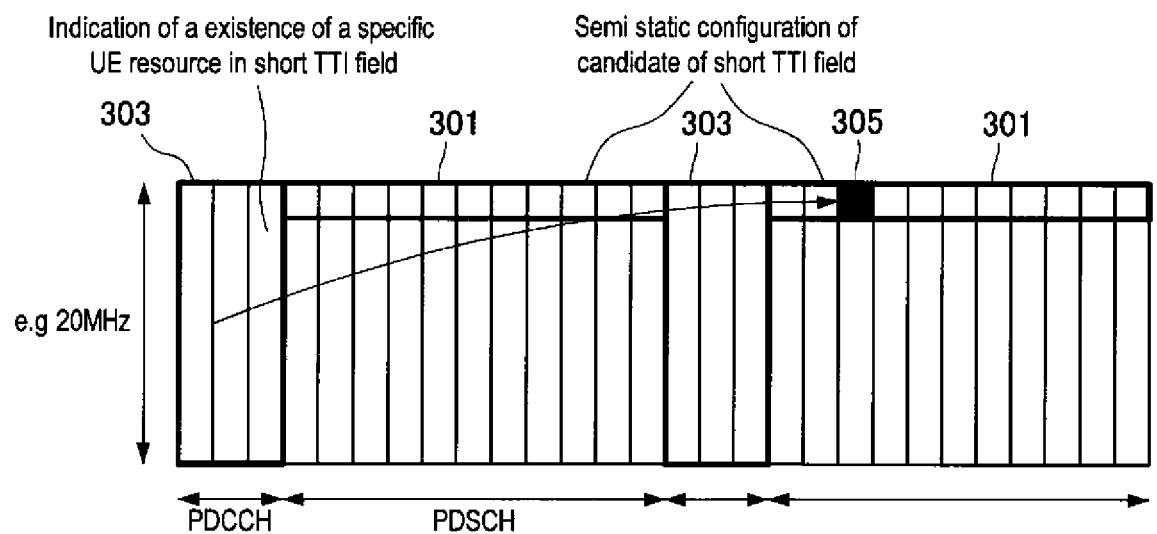
FIG. 16 is an explanatory diagram illustrating a form in which the base station 100 notifies of a location of data of the short TTI in the short TTI field using the DCI.

FIG. 16 is an explanatory diagram illustrating a form in which the base station 100 notifies of a location of data of the short TTI in the short TTI field using DCI. In the example illustrated in FIG. 16, the location denoted by reference numeral 305 in the subsequent subframe is assumed to be a location where the data of the short TTI to be received and decoded by the target terminal apparatus 200 is. The base station 100 notifies the target terminal apparatus 200 that the data of the short TTI to be decoded is in the location denoted by reference numeral 305, using DCI. By performing the notification in this way, the terminal apparatus 200 receiving DCI can perform decoding with reference to only the location.

Note that the base station 100 may notify the terminal apparatus 200 of information regarding the short TTI using ePDCCH in which the control signal is put in a part of the PDSCH rather than the PDCCH. In a case in which the notification is performed using ePDCCH, the base station 100 may notify the terminal apparatus 200 of the information regarding the short TTI in the same subframe or may notify the terminal apparatus 200 of the information regarding the short TTI in the subsequent subframe.

Figure 17:
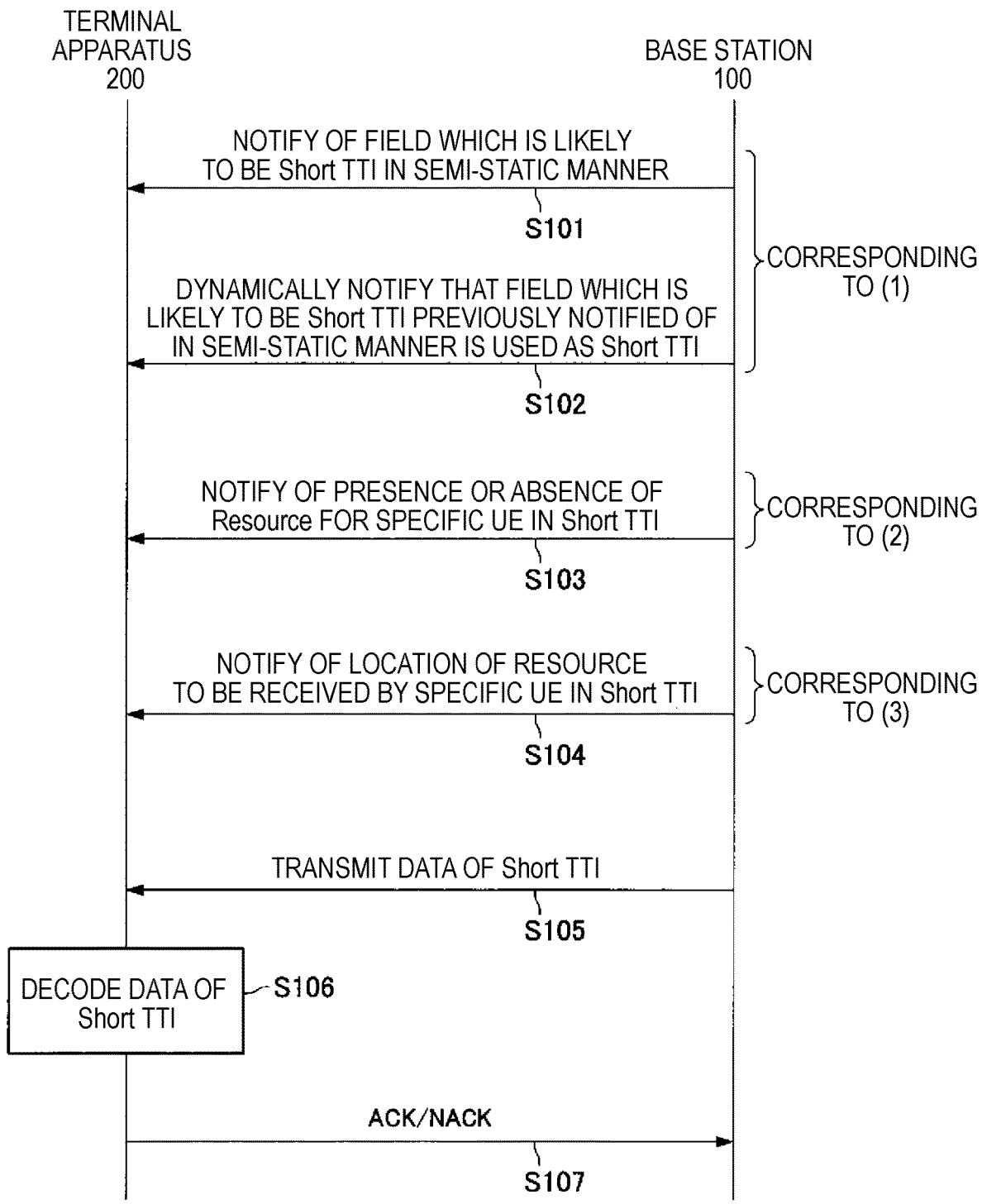
FIG. 17 is a flowchart illustrating an operation example of the base station 100 and the terminal apparatus 200 according to the embodiment.

FIG. 17 is a flowchart illustrating an operation example of the base station 100 and the terminal apparatus 200 according to the embodiment of the present disclosure. FIG. 17 illustrates an operation example of the base station 100 and the terminal apparatus 200 when the base station 100 notifies the terminal apparatus 200 of a field which is likely to be used as the short TTI and then the terminal apparatus 200 returns ACK or NACK of the received data. Hereinafter, an operation example of the base station 100 and the terminal apparatus 200 according to the embodiment of the present disclosure will be described with reference to FIG. 17.

The base station 100 notifies the terminal apparatus 200 of the short TTI field (which is a field which is likely to be the short TTI) in the subframe (step S101). For example, the notification unit 153 performs the process of step S101. The base station 100 notifies the terminal apparatus 200 of a field which is likely to be used as the short TTI in one subframe in the semi-static manner using system information for which broadcast is used or a dedicated signal for each terminal apparatus 200.

When the terminal apparatus 200 is notified of the field which is likely to be the short TTI, subsequently, the base station 100 dynamically notifies the terminal apparatus 200 that the field which is likely to be the short TTI is actually used as the short TTI for each subframe (step S102). For example, the notification unit 153 performs the process of step S102. For example, the base station 100 designates whether the field which is likely to be used as the short TTI is actually used as the short TTI in DCI in the PDCCH, as described above.

Subsequently, the base station 100 notifies the terminal apparatus 200 of presence or absence of a resource for the specific terminal apparatus 200 in the short TTI (step S103). For example, the notification unit 153 performs the process of step S103.

Subsequently, the base station 100 notifies the terminal apparatus 200 of a location of the resource to be received by the specific terminal apparatus 200 in the short TTI (step S104). For example, the notification unit 153 performs the process of step S104.

Subsequently, the base station 100 puts the data of the short TTI in the location of the resource notified of in the foregoing step S104 to transmit the data to the terminal apparatus 200 (step S105). For example, the transmission processing unit 151 performs the process of step S105 by transmitting the data from the wireless communication unit 120 via the antenna unit 110.

The terminal apparatus 200 decodes the data of the short TTI transmitted from the base station 100 in the foregoing step S105 on the basis of the information of which the base station 100 notifies the terminal apparatus 200 in the foregoing steps S101 to S104 (step S106). For example, the reception processing unit 243 performs the process of step S106.

When the terminal apparatus 200 decodes the data of the short TTI in step S106, the terminal apparatus 200 each notifies the base station 100 of ACK at the time of success of the decoding and notifies the base station 100 of NACK at the time of failure of the decoding (step S107). For example, the notification unit 245 performs the process of step S107.

In the related art, an eNodeB designates an individual resource of each UE in DCI of the PDCCH. However, the resource of the short TTI is special unlike a resource of a TTI of the related art. Since the special short TTI may not normally be present, the short TTI field is preferably variable to some extent. However, when a short TTI field and a normal TTI field are not ensured, a resource may not directly be designated from the PDCCH, and thus it is difficult to directly designate the resource of the short TTI from the PDCCH.

Accordingly, in a first operation example of the embodiment, the base station 100 designate the short TTI field in the semi-static manner and dynamically designates whether there is the short TTI field. The base station 100 notifies the terminal apparatus 200 whether there is the data of the short TTI of the terminal apparatus 200 in accordance with a dynamic method using the the PDCCH or a semi-static method using dedicated signaling. By performing the notification in this way, a resource of the normal TTI and a resource of the short TTI can be effectively managed in accordance with a method of directly designating all the resources in the PDCCH of the related art than in the related art.

In the first operation example of the embodiment, the base station 100 can control an application mounted on the terminal apparatus 200 in a low latency and in a good response by designating the short TTI field in the semi-static manner and dynamically designating whether there is the short TTI field. In addition, in the first operation example of the embodiment, the terminal apparatus 200 can return ACK or NACK quickly, and thus an improvement in throughput is prospected. Then, in the first operation example of the embodiment, since the resource of the short TTI can effectively coexist with the resource of the normal TTI, the resources are not wasteful and an improvement in throughput can be greatly expected.

1.4.2. Second Operation Example

Next, a second operation example of the base station 100 and the terminal apparatus 200 according to the embodiment of the present disclosure will be described. As described above, in the case in which transmission and reception of data at the short transmission time interval are caused to coexist with transmission and reception of data at the existing transmission time interval, terminal apparatuses corresponding to the short TTIs can be widespread when short TTIs with various levels are prepared on an base station side. In the second operation example, an operation example of the base station 100 and the terminal apparatus 200 when short TTIs with various levels are prepared will be described.

Figure 18:
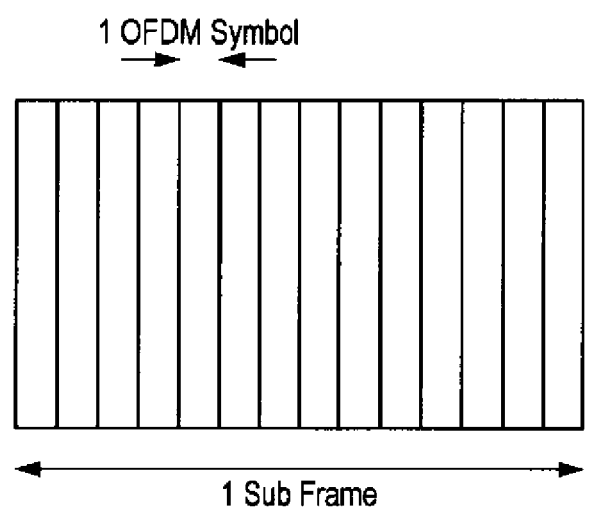
FIG. 18 is an explanatory diagram illustrating a short TTI formed by 1 OFDM symbol.
Figure 19:
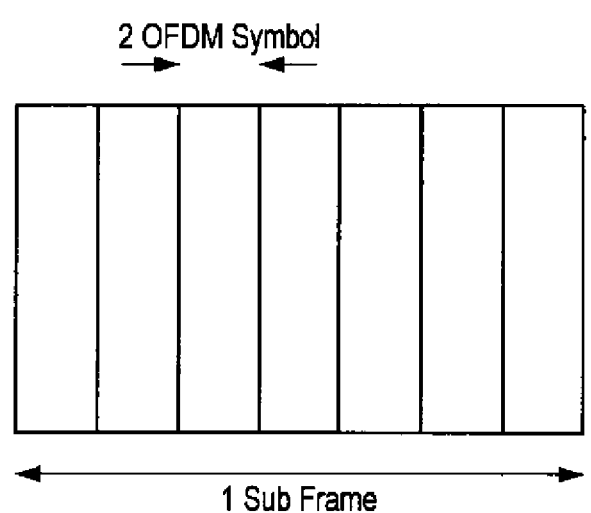
FIG. 19 is an explanatory diagram illustrating a short TTI formed by 2 OFDM symbol.

FIG. 18 is an explanatory diagram illustrating a short TTI formed by 1 OFDM symbol. The short TTI formed by 1 OFDM symbol is also referred to as a short TTI with level 1. In addition, FIG. 19 is an explanatory diagram illustrating a short TTI formed by 2 OFDM symbols. The short TTI formed by 2 OFDM symbols is also referred to as a short TTI with level 2.

In a case in which the level of the short TTI is 1, a resource of LTE is occupied wastefully and the whole throughput deteriorates. The reason why the throughput deteriorates is that there is a case in which the same level of the short TTI is not necessary in all the terminal apparatuses 200 corresponding to the short TTIs. In addition, all the terminal apparatuses 200 corresponding to the short TTIs may not be said to similarly realize the levels of the short TTIs. Accordingly, when a communication service provider prepares a plurality of levels of the short TTIs, the terminal apparatuses 200 corresponding to the short TTIs manufactured by various vendors (makers) can be connected to an LET network in which the plurality of levels of the short TTIs are prepared.

The base station 100 prepares the plurality of levels of the short TTIs. Setting of the levels of the short TTIs may differ for each cell. The base station 100 notifies the terminal apparatuses 200 of the plurality of levels of the short TTIs supplied by the base station 100 using, for example, system information in a broadcast.

The terminal apparatus 200 notifies the base station 100 of a processing ability (for example, a hardware ability, a category of an application to be executed, or a capability of the terminal apparatus 200). In addition, the terminal apparatus 200 may set a latency level requested for each application to be executed. This is because there is a case in which a low latency is not requested depending on an application to be executed by the terminal apparatus 200 even when the terminal apparatus 200 has an ability to perform a process in a low latency.

The terminal apparatus 200 may process data of the short TTIs with the plurality of levels even when the short TTIs with the plurality of levels coexist with the same subframe. In addition, the terminal apparatus 200 may process data of normal TTIs and data of short TTIs in parallel.

Figure 20:
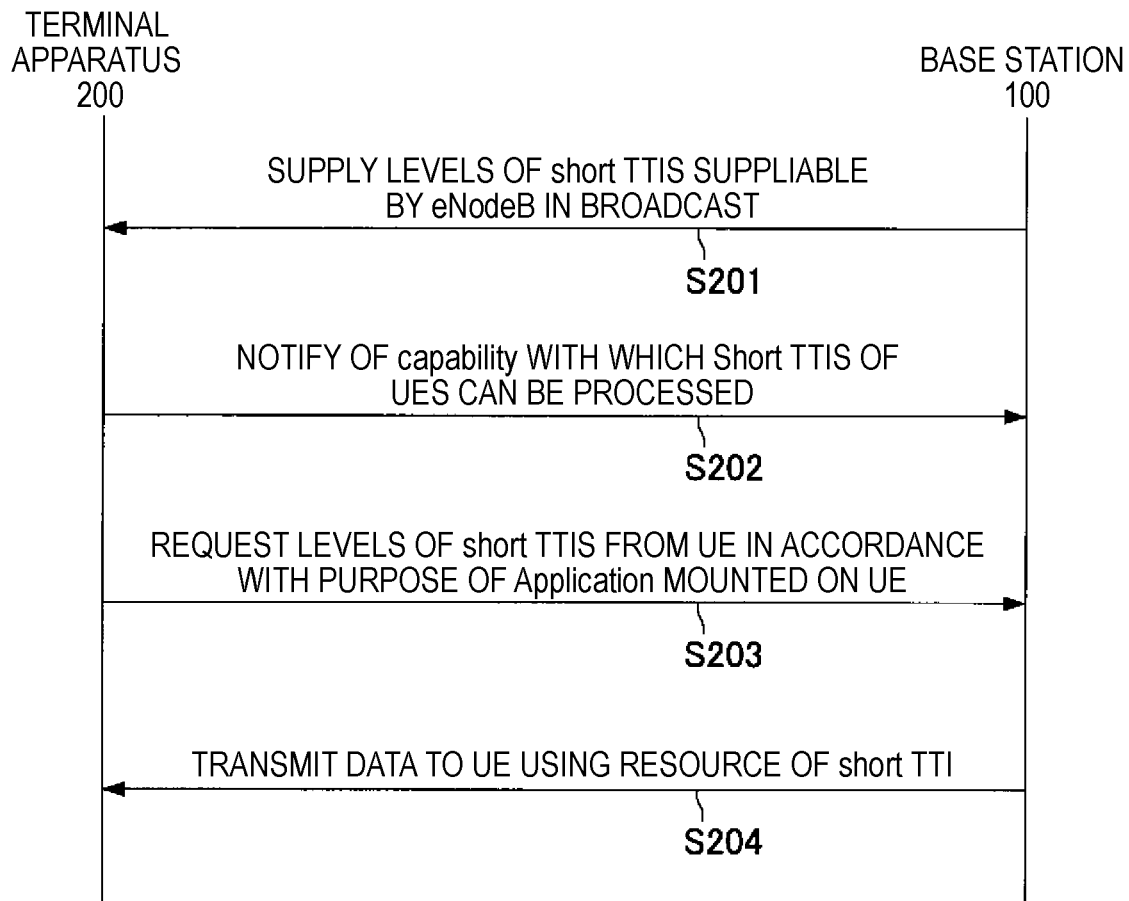
FIG. 20 is a flowchart illustrating an operation example of the base station 100 and the terminal apparatus 200 according to the embodiment.

FIG. 20 is a flowchart illustrating an operation example of the base station 100 and the terminal apparatus 200 according to the embodiment of the present disclosure. Hereinafter, an operation example of the base station 100 and the terminal apparatus 200 according to the embodiment of the present disclosure will be described with reference to FIG. 20.

The base station 100 supplies the suppliable levels of the short TTIs to the terminal apparatuses 200 located in the cell in the broadcast (step S201). For example, the notification unit 153 performs the process of step S201.

The terminal apparatus 200 receiving the levels of the short TTIs suppliable by the base station 100 from the base station 100 notifies the base station 100 of a capability with which the short TTIs can be processed (step S202). For example, the notification unit 245 performs the process of step S202. In step S202, the terminal apparatus 200 may notify the base station 100 of information regarding a hardware processing ability.

In addition, the terminal apparatus 200 requests the base station 100 to supply the levels of the short TTIs in accordance with a purpose of a mounted application (step S203). For example, the notification unit 245 performs the process of step S203.

When the base station 100 receives the capability with which the short TTIs can be processed and the request for the levels of the short TTIs from the terminal apparatus 200, the base station 100 selects the levels of the short TTIs on the basis of the received content and transmits the data of the short TTI to the terminal apparatus 200 in accordance with a selected level using the resource of the short TTI (step S204). For example, the transmission processing unit 151 performs the process of step S204 by transmitting the data from the wireless communication unit 120 via the antenna unit 110.

The base station 100 according to the embodiment of the present disclosure operates in this way, and thus can select the level of the short TTI in accordance with the request and the ability of the terminal apparatus 200. In addition, the terminal apparatus 200 according to the embodiment of the present disclosure can receive the data of the short TTI at the level in accordance with the ability of the terminal apparatus 200 or the request of the application to be executed by performing the notification in this way.

Figure 21:
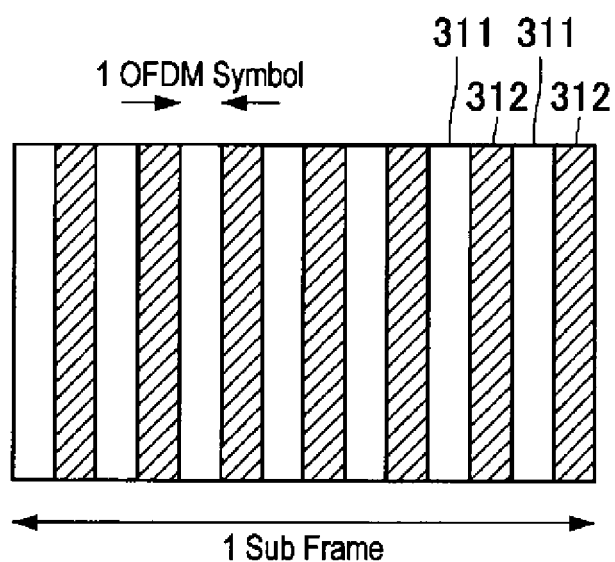
FIG. 21 is an explanatory diagram illustrating an example of a short TTI field in 1 subframe.

Some of the terminal apparatuses 200 can also be considered to permit a latency time although the latency time is longer than the level even when the data is received at a low level of the short TTI. FIG. 21 is an explanatory diagram illustrating an example of a short TTI field in 1 subframe. For example, certain terminal apparatuses 200 are assumed to permit a latency of 2 OFDM symbols even when data is received at level 1 of the short TTI. In this case, the base station 100 causes the certain terminal apparatuses 200 to use every other OFDM symbol as the short TTIs, as illustrated in FIG. 21. The OFDM symbol denoted by reference numeral 311 is an OFDM symbol which is used the terminal apparatus 200 as the short TTI. In this way, the base station 100 can efficiently supply the resources to the terminal apparatuses 200 capable of permitting the latency of 2 OFDM symbols by causing the terminal apparatuses 200 to use the short TTI fields at every other OFDM symbol.

The short TTI field illustrated in FIG. 21 is different from the short TTI formed by 2 OFDM symbols illustrated in FIG. 19 and the resource of the short TTI formed by 1 OFDM symbol is decimated. The base station 100 can cause another terminal apparatus 200 to use the decimated resource (the OFDM symbol denoted by reference numeral 312). That is, the base station 100 lowers the level of the latency control by decimating the resource of the short TTI formed by 1 OFDM symbol at every other OFDM symbol. Note that the terminal apparatus 200 requesting the latency of 1 OFDM symbol may receive the data of the short TTI from the base station 100 using the resource of a certain OFDM symbol denoted by reference numeral 311 or 312 in FIG. 21.

Figure 22:
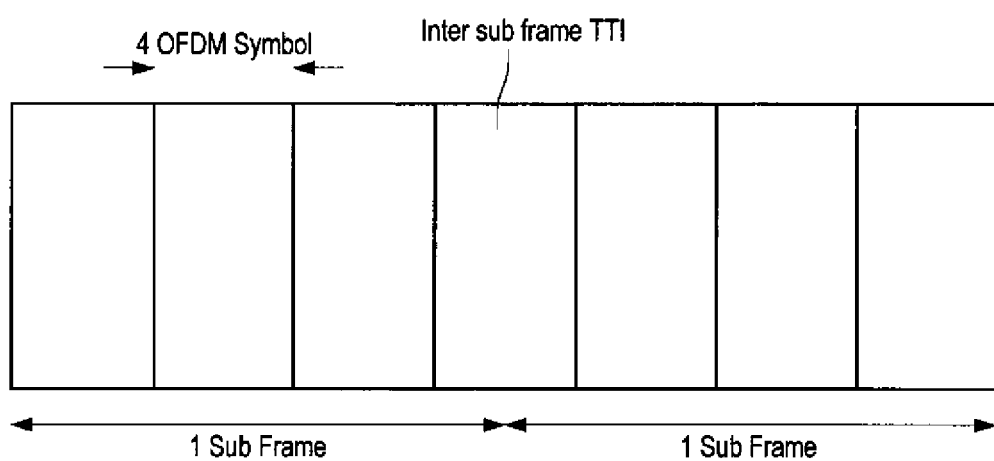
FIG. 22 is an explanatory diagram illustrating a short TTI formed by 4 OFDM symbols.

The short TTI formed by 2 OFDM symbols illustrated in FIG. 19 is completed with one subframe. However, a short TTI formed by, for example, 4 OFDM symbols may not be completed with one subframe. FIG. 22 is an explanatory diagram illustrating a short TTI formed by 4 OFDM symbols. Since the short TTI with level 4 at which the short TTI is formed by 4 OFDM symbols may not be completed with one subframe, as illustrated in FIG. 22, a portion straddling two frames occurs. In this case, the base station 100 notifies the terminal apparatus 200 whether data of the short TTI straddles two frames.

Figure 23:
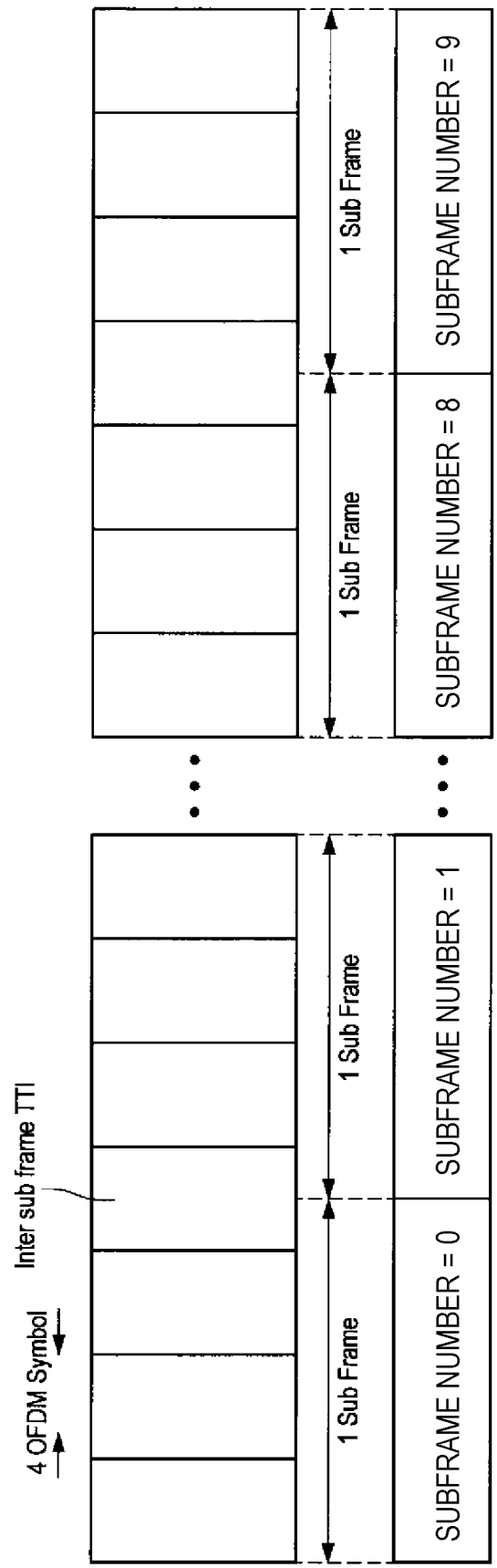
FIG. 23 is an explanatory diagram illustrating a short TTI formed by 4 OFDM symbols in 1 frame.

As a system frame number (SFN), an integer from 0 to 1023 is repeated. In addition, there are 10 subframes in one frame. FIG. 23 is an explanatory diagram illustrating a short TTI formed by 4 OFDM symbols in 1 frame. In a case in which a short TTI is formed by 4 OFDM symbols, as illustrated in FIG. 23, a short TTI formed by 4 OFDM symbols is disposed to straddle a first subframe and a second subframe. That is, the short TTI formed by 4 OFDM symbols is disposed to straddle an odd subframe and an even subframe. Accordingly, when the base station 100 can notify the terminal apparatus 200 of a relation between a system frame number and a subframe number, and a phase of the short TTI, the terminal apparatus 200 can normally receive the short TTI of 4 OFDM symbols.

SFN is transmitted with a broadcast signal called a master information block (MIB) from the base station 100 to the terminal apparatus 200. Accordingly, the base station 100 fixes the relation between the system frame number and the subframe number, and the phase of the short TTI in advance or separately notifies the terminal apparatuses 200 of the relation between the system frame number and the subframe number, and the phase of the short TTI by signaling.

Figure 24:
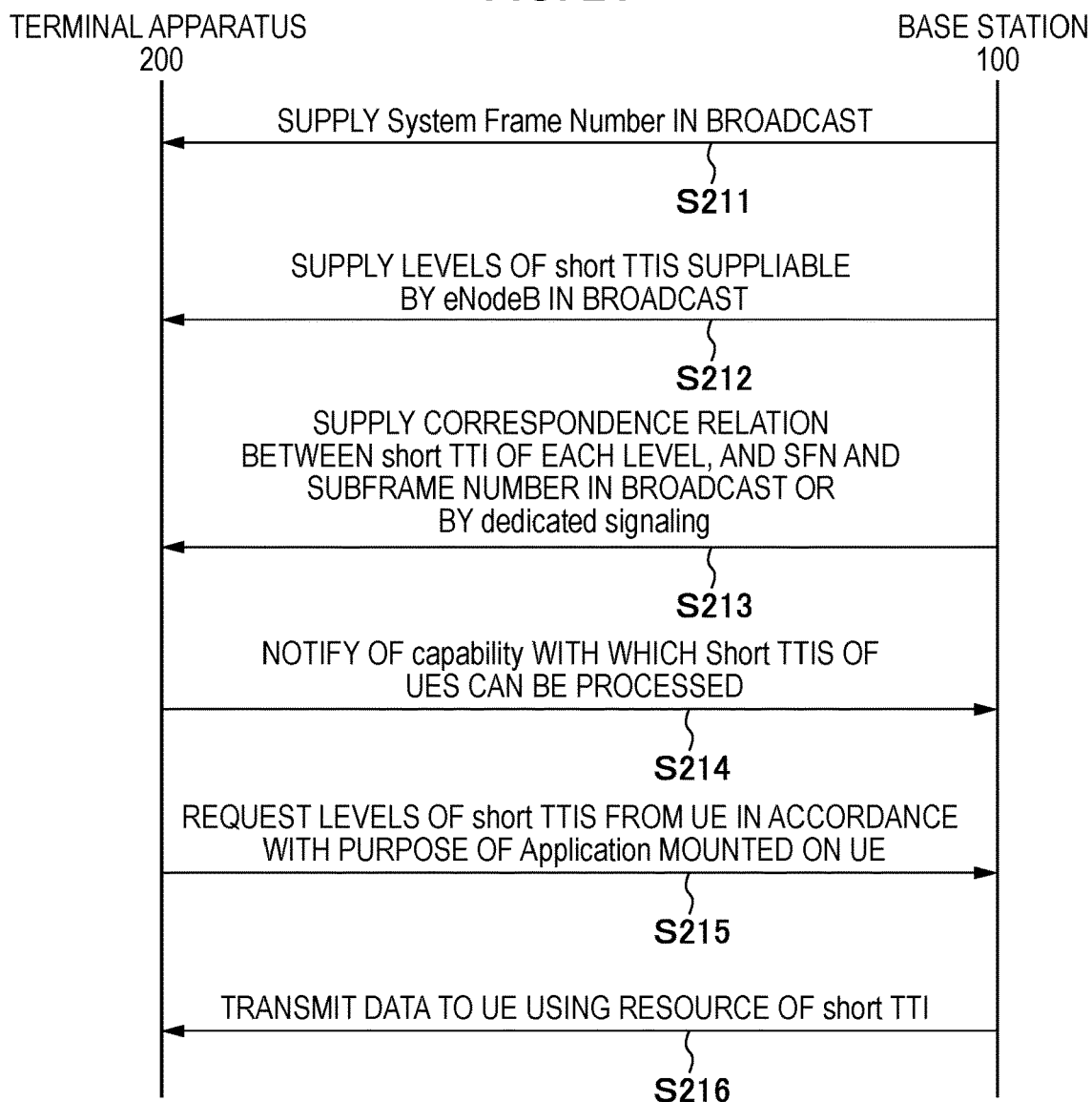
FIG. 24 is a flowchart illustrating an operation example of the base station 100 and the terminal apparatus 200 according to the embodiment.

FIG. 24 a flowchart illustrating an operation example of the base station 100 and the terminal apparatus 200 according to the embodiment of the present disclosure. FIG. 24 illustrates an operation example of the base station 100 and the terminal apparatus 200 in a case in which the short TTI may not be completed with one subframe. Hereinafter, an operation example of the base station 100 and the terminal apparatus 200 according to the embodiment of the present disclosure will be described with reference to FIG. 24.

The base station 100 supplies the system frame number such as MIB to the terminal apparatus 200 in a broadcast (step S211). For example, the notification unit 153 performs the process of step S211.

Subsequently, the base station 100 supplies the suppliable levels of the short TTIs to the terminal apparatuses 200 located in the cell in the broadcast (step S212). For example, the notification unit 153 performs the process of step S212.

Subsequently, the base station 100 supplies a correspondence relation between the short TTI of each level, and the system frame number and the subframe number to the terminal apparatus 200 in a broadcast or by dedicated signaling (step S213). For example, the notification unit 153 performs the process of step S213. Note that the correspondence relation between the short TTI of each level, and the system frame number and the subframe number to the terminal apparatus 200 may be fixed in advance in a specification.

The terminal apparatus 200 receiving the levels of the short TTIs suppliable by the base station 100 notifies the base station 100 of a capability with which the short TTIs can be processed (step S214). For example, the notification unit 245 performs the process of step S214.

In addition, the terminal apparatus 200 requests the base station 100 to supply the levels of the short TTIs in accordance with a purpose of a mounted application (step S215). For example, the notification unit 245 performs the process of step S215.

When the base station 100 receives the capability with which the short TTIs can be processed and the request for the levels of the short TTIs from the terminal apparatus 200, the base station 100 selects the level of the short TTI on the basis of the received content and transmits the data of the short TTI to the terminal apparatus 200 in accordance with a selected level using the resource of the short TTI (step S216). For example, the transmission processing unit 151 performs the process of step S216 by transmitting the data from the wireless communication unit 120 via the antenna unit 110.

When the terminal apparatus 200 receives the data of the short TTI from the base station 100, the terminal apparatus 200 decodes the data of the short TTI on the basis of the correspondence relation received in step S213 from the base station 100.

The base station 100 according to the embodiment of the present disclosure operates in this way, and thus can select the level of the short TTI in accordance with the request and the ability of the terminal apparatus 200 and can cause the terminal apparatus 200 to normally decode the data of the short TTI. In addition, the terminal apparatus 200 according to the embodiment of the present disclosure can receive the data of the short TTI at the level in accordance with the ability of the self-apparatus and the request of the application to be executed and can normally decode the data of the short TTI by performing the notification in this way.

Figure 25:
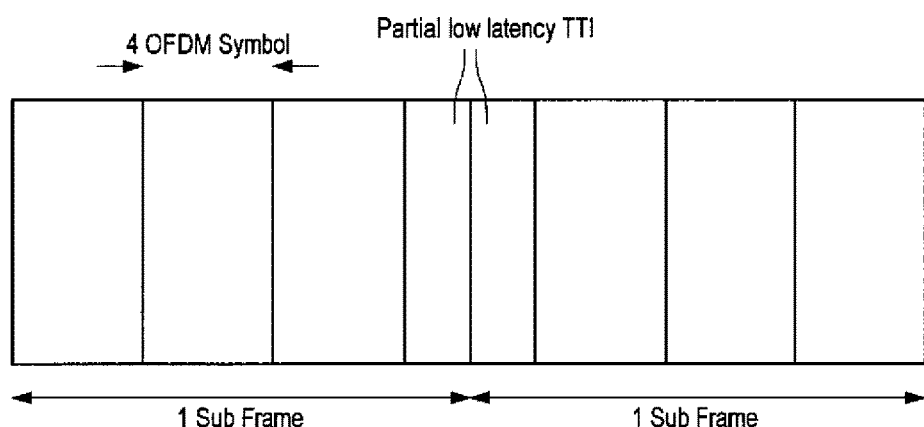
FIG. 25 is an explanatory diagram illustrating an example in which short TTIs with a plurality of levels coexist in one subframe.

The short TTIs with the plurality of levels may coexist with one subframe. FIG. 25 is an explanatory diagram illustrating an example in which the short TTIs with the plurality of levels coexist with one subframe.

FIG. 25 illustrates an example in which the short TTI with level 4 formed by 4 OFDM symbols and the short TTI with level 2 formed by 2 OFDM symbols coexist with one subframe. In the example of FIG. 25, three short TTIs with level 4 are continuously disposed and one short TTI with level 2 is subsequently disposed in the first subframe, and one short TTI with level 2 is first disposed and three short TTIs with level 4 are subsequently continuously disposed in a subsequent subframe. Of course, a disposition pattern is not limited to the related example. The short TTIs with different levels may be disposed to coexist in the same pattern in all the subframes. For example, in all the subframes, three short TTIs with level 4 may be continuously disposed and one short TTI with level 2 may be subsequently disposed. In addition, for example, in all the subframes, one short TTI with level 2 may be first disposed and three short TTIs with level 4 may be subsequently continuously disposed.

Figure 26:
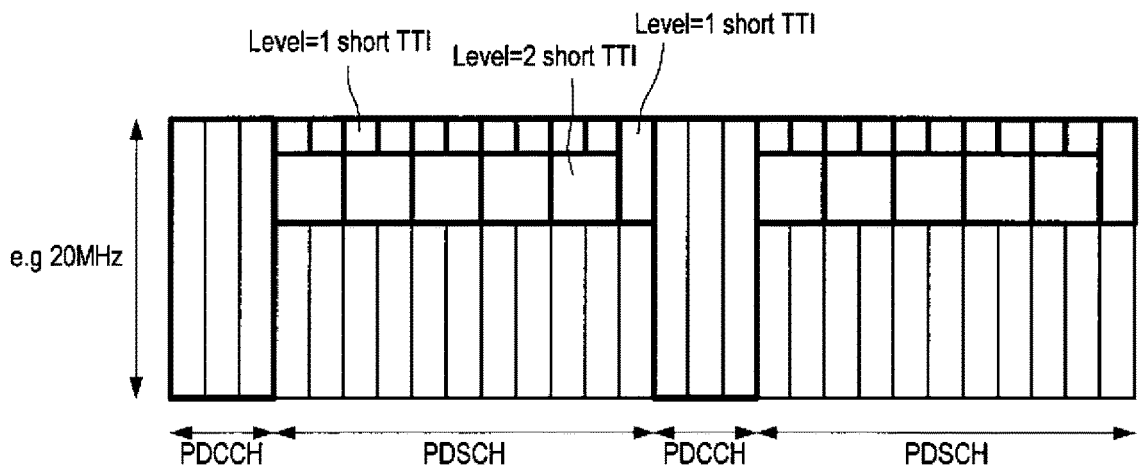
FIG. 26 is an explanatory diagram illustrating another disposition example of short TTIs.

FIG. 26 is an explanatory diagram illustrating another disposition example of the short TTIs. In a subframe, typically, the PDCCH in which a control signal can be stored is disposed in a beginning portion and the PDSCH in which user data can be stored is disposed after the PDCCH. For example, as illustrated in FIG. 26, it can be considered that the short TTIs are set as the succeeding the PDSCH using 3 OFDM symbols as the PDSCH. In this case, when only the short TTIs with level 2 are used, the final 1 OFDM symbol of the subframe may not be used as the short TTI with level 2. Accordingly, as illustrated in FIG. 26, the final 1 OFDM symbol of the subframe may be used as the short TTI with level 1. Note that, as illustrated in FIG. 26, the base station 100 may divide a resource of a certain OFDM symbol into the short TTI with level 1 and the short TTI with level 2 for use.

Figure 27:
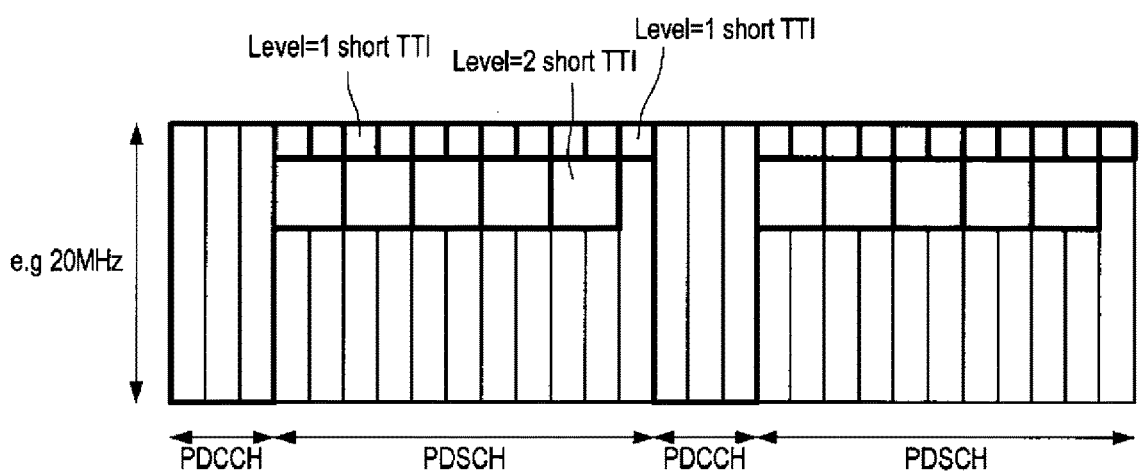
FIG. 27 is an explanatory diagram illustrating a disposition example of short TTIs.

FIG. 27 is an explanatory diagram illustrating a disposition example of the short TTIs. The disposition example of the short TTIs illustrated in FIG. 27 is different from the disposition example of the short TTIs illustrated in FIG. 26 in that no short TTI is disposed in a resource in which the short TTI with level 2 is disposed in the final 1 OFDM symbol of the subframe.

As illustrated in FIGS. 26 and 27, the base station 100 may divide the resource of a certain OFDM symbol into the short TTI with level 1 and the short TTI with level 2 for use and may also change an amount of resource allocated to the short TTIs. FIGS. 26 and 27 illustrate examples in which an amount of resource allocated to the short TTIs with level 2 is relatively greater than an amount of resource allocated to the short TTIs with level 1. The base station 100 may change the amount of resource allocated to the short TTIs with each level in accordance with, for example, a demand from the terminal apparatuses 200.

As illustrated in FIGS. 26 and 27, in a case in which the short TTIs are disposed only in the portion PDSCH without disposing the short TTIs in the portion PDCCH, the length of the PDCCH is variable from 1 OFDM symbol to 3 OFDM symbols. The base station 100 can notify the terminal apparatuses 200 of information regarding the length of the PDCCH (information regarding the number of OFDM symbols) using a physical control format indicator channel (PCFICH) in the PDCCH. Since the length of the PDCCH is variable from 1 OFDM symbol to 3 OFDM symbols, the length of the PDSCH is variable from 11 OFDM symbols to 13 OFDM symbols. Accordingly, in a case in which the short TTIs are disposed only in the portion PDSCH, the terminal apparatus 200 is preferably informed of a relation between a disposition pattern of the short TTIs and the variable PDSCH.

Figure 28:
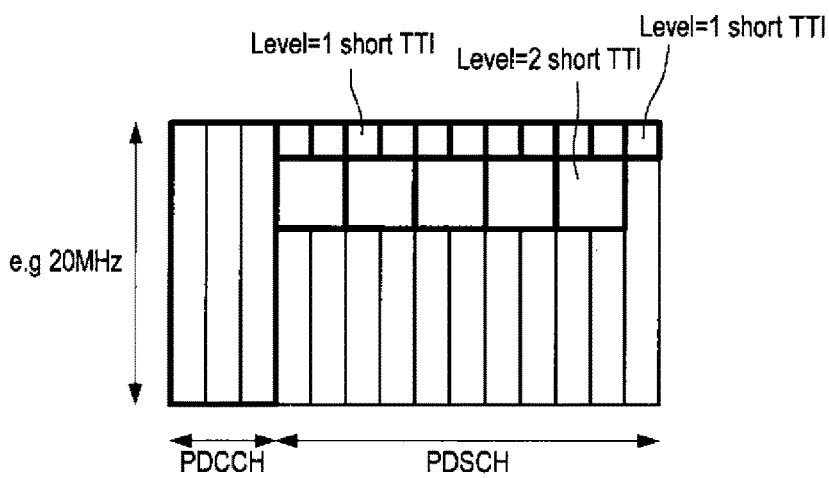
FIG. 28 is an explanatory diagram illustrating a disposition example of short TTIs.

FIG. 28 is an explanatory diagram illustrating a disposition example of the short TTIs. FIG. 28 illustrates a disposition example of the short TTIs in a case in which the length of the PDCCH is 3 OFDM symbols, that is, the length of the PDSCH is 11 OFDM symbols. In the example illustrated in FIG. 28, the resource of one OFDM symbol is divided into the short TTI with level 1 and the short TTI with level 2 for use.

Figure 29:
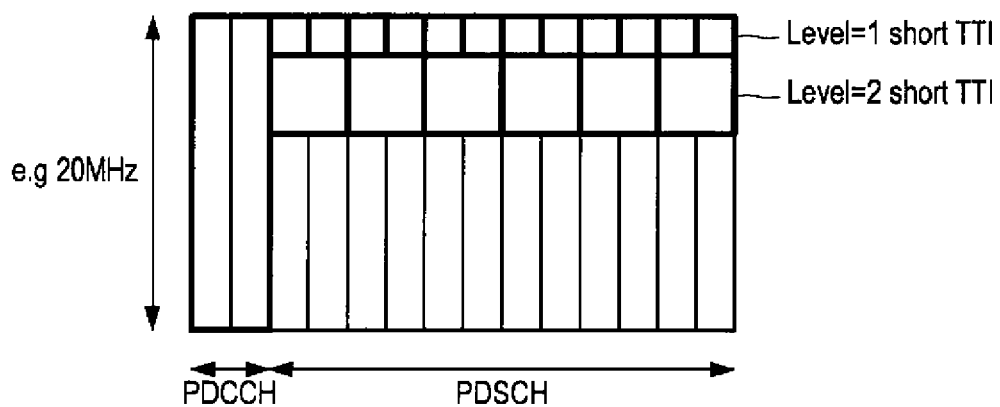
FIG. 29 is an explanatory diagram illustrating a disposition example of short TTIs.

FIG. 29 is an explanatory diagram illustrating a disposition example of the short TTIs. FIG. 29 illustrates a disposition example of the short TTIs in a case in which the length of the PDCCH is 2 OFDM symbols, that is, the length of the PDSCH is 12 OFDM symbols. In the example illustrated in FIG. 29, the resource of one OFDM symbol is divided into the short TTI with level 1 and the short TTI with level 2 for use.

Figure 30:
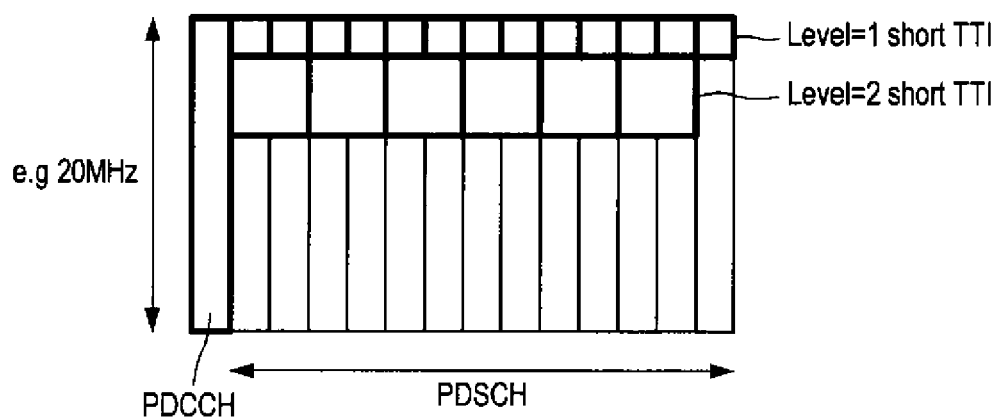
FIG. 30 is an explanatory diagram illustrating a disposition example of short TTIs.

FIG. 30 is an explanatory diagram illustrating a disposition example of the short TTIs. FIG. 30 illustrates a disposition example of the short TTIs in a case in which the length of the PDCCH is 1 OFDM symbol, that is, the length of the PDSCH is 13 OFDM symbols. In the example illustrated in FIG. 30, the resource of one OFDM symbol is divided into the short TTI with level 1 and the short TTI with level 2 for use.

In a case in which the disposition pattern of the short TTIs is changed in accordance with the length of the PDCCH (that is, the length of the PDSCH), the base station 100 notifies the terminal apparatuses 200 of a relation between the disposition pattern of the short TTIs and the PDSCH in advance. Then, the base station 100 notifies the terminal apparatuses 200 of information regarding the length of the PDCCH using PCFICH. When the terminal apparatuses 200 know the information regarding the length of the PDCCH, the terminal apparatuses 200 can know which disposition pattern of the short TTIs is used.

Figure 31:
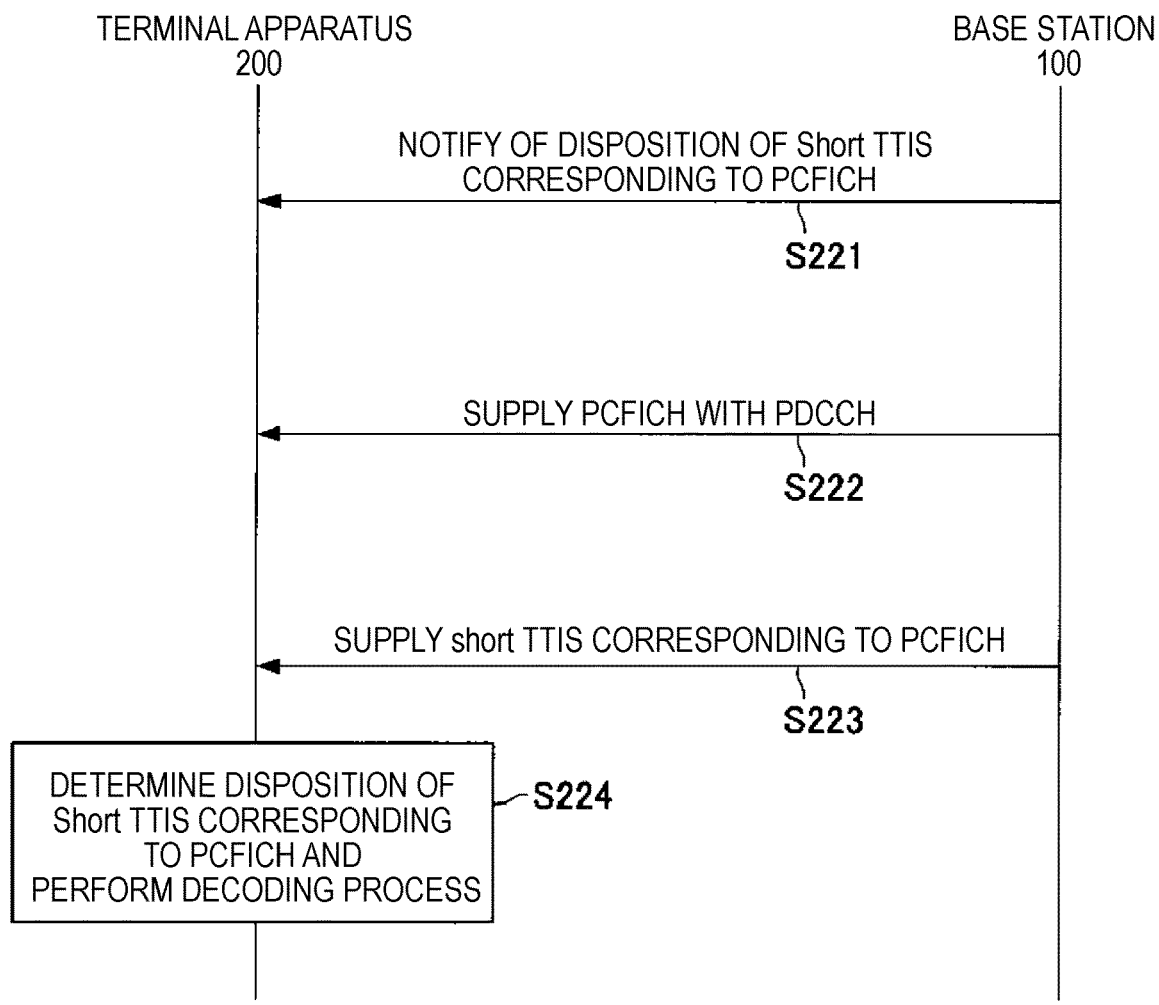
FIG. 31 is a flowchart illustrating an operation example of the base station 100 and the terminal apparatus 200 according to the embodiment.

FIG. 31 is a flowchart illustrating an operation example of the base station 100 and the terminal apparatus 200 according to the embodiment of the present disclosure. Hereinafter, an operation example of the base station 100 and the terminal apparatus 200 according to the embodiment of the present disclosure will be described with reference to FIG. 31.

The base station 100 first notifies the terminal apparatus 200 of the disposition pattern of the short TTIs corresponding to PCFICH (step S221). For example, the notification unit 153 performs the notification of step S221. The disposition pattern of the short TTIs corresponding to PCFICH may be fixed in advance in the specification.

Subsequently, the base station 100 notifies the terminal apparatus 200 of the information regarding the length of the PDCCH with the PCFICH (step S222). For example, the notification unit 153 performs the notification of step S222.

Subsequently, the base station 100 supplies the short TTIs corresponding to PCFICH (step S223). For example, the transmission processing unit 151 performs the process of step S223 by transmitting data from the wireless communication unit 120 via the antenna unit 110. For example, in a case in which the disposition pattern of the short TTIs in a case in which the length of the PDCCH is 3 OFDM symbols is the pattern illustrated in FIG. 28, the base station 100 supplies the short TTIs at the disposition pattern of the short TTIs illustrated in FIG. 28.

When the terminal apparatus 200 knows the disposition pattern of the short TTIs corresponding to PCFICH and receives the notification of the information regarding the length of the PDCCH with PCFICH, the terminal apparatus 200 determines the disposition of the short TTIs corresponding to PCFICH and performs a process of decoding the data of the short TTIs (step S224). For example, the reception processing unit 243 performs the process of step S224.

The terminal apparatus 200 can know which disposition pattern of the short TTIS is used since the terminal apparatus 200 knows the information regarding the length of the PDCCH by performing the above-described process. Then, the terminal apparatus 200 can perform the appropriate process of decoding the data of the short TTIs since the terminal apparatus 200 knows the disposition pattern of the short TTIs in advance.

For example, as described with reference to FIG. 21, in a case in which the short TTIs are disposed intermittently by decimating the levels of the short TTIs at every other OFDM symbol, the disposition pattern of the short TTIs is also similarly changed in accordance with the length of the PDCCH.

Figure 32:
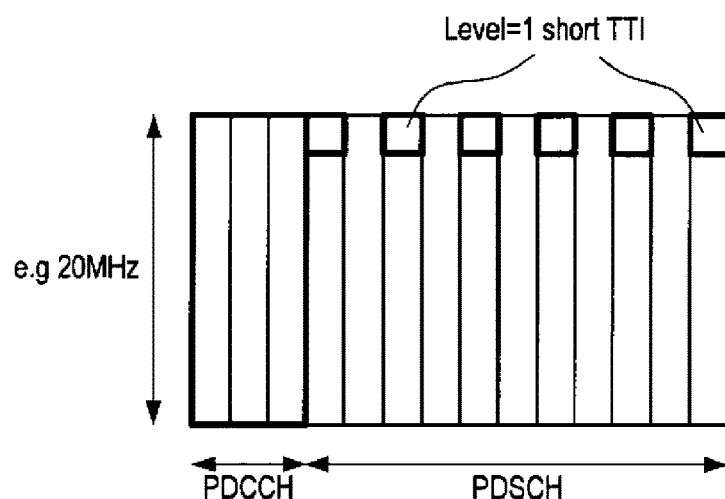
FIG. 32 is an explanatory diagram illustrating a disposition example of short TTIs.

FIG. 32 is an explanatory diagram illustrating a disposition example of short TTIs. FIG. 32 illustrates a disposition example of the short TTIs in a case in which the length of the PDCCH is 3 OFDM symbols, that is, the length of the PDSCH is 11 OFDM symbols. In the example illustrated in FIG. 32, the short TTIs are disposed intermittently by decimating the levels of the short TTIs with level 1 at every other OFDM symbol.

Figure 33:
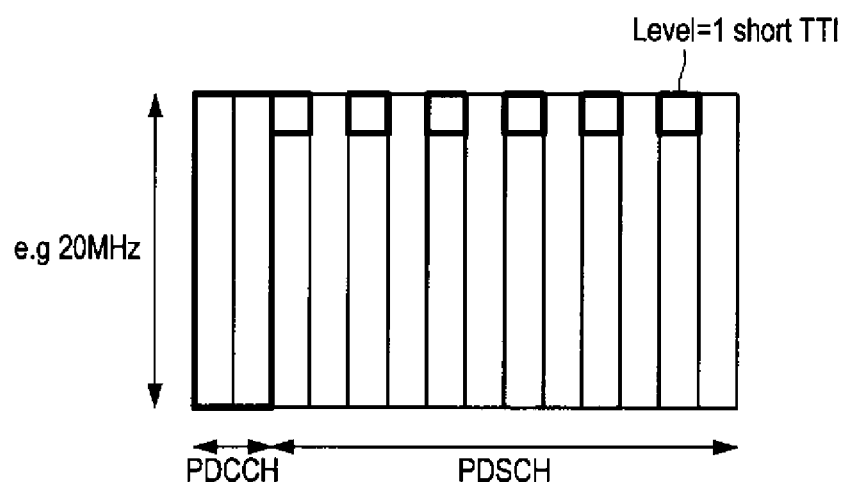
FIG. 33 is an explanatory diagram illustrating a disposition example of short TTIs.

FIG. 33 is an explanatory diagram illustrating a disposition example of short TTIs. FIG. 33 illustrates a disposition example of the short TTIs in a case in which the length of the PDCCH is 2 OFDM symbols, that is, the length of the PDSCH is 12 OFDM symbols. In the example illustrated in FIG. 33, the short TTIs are also disposed intermittently by decimating the short TTIs with level 1 at every other OFDM symbol.

Figure 34:
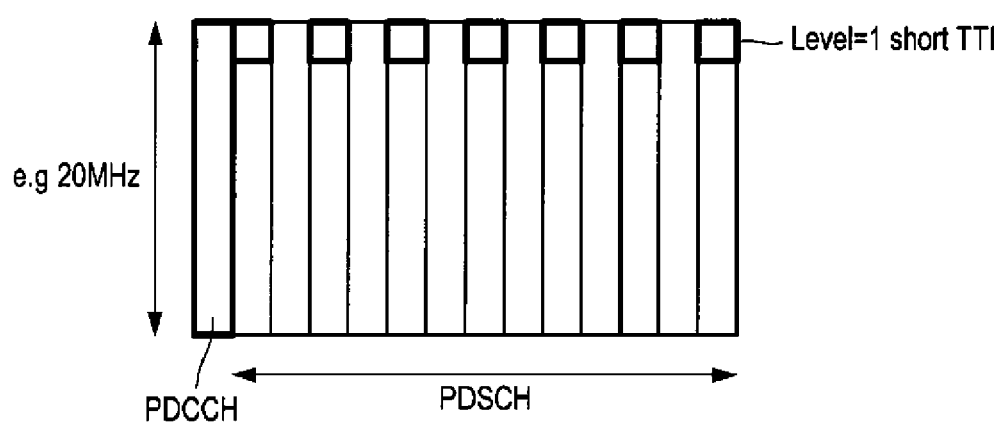
FIG. 34 is an explanatory diagram illustrating a disposition example of short TTIs.

FIG. 34 is an explanatory diagram illustrating a disposition example of short TTIs. FIG. 34 illustrates a disposition example of the short TTIs in a case in which the length of the PDCCH is 1 OFDM symbol, that is, the length of the PDSCH is 13 OFDM symbols. In the example illustrated in FIG. 34, the short TTIs are also disposed intermittently by decimating the short TTIs with level 1 at every other OFDM symbol.

In a case in which the short TTIs are disposed intermittently by decimating the levels of the short TTIs at every other OFDM symbol, for example, as described with reference to FIG. 21, the base station 100 notifies the terminal apparatus 200 of the disposition pattern of the short TTIs and the information regarding the length of the PDCCH with PCFICH in advance, as in the operation example illustrated in FIG. 31. Even in a case in which the short TTIs are disposed by decimating the levels of the short TTIs at every other OFDM symbol, the terminal apparatus 200 can know which disposition pattern of the short TTIs is used since the terminal apparatus 200 knows the information regarding the length of the PDCCH. Then, the terminal apparatus 200 can perform the appropriate process of decoding the data of the short TTIs since the terminal apparatus 200 knows the disposition pattern of the short TTIs in advance.

1.4.3. Third Operation Example

Next, a third operation example of the base station 100 and the terminal apparatus 200 according to the embodiment of the present disclosure will be described. As described above, in the case in which transmission and reception of data at the short transmission time interval are caused to coexist with transmission and reception of data at the existing transmission time interval, a technology for causing terminal apparatuses corresponding to transmission and reception of data at the short transmission time interval to perform an effective process is necessary. In the third operation example, an example of an operation in which the terminal apparatus corresponding to transmission and reception of data at the short transmission time interval can perform an effective process from a different viewpoint from the first operation example will be described.

For the short TTI, a purpose for controlling an application mounted on the terminal apparatus 200 at a low latency from the base station 100 or a network in the back of the base station 100 is assumed. Accordingly, for the short TTI, the data arrives at each time from the Internet or the like connected to the P-GW in the back of the network at a time at which a small amount of control data is necessary, unlike a method of caching data in an S-GW or the base station 100 and supplying the cached (buffered) data. When the small amount of control data does not arrive at the base station 100, the base station 100 does not know when the small amount of control data is transmitted from the base station 100 to the terminal apparatus 200 in this situation. As the application mounted on the terminal apparatus 200, application software controlling a drone, application software controlling a vehicle, or the like can be exemplified. In this way, for the short TTI, a use case in which it is necessary to send data at a low latency from the base station 100 to the terminal apparatus 200 although the data is a small amount of data can be assumed. In the third embodiment, the scheduling technology necessary to send data at a low latency from the base station 100 to the terminal apparatus 200 will be described. Herein, the scheduling indicates that the base station 100 notifies the terminal apparatus 200 of a location of a downlink resource to be used by the terminal apparatus 200.

Figure 35:
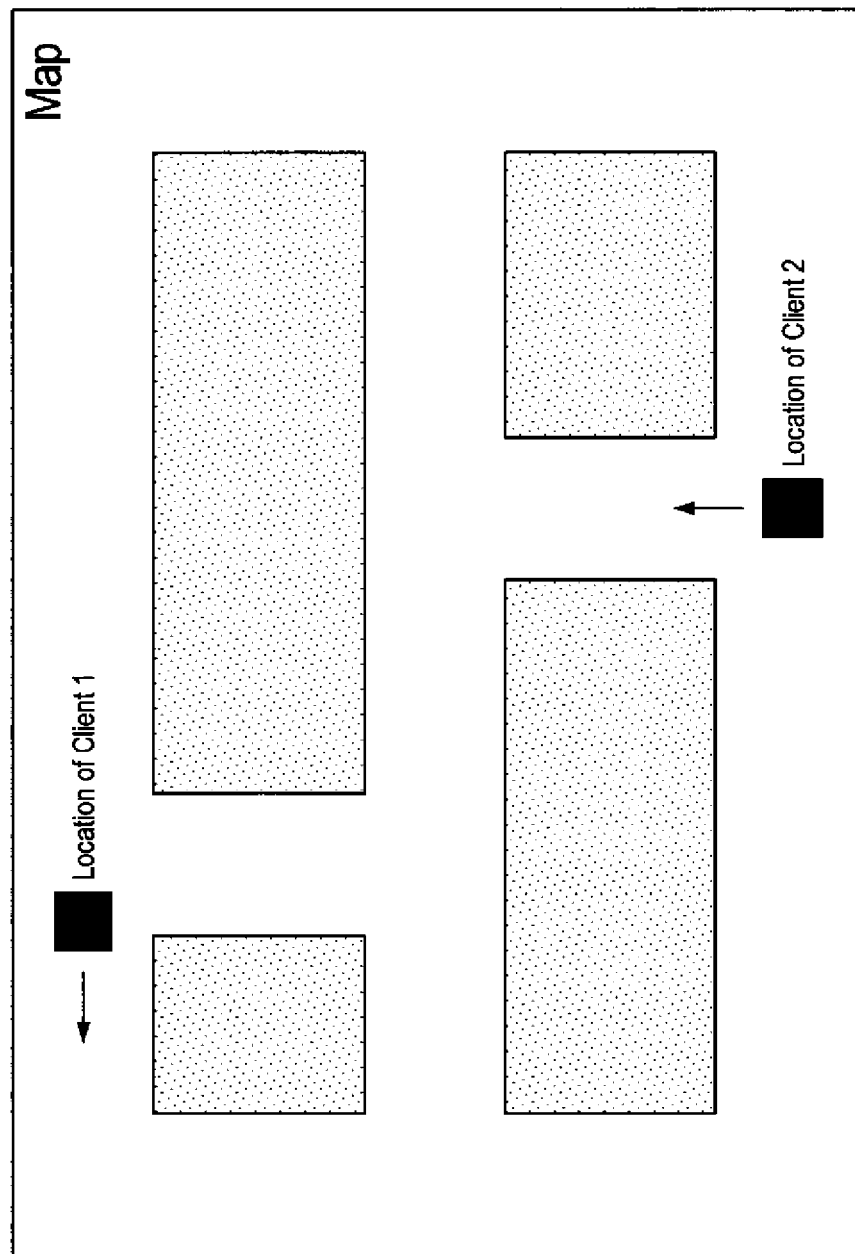
FIG. 35 is an explanatory diagram illustrating an example of a map displayed on the terminal apparatus 200 of each user performing a network game.

As a use case other than the application software controlling a drone or the application software controlling a vehicle, for example, synchronization of a game can be exemplified. As network games, there are many games in which it is necessary for a plurality of users to synchronize their positions on a map via a network. FIG. 35 is an explanatory diagram illustrating an example of a map displayed on the terminal apparatus 200 of each user performing a network game. FIG. 35 illustrates an example of the map on which the positions of two users are displayed. As illustrated in FIG. 35, synchronization of the position of the users on the map is necessary in a game in which a plurality of users attack one other in the map of a common downtown. This is because when synchronization is not achieved, there is a case in which even when a user considers a partner to be in front of the eyes of the user on his or her terminal apparatus and attacks the partner, the partner is actually moving in a distant place. It is necessary to update an application in which synchronization of the positions of users on the map is necessary, at a low latency so that the mutual positions are synchronized.

Figure 36:
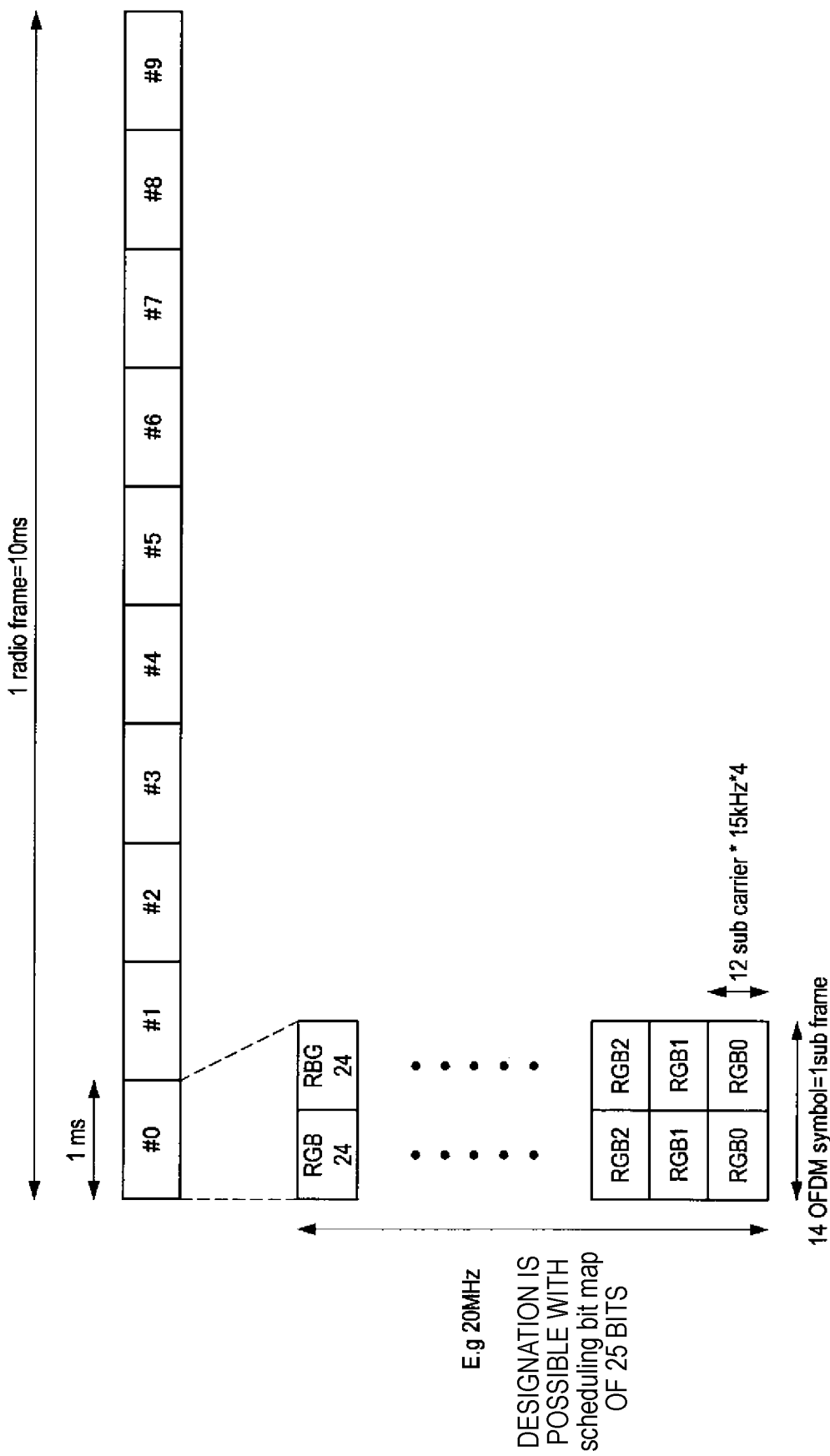
FIG. 36 is an explanatory diagram illustrating a first slot RBG and a second slot RBG which are in 1 subframe.

First, scheduling of a downlink of LTE of the related art will be described. One resource block is formed by 12 subcarriers. An interval of the subcarrier is 15 kHz. Accordingly, the width of the resource block in a frequency direction is 180 kHz. In a case in which the bandwidth is 20 MHz, 100 resource blocks can be disposed within 20 MHz. Here, when the 100 resource blocks are handled without change, the number of bits necessary for the scheduling may be 100 bits. Accordingly, a concept called a resource block group (RBG) in which 4 resource blocks belong to one group will be introduced. When 4 resource blocks are scheduled using one RBG as an RBG unit, the number of bits necessary for the scheduling can be reduced up to 25 bits. That is, an eNodeB notifies a UE of scheduling information formed by the 25-bitmap and indicating which RBG a certain UE uses among 25 RBGs. A first slot RBG and a second slot RBG are in 1 subframe, but the same scheduling is performed for both the RBGs. FIG. 36 is an explanatory diagram illustrating a first slot RBG and a second slot RBG which are in 1 subframe. DCI in the PDCCH of subframe #0 includes 25-bit scheduling information. The 25-bit scheduling information designates RBG in subframe #0. The scheduling information is for one UE. In a case in which 25 bits are all 1, one UE uses all the resource blocks of subframe #0. Besides, for example, when the eNodeB designates "0001000000000010000000000" and the scheduling information, one UE can also use resources at separate frequencies.

When a resource block (short PRB: short PHY resource block) of the short TTI is introduced, a resolution in a time direction becomes fine. In a scheduling method of the related art, there is no resolution in the time direction. In the related art, as described above, the resource blocks are grouped in the frequency direction and a bitmap of the scheduling information can be compressed as RBG However, in a case in which the resolution in the time direction becomes fine as in the short TTIs, countermeasures may not be taken.

In a case in which first 3 OFDM symbols are used with the PDCCH among 14 OFDM symbols in the time direction and the short TTIs are set to 1 OFDM symbol, 11 short TTIs can be disposed in the time direction in the subframe. When resources are designated in 25 RBGs with 25 bits in the frequency direction and resources are designated with 11 bits in the time direction, 25×11=275 bits, that is, bits of 11 multiples of 25 bits of the related art, are necessary for minimum resources of the short TTIs. It is not possible to include a total of 300 bits, 275 bits of the short TTIs and 25 bits in the normal TTIs, in DCI of the PDCCH to designate the resources of the short TTIs of one UE since the field of the PDCCH is limited.

Figure 37:
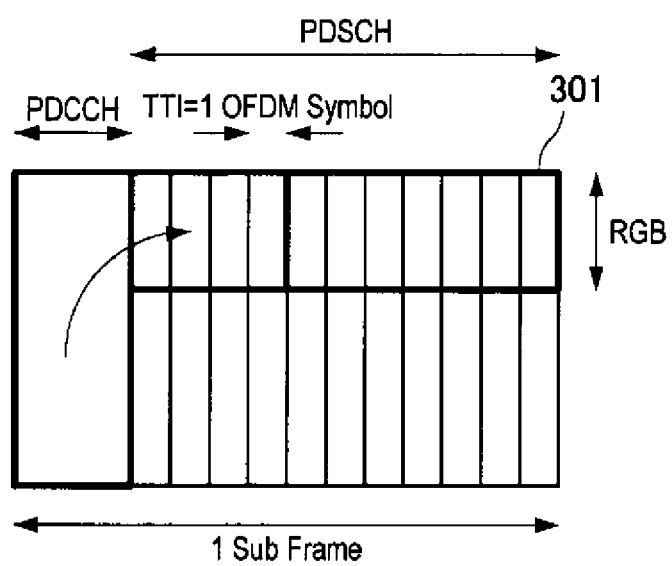
FIG. 37 is an explanatory diagram illustrating an allocation example of short TTIs to the terminal apparatus 200.

Accordingly, a method of performing scheduling of the short TTIs by ignoring a resolution in the time direction will be described. The base station 100 designates RBGs for scheduling in the frequency direction using the same bitmap as the related art. When the PDCCH occupies 3 OFDM symbols in the case of the short TTIs with level 1 in which 1 OFDM symbol is set as the TTI, the PDSCH is 11 OFDM symbols. Therefore, a maximum of 11 short TTIs are disposed in 1 subframe. Here, it is assumed that 11 short TTIs disposed in 1 subframe are all allocated to the same terminal apparatus 200. FIG. 37 is an explanatory diagram illustrating an allocation example of short TTIs to the terminal apparatus 200 and is an explanatory diagram illustrating a for in which 11 short TTIS disposed in 1 subframe are all allocated to the same terminal apparatus 200. By using the method of ignoring the resolution in the time direction, it is possible to minimize an increase in the scheduling information when the short TTIs are introduced.

For the scheduling information to be added as information for the short TTIs, it is necessary to distinguish whether a bitmap of the scheduling information is a bitmap for the short TTIs. Accordingly, it is necessary to newly prepare the bitmap for the short TTI in addition to a bitmap for the TTI of the related art.

In a case in which there are 25 RBGs at the bandwidth of 20 MHz, the bitmap of the scheduling information for the normal TTIs has 25 bits. The bitmap of the scheduling information for the short TTIs also has 25 bits. That is, the bitmaps with a total of 50 bits are prepared for the normal TTIs and the short TTIs. FIG. 38 is an explanatory diagram illustrating a form in which the normal TTIs and the short TTIs are scheduled in one terminal apparatus 200. In addition, Table 1 is an explanatory diagram illustrating examples of the bitmaps of the scheduling information for the normal TTIs and the short TTIs in the scheduling case as in FIG. 38. In the bitmaps, 0 means RBG not used for the normal TTI or the short TTI and 1 means RBG used for the normal TTI and the short TTI.

TABLE 1

(Table 1: bitmap of scheduling information)

| RBG index | Bitmap of normal TTI | Bitmap of short TTI |
| --- | --- | --- |
| 0 | 0 | 1 |
| 1 | 0 | 0 |
| 2 | 1 | 0 |
| 3 | 1 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 0 |
| 13 | 0 | 0 |
| 14 | 0 | 0 |
| 15 | 0 | 0 |
| 16 | 0 | 0 |
| 17 | 0 | 0 |
| 18 | 0 | 0 |
| 19 | 0 | 0 |
| 20 | 0 | 0 |
| 21 | 0 | 0 |
| 22 | 0 | 0 |
| 23 | 0 | 0 |
| 24 | 0 | 0 |

In this way, when the resource bocks of the short TTIs are introduced and the resources are designated with 11 bits in the time direction, the scheduling information of a total of 300 bits is necessary. However, by ignoring the resolution in the time direction by ignoring the resolution in the time direction, it is possible to reduce the scheduling information up to a total of 50 bits.

FIG. 39 is a flowchart illustrating an operation example of the base station 100 and the terminal apparatus 200 according to the embodiment of the present disclosure. FIG. 39 illustrates an operation example of the base station 100 and the terminal apparatus 200 when the base station 100 notifies the terminal apparatus 200 of the scheduling information for the short TTIs. Hereinafter, an operation example of the base station 100 and the terminal apparatus 200 according to the embodiment of the present disclosure will be described with reference to FIG. 39.

The base station 100 notifies the terminal apparatus 200 of RBG for the short TTIs in 25 RBGs with the bitmap in the semi-static manner (step S301). For example, the notification unit 153 performs the process of step S301. When the base station 100 performs the notification with the bitmap in the semi-static manner, system information or dedicated signaling is used.

Subsequently, the base station 100 performs scheduling of RBG with the PDCCH (step S302). For example, the notification unit 153 performs the process of step S302.

The terminal apparatus 200 knows whether the scheduled RBG is for the short TTIs or the normal TTIs, and then decodes data transmitted from the base station 100 (step S303). For example, the reception processing unit 243 performs the process of step S303.

Next, a method of further reducing the scheduling information of the short TTIs will be described. For example, the base station 100 may notify each terminal apparatus 200 of the short TTIs of RBG among 25 RBGs in one subframe using RRC signaling in advance. In addition, for example, the base station 100 may designate that the RBG is normally for the short TTIs in the system information broadcasted to the terminal apparatuses 200 rather than each terminal apparatus 200. In this way, when RBG for the short TTIs is designated in advance, 25-bit scheduling information added to designate the short TTIs is not necessary, and thus it is possible to reduce overhead of a control bit.

In the above-described method, the scheduling in the RBG unit, that is, the scheduling in the frequency direction, can be performed dynamically, that is, in a subframe unit. On the other hand, scheduling at a short TTI level in one subframe is not performed. Accordingly, when the PDCCH is assumed to occupy 3 OFDM symbols, the PDSCH is 11 OFDM symbols. Therefore, the method can be said to be a method for a case in which the 11 OFDM symbols are all used by the same terminal apparatus 200.

On the other hand, for example, even when there is data only in the first OFDM symbol among 11 OFDM symbols and there is no data in the remaining OFDM symbols (null data is put), the terminal apparatus 200 attempt to decode the short TTIs of all the OFDM symbols.

In a case in which there are 11 short TTIs in one subframe in the time direction, data for the terminal apparatus 200 is put in the first two short TTIs, and the remaining 9 short TTIs are empty, it is wasteful for the terminal apparatus 200 to decode the data of all the 11 short TTIs, and thus a power consumption amount of the terminal apparatus 200 wastefully increases.

Accordingly, for example, in a case in which it is confirmed that it is not necessary to decode the data of the short TTI after a certain OFDM symbol, the base station 100 puts information indicating that this data is end data in the subframe, inside the data of the short TTI of the OFDM symbol. FIG. 40 is an explanatory diagram illustrating data of short TTIs put only in first 2 OFDM symbols among 11 OFDM symbols. The base station 100 puts information indicating that the data is end data in the subframe inside the data of the short TTI of the second OFDM symbol. In this way, the terminal apparatus 200 may decode only the data of the first 2 short TTIs. Then, the power consumption can be confined to consumption necessary to decode the data of the short TTIs.

A method of effectively utilizing the remaining 9 OFDM symbols in a case in which the data of the short TTIs is put only in the first 2 OFDM symbols among the 11 OFDM symbols, as illustrated in FIG. 40 will be described.

Figure 41:
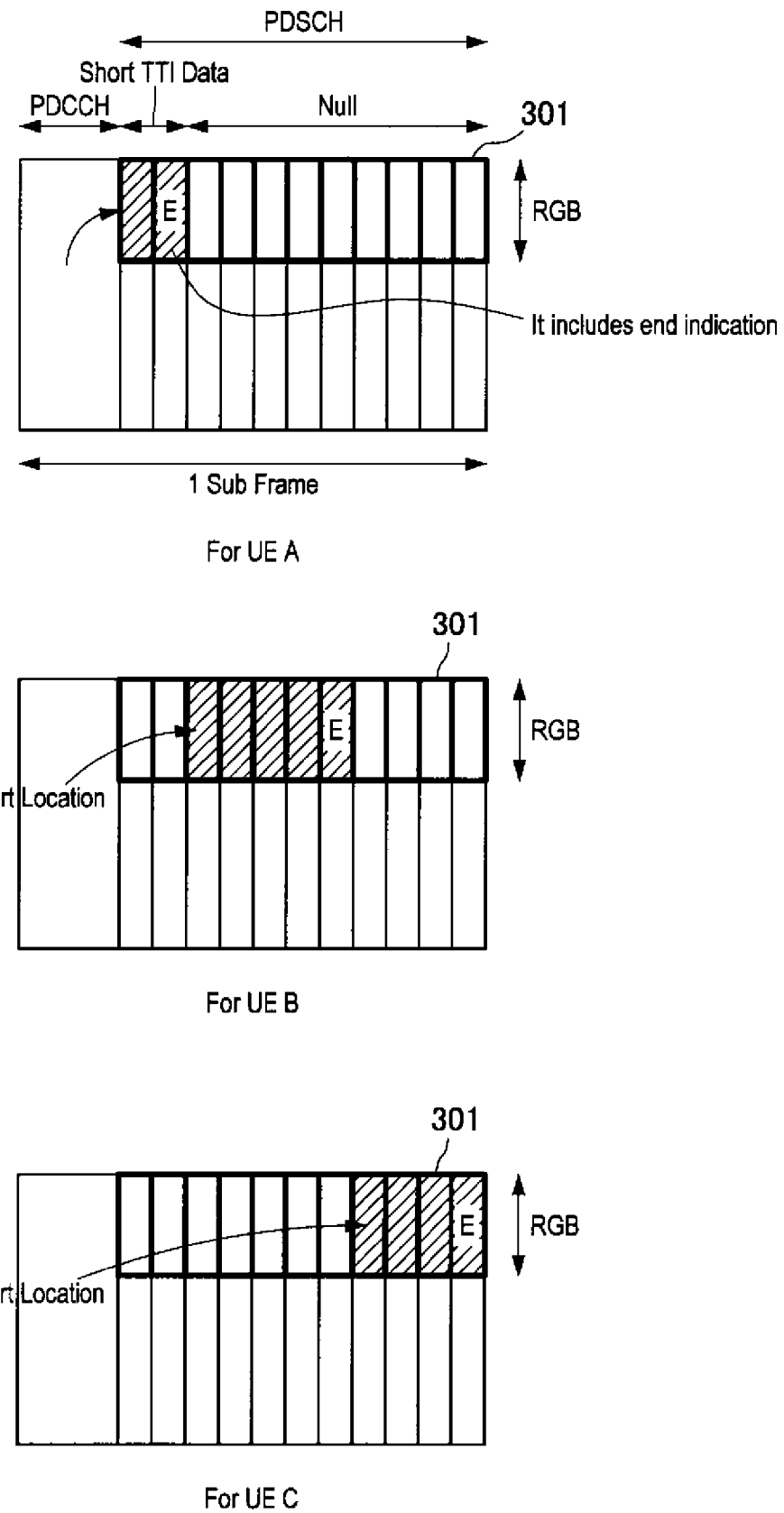
FIG. 41 is an explanatory diagram illustrating an example of a case in which each of 3 terminal apparatuses 200 decodes data of short TTIs.

FIG. 41 is an explanatory diagram illustrating an example of a case in which each of 3 terminal apparatuses 200 decodes data of short TTIs. FIG. 41 illustrates an example of a case in which the terminal apparatus 200 denoted by a UE A decodes the data of the short TTIs in the first and second OFDM symbols, the terminal apparatus 200 denoted by a UE B decodes the data of the short TTIs in the third to seventh OFDM symbols, and terminal apparatus 200 denoted by the UE B decodes the data of the short TTIs in the eighth to eleventh OFDM symbols.

In this way, in a case in which each of the plurality of terminal apparatuses 200 decodes the data of the short TTIs in one subframe, the base station 100 may include data designating a starting position and transmit the data to each terminal apparatus 200. Referring to the data transmitted from the base station 100, the UE A can know that the data destined for the self-apparatus starts from the first OFDM symbol. On the other hand, referring to the data transmitted from the base station 100, the UE B and the UE C can know that the data of the first OFDM symbol is not data destined for the self-apparatuses, and therefore do not perform decoding.

Similarly, referring to the data transmitted from the base station 100, the UE B can know that the data destined for the self-apparatus starts from the third OFDM symbol. Referring to the data transmitted from the base station 100, the UE C can know that the data destined for the self-apparatus starts from the eighth OFDM symbol. The base station 100 notifies the terminal apparatuses 200 that information indicating an ending position is directed to each terminal apparatus 200 as in the method described with reference to FIG. 40.

In the example illustrated in FIG. 41, resources of three terminal apparatuses 200 are multiplexed in one RBG without overlapping. As illustrated in FIG. 41, the resource is not wasteful at all by transmitting the data toward the three terminal apparatuses 200. Then, only a resource continuing between the starting position and the ending position is allocated to one terminal apparatus 200.

In the scheduling information necessary for DCI in the PDCCH, 25 bits are necessary for scheduling of RBG of the short TTIs in addition to 25 bits necessary for scheduling of designation of RBG of the normal TTIs, and 4 bits are necessary to indicate the beginning position of 11 short TTIs in the time direction. Therefore, 25×4=100 bits are necessary in all the 25 RBGs. Accordingly, the scheduling information has a total of 25 bits+25 bits+100 bits=150 bits.

A method of compressing the scheduling information will be described. The base station 100 can eliminate the waste of the resources and can reduce the wasteful decoding in the terminal apparatus 200 by designating the beginning position and the ending position for each RBG However, the 100-bit scheduling information is therefore added to DCI. Since an increase in the scheduling information leads to an increase in overhead caused due to the scheduling information, the scheduling information is preferably small.

For example, depending on a specification, the number of short TTIs to be permitted is limited to a maximum of 3 short TTIs for each subframe in one terminal apparatus 200. This limitation may be variable or may be fixed as a system. By limiting the number of short TTIs in this way, the terminal apparatus 200 can assume that the number of short TTIs of 1 rather than 0 is a maximum of 3 short TTIs among 25 bits of the scheduling information for the short TTIs. Then, since 4 bits×3=12 bits may be added to designate 11 short TTIs of RBG corresponding to the 3 short TTIs, the scheduling information has a total of 25 bits+25 bits+12 bits=62 bits. The 62-bit scheduling information is necessary for allocation of the scheduling addressed to one terminal apparatus 200 in DCI. Accordingly, since the number of bits can be considerably reduced from 150 bits described above, an advantageous effect contributing to the reduction in the overhead in the terminal apparatus 200 can be expected.

The data of the short TTIs is a small amount and is received intermittently by the terminal apparatus 200. Nevertheless, as described above, when the resources of the short TTIs in 1 subframe are all allocated to one terminal apparatus 200, the waste of the resources increases. Accordingly, different short TTIs in 1 subframe are preferably caused to be used by different terminal apparatuses 200.

Figure 42:
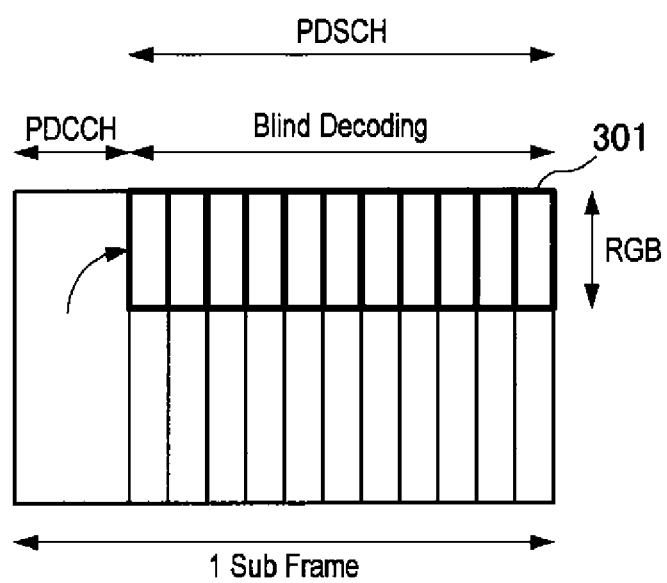
FIG. 42 is an explanatory diagram illustrating an example in which the terminal apparatus 200 decodes all 11 short TTIs.

Accordingly, after the base station 100 designates RBG in which there are 11 short TTIs, as described above, the terminal apparatus 200 decodes all the 11 short TTIs in a state in which the terminal apparatus 200 does not know which short TTI is destined for the self-apparatus among the 11 short TTIs. FIG. 42 is an explanatory diagram illustrating an example in which the terminal apparatus 200 decodes all the 11 short TTIs. This decoding method is referred to as blind decoding. Normally, the blind decoding is performed when the UE decodes DCI of the PDCCH. In this operation example, even in a case in which the terminal apparatus 200 decodes the short TTI, the blind decoding is applied.

Figure 43:
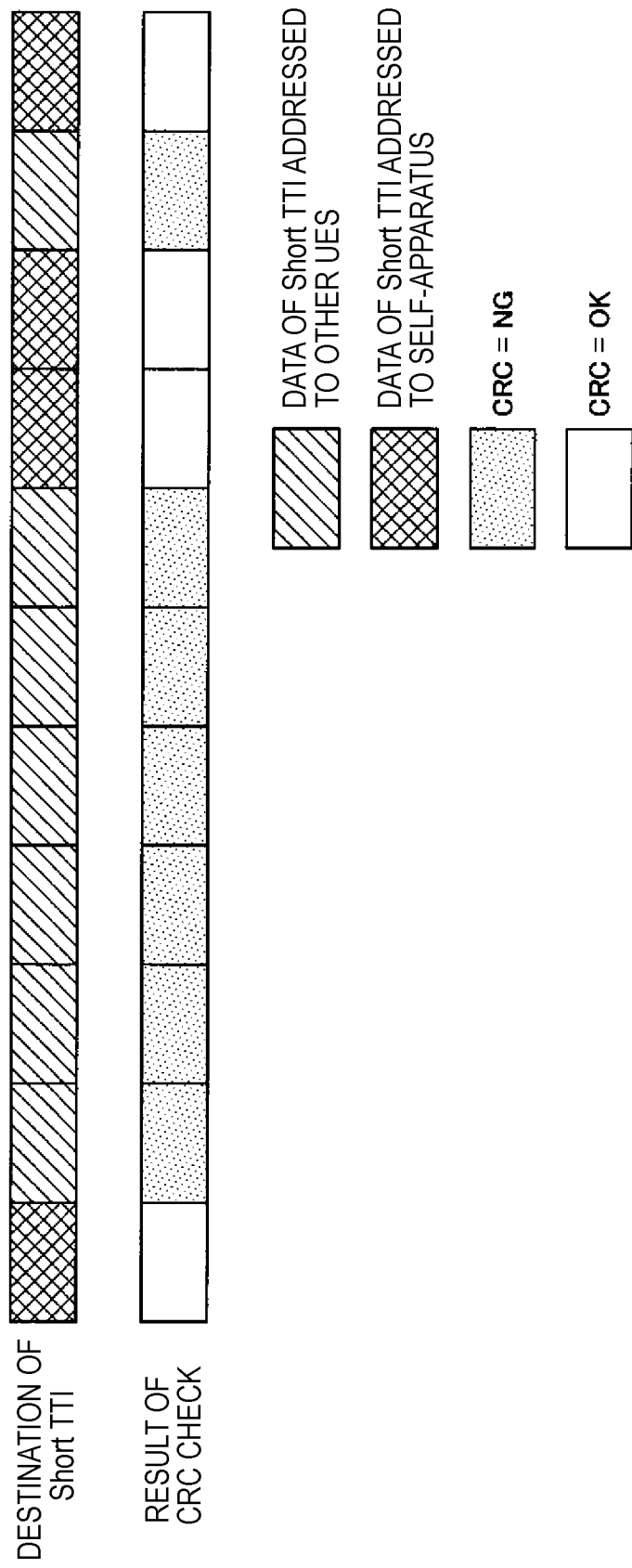
FIG. 43 is an explanatory diagram illustrating a destination of short TTIs and an example of a result of CRC check in a certain terminal apparatus 200.

FIG. 43 is an explanatory diagram illustrating a destination of short TTIs and an example of a result of CRC check in a certain terminal apparatus 200. In the example illustrated in FIG. 43, in a certain terminal apparatus 200, the number of pieces of data of the short TTI destined for the self-apparatus is 4 among 11 short TTIs. Therefore, a result of CRC check of the data is OK. Since the number of pieces of data of the short TTIs destined for the other UEs is 7, a result of CRC check of the data is NG.

As illustrated in FIG. 43, the data destined for the self-apparatus and the data destined for the other UEs can coexist in the data of the short TTIs in one subframe (of course, there is also a possibility of the data destined for the self-apparatus not existing). The base station 100 performs CRC on the data with an ID (C-RNTI or the like) unique to the terminal apparatus 200. Accordingly, except that the terminal apparatus 200 decodes the data destined for the self-apparatus, the result of CRC is not OK. Since the terminal apparatus 200 also decodes the data for other users (other terminal apparatuses 200), there are a portion on which CRC is an error and a portion on which CRC is not an error. However, the terminal apparatus 200 assumes that CRC is an error and does not respond to the base station 100 with NACK of data failure. This is because the data may be data of the other users (the other terminal apparatuses 200). When CRC is an error, the terminal apparatus 200 can take a method of returning NACK among the following three methods.

(1) First Method

The first method is a method of not returning NACK at all. The terminal apparatus 200 does not return NACK at all even when CRC is an error. In this method, the base station 100 does not ascertain whether the terminal apparatus 200 has really received the data.

(2) Second Method

The second method is a method of not returning NACK when a result of CRC is OK even in one of the resources in the designated short TTIs and returning NACK in a case in which the results of CRC are all NG In this method, the terminal apparatus 200 does not return ACK or NACK for each short TTI. However, in this method, the base station 100 can partially know whether the base station 100 can correctly transmit the data, compared to the first method.

(3) Third Method

The third method is a method of acquiring the number of pieces of data destined for the self-apparatus among 11 pieces of data of the short TTIs from the base station, for example, in a case in which there are the 11 short TTIs, and returning ACK when a designated number is the same as the number of OK results of CRC check and returning NACK when the designated number is different from the number of OK results of CRC check. This method may not be used in a case in which the terminal apparatus 200 may not acquire the number of pieces of data destined for the self-apparatus among the 11 pieces of data of the short TTIs from the base station 100 in advance. However, when the terminal apparatus 200 can acquire the number of pieces of data destined for the self-apparatus in a previous subframe in a DCI format in a subsequent subframe from the base station 100, the terminal apparatus 200 can return ACK or NACK on the basis of information regarding the number of pieces of data acquired from the base station 100.

Figure 44:
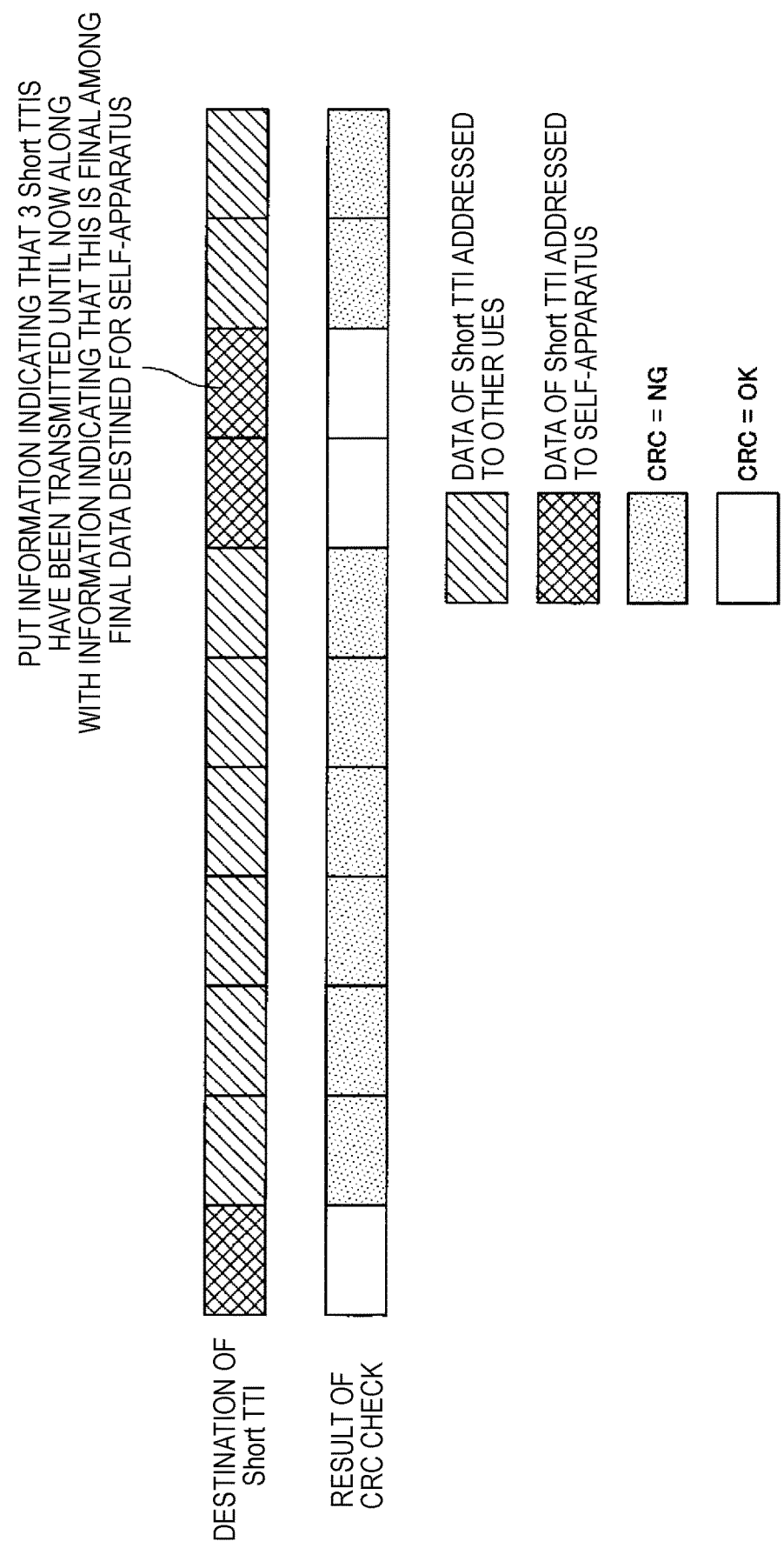
FIG. 44 is an explanatory diagram illustrating information transmitted toward the terminal apparatus 200 by the base station 100.

In addition, when the base station 100 puts information indicating that the data destined for a certain terminal apparatus 200 ends here in a subframe and information regarding the number of pieces of data transmitted toward the terminal apparatus 200 inside the subframe, the terminal apparatus 200 can know the number of pieces of data destined for the self-apparatus in the subframe. FIG. 44 is an explanatory diagram illustrating information transmitted toward the terminal apparatus 200 by the base station 100. FIG. 44 is an explanatory diagram illustrating an example in which the base station 100 puts information indicating that the data destined for a certain terminal apparatus 200 ends here in a subframe and information regarding the number of pieces of data transmitted toward the terminal apparatus 200 in the subframe. In the example illustrated in FIG. 44, for the data destined to the certain terminal apparatus 200, the base station 100 puts the information indicating that the data of the ninth short TTI from the beginning is the final in the data of the ninth short TTI from the beginning. At this time, the base station 100 puts the fact that the data of three short TTIs is transmitted to the terminal apparatus 200, in the data of the short TTI. The terminal apparatus 200 can know that the number of pieces of data destined for the self-apparatus is 3 in the subframe by confirming the information. Accordingly, each terminal apparatus 200 responds to the base station 100 with ACK when the number of OK results of the CRC check is 3, and responds to the base station 100 with NACK when the number of OK results is not 3.

Figure 45:
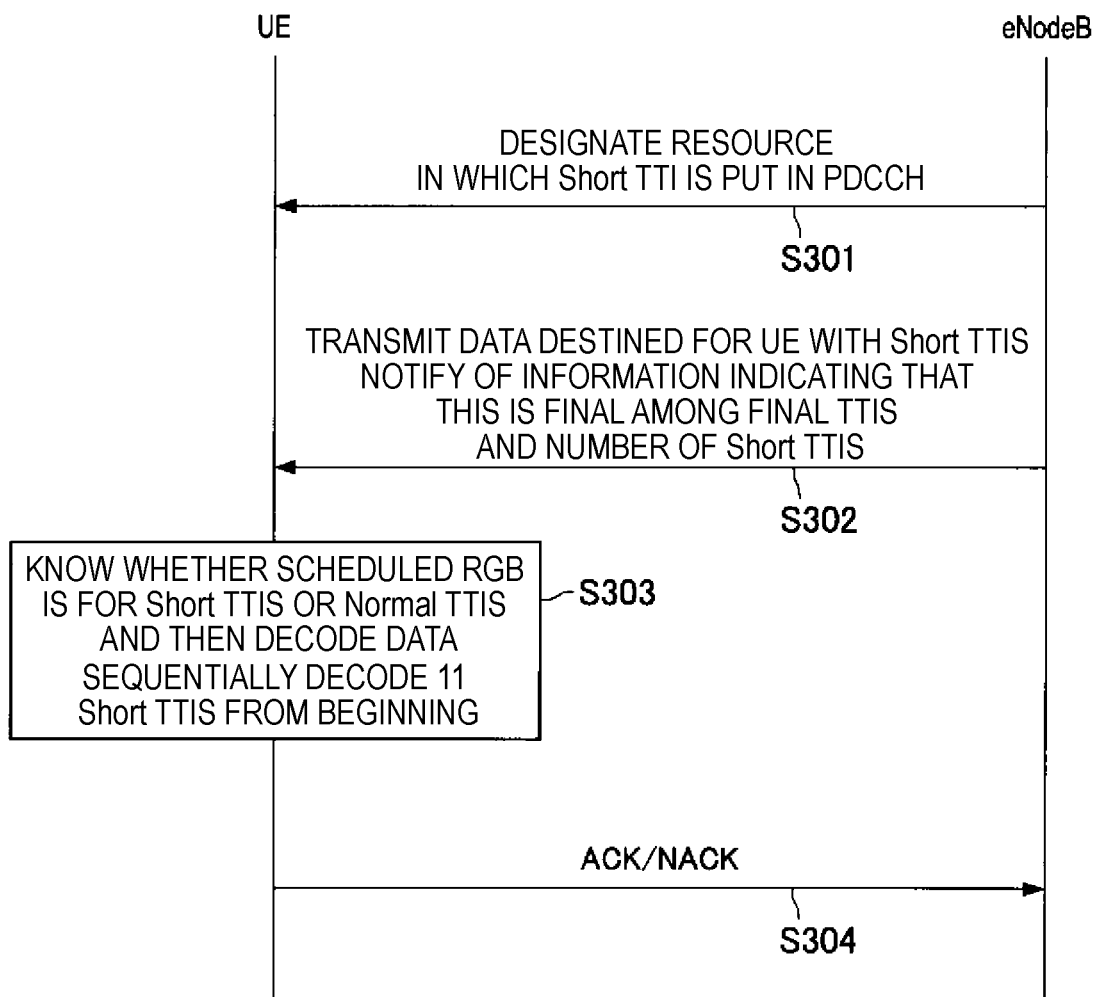
FIG. 45 is a flowchart illustrating an operation example of the base station 100 and the terminal apparatus 200 according to the embodiment.

FIG. 45 is a flowchart illustrating an operation example of the base station 100 and the terminal apparatus 200 according to the embodiment of the present disclosure. FIG. 45 illustrates an operation example of the base station 100 and the terminal apparatus 200 corresponding to the above-described third method. Hereinafter, an operation example of the base station 100 and the terminal apparatus 200 according to the embodiment of the present disclosure will be described with reference to FIG. 45.

The base station 100 designates the resource in which the data of the short TTI is put in the PDCCH of each subframe (step S311). For example, the notification unit 153 performs the process of step S311.

Subsequently, the base station 100 transmits the data destined for each terminal apparatus 200 with the short TTIs. Then, information indicating that the data of the short TTI is the final here in each subframe among the final data of the short TTI destined for a certain terminal apparatus 200 in the subframe and the information regarding the number of pieces of data transmitted toward the terminal apparatus 200 in the subframe are notified of (step S312). For example, the notification unit 153 performs the process of step S312.

The terminal apparatus 200 knows whether the scheduled RBG is for the short TTIs or the normal TTIs, and then decodes the data. Then, the terminal apparatus 200 sequentially decodes the data of the short TTIs from the beginning when the scheduled RBG is for the short TTIs (step S313). For example, the reception processing unit 243 performs the process of step S313.

Then, the terminal apparatus 200 responds to the base station 100 with ACK or NACK on the basis of the information transmitted in the foregoing step S312 from the base station 100 (step S314). For example, the notification unit 245 performs the process of step S314. Each terminal apparatus 200 responds to the base station 100 with ACK when the number of pieces of data of the short TTIs destined for the self-apparatus in the subframe is the same as the number of OK results of the CRC on the basis of the information transmitted in the foregoing step S312 from the base station 100. The terminal apparatus 200 responds to the base station 100 with NACK when the number of pieces of data of the short TTIs is different from the number of OK results.

In the third method, the degree of freedom of the scheduling is considerably high since the base station 100 can designate the resources continuously or at intervals in the frequency direction and the time direction. In addition, the number of bits necessary for allocation of the scheduling is small when the response of ACK/NACK of HARQ is not considered.

In addition, as in the above-described second method or third method, 4 bits are necessary per RBG for the base station 100 to designate the number of pieces of effective data in the case of a method of comparing the assumed number of pieces of effective data to the number of pieces of successfully received data. When a case in which 25 RBGs are occupied by the short TTIs is assumed, information regarding 100 bits is necessary for the base station 100 to designate the number of pieces of effective data. However, as described above, by limiting the number of RBGs usable with the short TTIs per subframe, it is possible to reduce the number of bits for designating the number of pieces of effective data. For example, by limiting the number of RBGs usable with the short TTIs per subframe to 3, it is possible to suppress the number of bits for designating the number of pieces of effective data to 12 bits.

As described above, in LTE of the related art, the eNodeB can allocate 25 bits to the scheduling information in a case in which the bandwidth is 20 MHz. Accordingly, resources separated at frequency can be allocated to one UE. Even in the above-described three methods of responding with ACK or NACK, the base station 100 can freely allocate 25 resources disposed in the frequency direction to each terminal apparatus 200 in a similar way.

1.4.4. Conclusion of Operation Examples

The three operations examples of the base station 100 and the terminal apparatus 200 according to the embodiment of the present disclosure have been exemplified. Note that the base station 100 and the terminal apparatus 200 according to the embodiment of the present disclosure may not independently operate the above-described three operation examples, but may operate a plurality of operation examples in combination. In addition, the base station 100 and the terminal apparatus 200 according to the embodiment of the present disclosure may combine only some of the above-described operations when the base station 100 and the terminal apparatus 200 may combine the plurality of operation examples.

For example, the base station 100 and the terminal apparatus 200 according to the embodiment of the present disclosure may combine an operation of notifying of the resources to be used to transmit and receive data in the short TTIs indicated in the first operation example and an operation at the time of preparation of the short TTIs with various levels.

2. APPLICATION EXAMPLES

The technique according to the present disclosure is applicable to various products. The base station 100 may also be implemented, for example, as any type of evolved Node B (eNB) such as macro eNBs and small eNBs. Small eNBs may cover smaller cells than the macro cells of pico eNBs, micro eNBs, home (femt) eNBs, or the like. Instead, the base station 100 may be implemented as another type of base station such as Nodes B, base transceiver stations (BTSs), or the like. The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station.

Further, for example, the terminal apparatus 200 may be implemented as a mobile terminal such as smartphones, tablet personal computers (PCs), notebook PCs, portable game terminals, portable/dongle mobile routers, and digital cameras, or an in-vehicle terminal such as car navigation apparatuses. In addition, the terminal apparatus 200 may be implemented as a machine type communication (MTC) for establishing a machine to machine communication (M2M). Furthermore, the terminal apparatus 200 may be implemented as a wireless communication module (e.g. integrated circuit module constituted with a single die) that is mounted on these terminals.

2.1. Application Examples for Base Station

First Application Example

Figure 46:
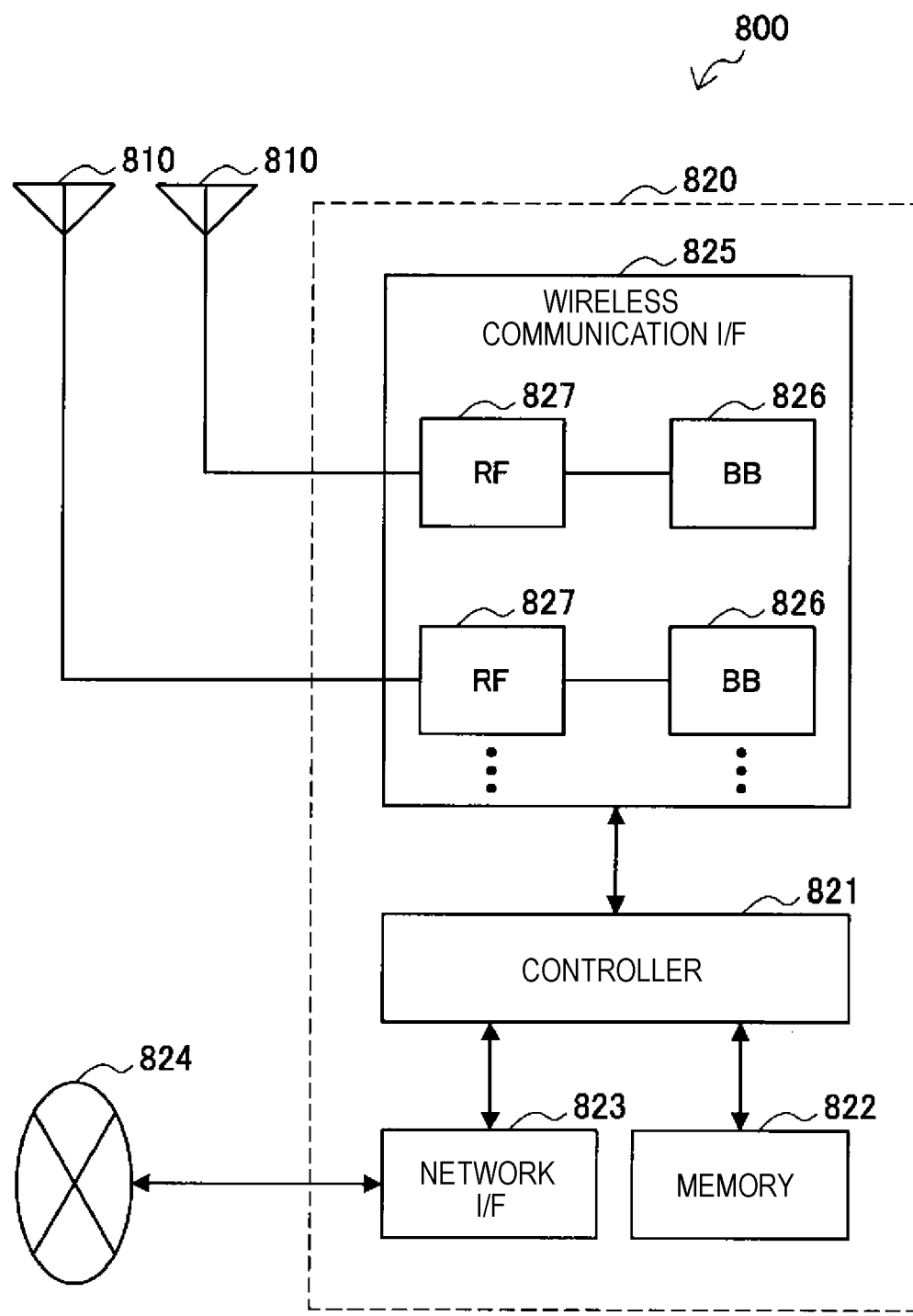
FIG. 46 is a block diagram illustrating an example of a configuration of the terminal apparatus 200 according to the embodiment.

FIG. 46 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 46, and the plurality of antennas 810 may, for example, correspond to a plurality of frequency bands used by the eNB 800. It should be noted that while FIG. 46 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. In addition, the controller 821 may also have a logical function of performing control such as radio resource control, radio bearer control, mobility management, admission control, and scheduling. The control may be performed in cooperation with a surrounding eNB or a core network. In addition, the memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. In addition, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 46, and the plurality of BB processors 826 may, for example, correspond to a plurality of frequency bands used by the eNB 800. In addition, the wireless communication interface 825 may also include a plurality of the RF circuits 827, as illustrated in FIG. 46, and the plurality of RF circuits 827 may, for example, correspond to a plurality of antenna elements. Note that, FIG. 46 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 46, one or more components included in the processing unit 150 (the transmission processing unit 151 and/or the notification unit 153) described above with reference to FIG. 7 may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and the above-described one or more components may be mounted in the module. In this case, the module may store a program causing the processor to function as the above-described one or more components (that is, a program causing the processor to perform the operation of the above-described one or more components) and execute the program. As another example, the program causing the processor to function as the above-described one or more components may be installed in the eNB 800, and the wireless communication interface 825 (for example, the BB processor 826) and/or the controller 821 may execute the program. As described above, the eNB 800, the base station apparatus 820, or the module may be provided as an apparatus including the above-described one or more components, and the program causing the processor to function as the above-described one or more components may be provided. In addition, a readable recording medium in which the program is recorded may be provided.

In addition, in the eNB 800 shown in FIG. 46, the wireless communication unit 120 described with reference to FIG. 5 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823. In addition, the storage unit 140 may be implemented by the memory 822.

Second Application Example

Figure 47:
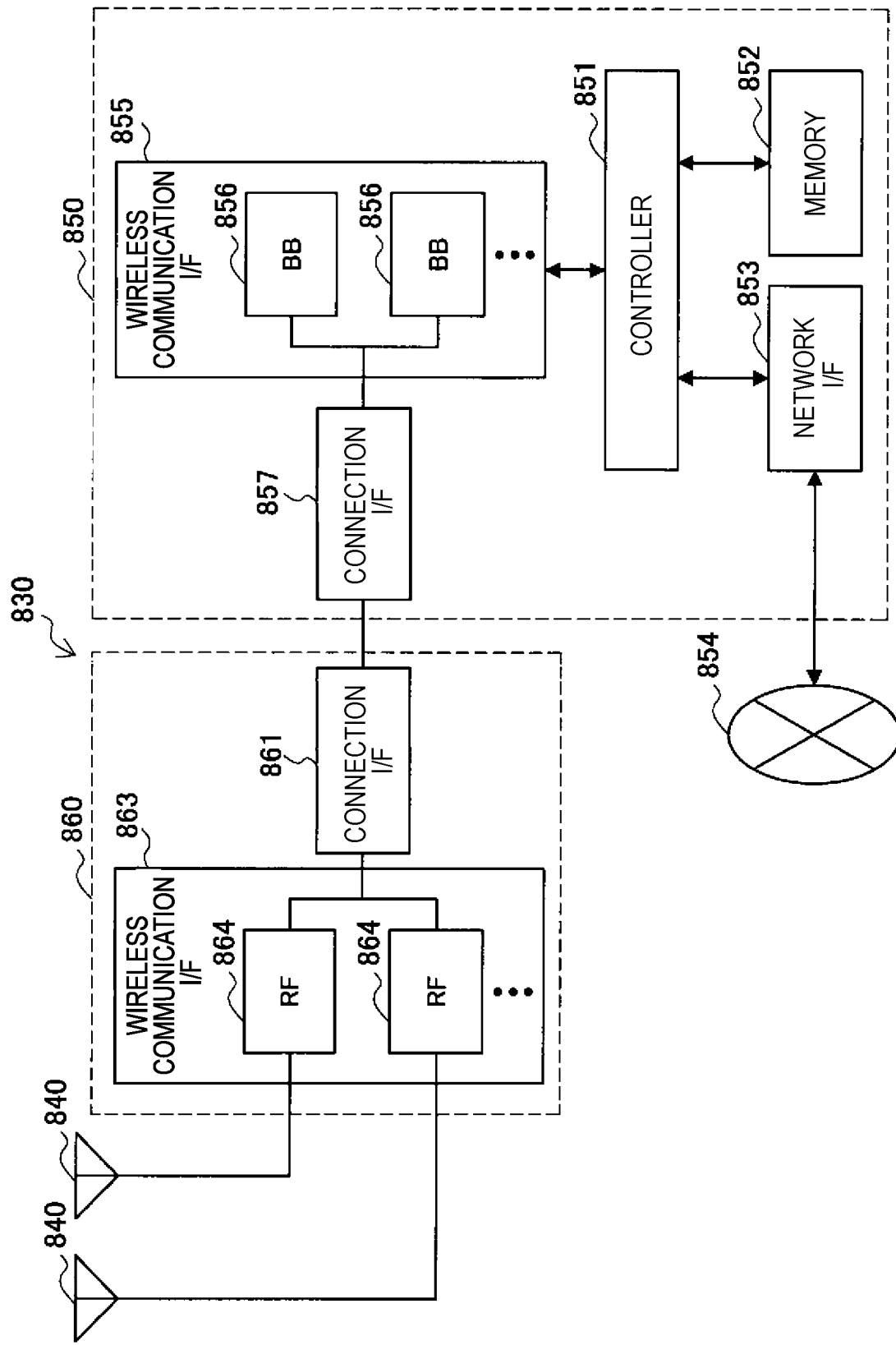
FIG. 47 is an explanatory diagram illustrating an example of a short TTI field.

FIG. 47 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. In addition, the base station apparatus 850 and the RRH 860 may be connected to each other by a high speed line such as optical fiber cables.

Each of the antennas 840 includes a single or a plurality of antenna elements (e.g. plurality of antenna elements constituting a MIMO antenna), and is used for the RRH 860 to transmit and receive a wireless signal. The eNB 830 may include a plurality of the antennas 840 as illustrated in FIG. 47, and the plurality of antennas 840 may, for example, correspond to a plurality of frequency bands used by the eNB 830. Note that, FIG. 47 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 46.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 46 except that the BB processor 856 is connected to an RF circuit 864 of the RRH 860 via the connection interface 857. The wireless communication interface 855 may include a plurality of the BB processors 856, as illustrated in FIG. 47, and the plurality of BB processors 856 may, for example, correspond to a plurality of frequency bands used by the eNB 830 respectively. Note that, FIG. 47 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 and the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 47, and the plurality of RF circuits 864 may, for example, correspond to a plurality of antenna elements. Note that, FIG. 47 illustrates an example in which the wireless communication interface 863 includes the plurality of RF circuits 864, but the wireless communication interface 863 may include the single RF circuit 864.

In the eNB 830 illustrated in FIG. 47, one or more components included in the processing unit 150 (the transmission processing unit 151 and/or the notification unit 153) described above with reference to FIG. 5 may be mounted in the wireless communication interface 855 and/or the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and the above-described one or more components may be mounted in the module. In this case, the module may store a program causing the processor to function as the above-described one or more components (that is, a program causing the processor to perform the operation of the above-described one or more components) and execute the program. As another example, the program causing the processor to function as the above-described one or more components may be installed in the eNB 830, and the wireless communication interface 855 (for example, the BB processor 856) and/or the controller 851 may execute the program. As described above, the eNB 830, the base station apparatus 850, or the module may be provided as an apparatus including the above-described one or more components, and the program causing the processor to function as the above-described one or more components may be provided. In addition, a readable recording medium in which the program is recorded may be provided.

In addition, for example, in the eNB 830 shown in FIG. 47, the wireless communication unit 120 described with reference to FIG. 5 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. In addition, the storage unit 140 may be implemented by the memory 852.

2-2. Application Examples for Terminal Apparatus

First Application Example

Figure 48:
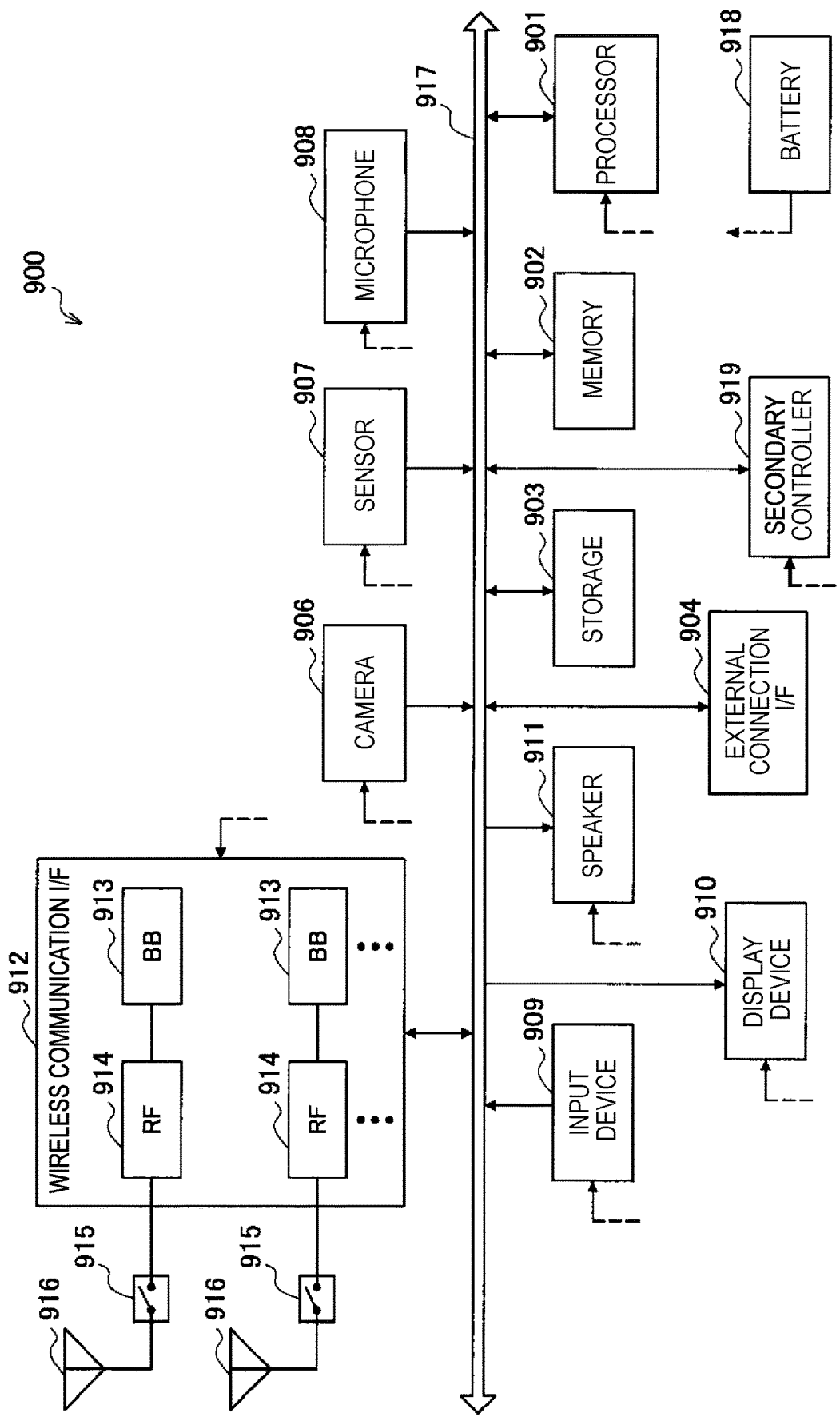
FIG. 48 is an explanatory diagram illustrating an example of a short TTI field.

FIG. 48 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor, and the like. The microphone 908 converts a sound that is input into the smartphone 900 to an audio signal. The input device 909 includes, for example, a touch sensor which detects that a screen of the display device 910 is touched, a key pad, a keyboard, a button, a switch, or the like, and accepts an operation or an information input from a user. For example, the display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 48. Note that, FIG. 48 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 48. Note that, FIG. 48 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 48 via a feeder line that is partially illustrated in the figure as a dashed line. The secondary controller 919, for example, operates a minimally necessary function of the smartphone 900 in a sleep mode.

In the smartphone 900 illustrated in FIG. 48, one or more components included in the processing unit 240 (the acquisition unit 241 and/or the reception processing unit 243) described above with reference to FIG. 8 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the above-described one or more components may be mounted in the module. In this case, the module may store a program causing the processor to function as the above-described one or more components (that is, a program causing the processor to perform the operation of the above-described one or more components) and execute the program. As another example, the program causing the processor to function as the above-described one or more components may be installed in the smartphone 900, and the wireless communication interface 912 (for example, the BB processor 913), the processor 901, and/or the secondary controller 919 may execute the program. As described above, the smartphone 900 or the module may be provided as an apparatus including the above-described one or more components, and the program causing the processor to function as the above-described one or more components may be provided. In addition, a readable recording medium in which the program is recorded may be provided.

In addition, for example, in the smartphone 900 shown in FIG. 48, the wireless communication unit 220 described with reference to FIG. 6 may be implemented by the wireless communication interface 912 (for example, the RF circuit 914). Moreover, the antenna unit 210 may be implemented by the antenna 916. In addition, the storage unit 230 may be implemented by the memory 902.

Second Application Example

Figure 49:
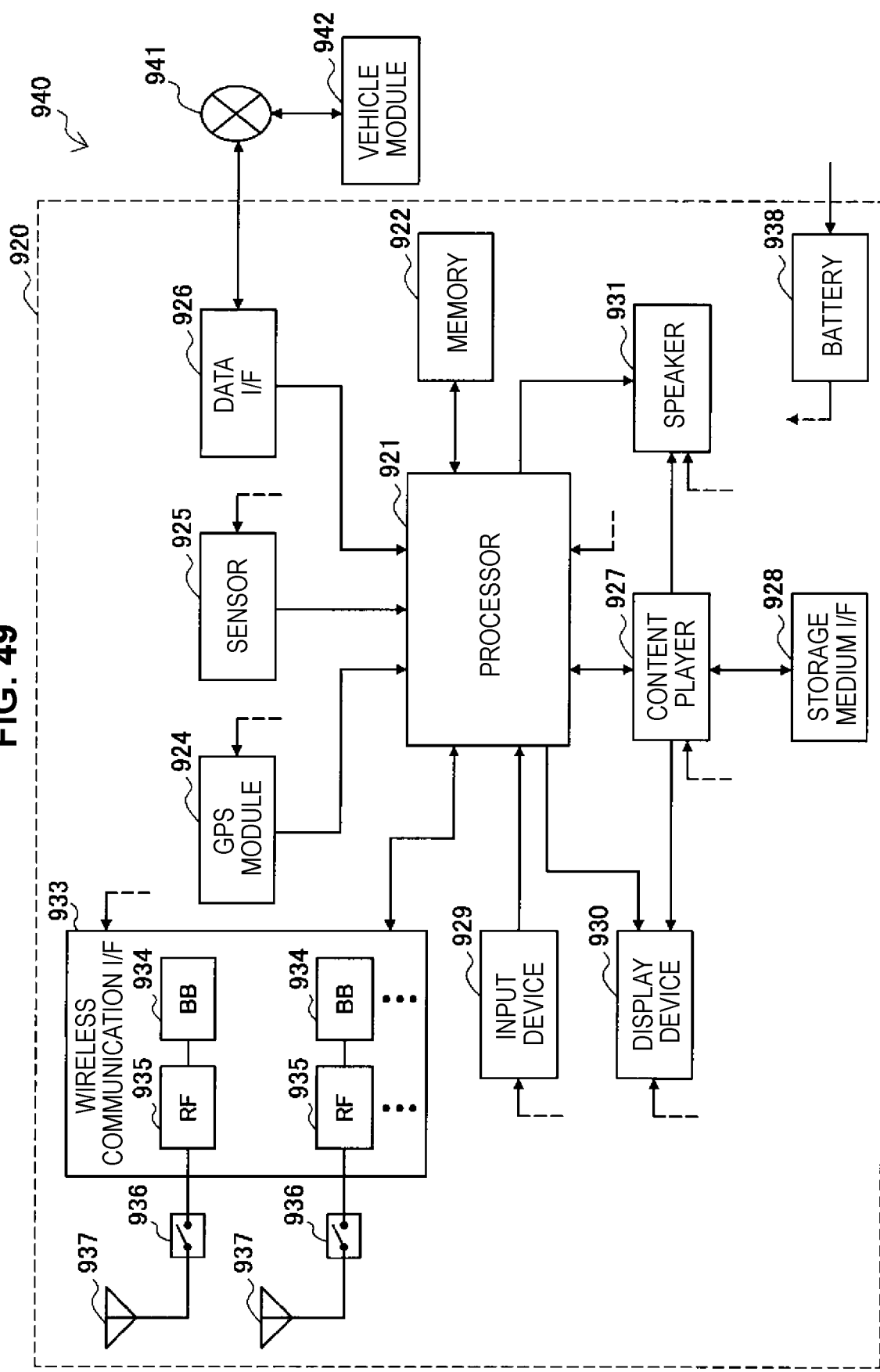
FIG. 49 is an explanatory diagram illustrating an example of a short TTI field.

FIG. 49 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, a barometric sensor, and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, a switch, or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 49. Note that, FIG. 49 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 49. Note that, FIG. 49 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 950 supplies electric power to each block of the car navigation apparatus 920 illustrated in FIG. 49 via a feeder line that is partially illustrated in the figure as a dashed line. In addition, the battery 950 accumulates the electric power supplied from the vehicle.

In the car navigation apparatus 920 illustrated in FIG. 49, one or more components included in the processing unit 240 (the acquisition unit 241 and/or the reception processing unit 243) described above with reference to FIG. 6 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and the above-described one or more components may be mounted in the module. In this case, the module may store a program causing the processor to function as the above-described one or more components (that is, a program causing the processor to perform the operation of the above-described one or more components) and execute the program. As another example, the program causing the processor to function as the above-described one or more components may be installed in the car navigation apparatus 920, and the wireless communication interface 933 (for example, the BB processor 934) and/or the processor 921 may execute the program. As described above, the car navigation apparatus 920 or the module may be provided as an apparatus including the above-described one or more components, and the program causing the processor to function as the above-described one or more components may be provided. In addition, a readable recording medium in which the program is recorded may be provided.

In addition, for example, in the car navigation apparatus 920 shown in FIG. 49, the wireless communication unit 220 described with reference to FIG. 6 may be implemented by the wireless communication interface 933 (for example, the RF circuit 935). Moreover, the antenna unit 210 may be implemented by the antenna 937. In addition, the storage unit 230 may be implemented by the memory 922.

In addition, the technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as a device which includes the acquisition unit 241 and/or the reception processing unit 243. The vehicle module 942 generates vehicle data such as vehicle speed, engine speed, and trouble information, and outputs the generated data to the in-vehicle network 941.

3. CONCLUSION

The embodiment of the present disclosure, as described above, provides the base station 100 that notifies the terminal apparatuses of a location where data is in resources at the short transmission time interval in the case in which transmission and reception of data at the short transmission time interval are caused to coexist with transmission and reception of data at the existing transmission time interval.

In addition, the embodiment of the present disclosure provides the terminal apparatus 200 which the base station 100 notifies of the location where the data is in the resources at the short transmission time interval in the case in which transmission and reception of data at the short transmission time interval are caused to coexist with transmission and reception of data at the existing transmission time interval.

The base station 100 according to the embodiment of the present disclosure notifies the terminal apparatus 200 of the location where the data is in the resources at the short transmission time interval so that the terminal apparatus 200 can perform the efficient reception process, in the case in which transmission and reception of data at the short transmission time interval are caused to coexist with transmission and reception of data at the existing transmission time interval. In addition, the terminal apparatus 200 according to the embodiment of the present disclosure is notified of the location where the data is in the resources at the short transmission time interval by the base station 100, in the case in which transmission and reception of data at the short transmission time interval are caused to coexist with transmission and reception of data at the existing transmission time interval, and thus the effective reception process can be performed.

According to the embodiment of the present disclosure, the base station 100 can control an application mounted on the terminal apparatus 200 in a low latency and in a good response by notifying the terminal apparatus 200 of the location where the data is in the resources at the short transmission time interval. In addition, according to the embodiment of the present disclosure, when the base station 100 notifies of the location of the data at the short transmission time interval, the terminal apparatus 200 can quickly return ACK or NACK to the base station 100. Accordingly, according to the embodiment of the present disclosure, an improvement in throughput is prospected. In particular, according to the embodiment of the present disclosure, since the base station 100 can effectively cause the resource of the short transmission time interval and the resource at the existing transmission time interval to coexist, the resources are not wasteful and an improvement in throughput can be expected.

The embodiment of the present disclosure provides the base station 100 causes the terminal apparatus to be able to transmit and receive data in accordance with an optimum length of the short transmission time interval in the terminal apparatus among a plurality of lengths of short transmission time interval at the time of transmission and reception of data at the short transmission time interval shorter than the existing transmission time interval.

The embodiment of the present disclosure provides the terminal apparatus 200 capable of transmitting and receiving data in accordance with an optimum length of the short transmission time interval in the terminal apparatus among a plurality of lengths of short transmission time interval at the time of transmission and reception of data at the short transmission time interval shorter than the existing transmission time interval.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A wireless communication apparatus including:

a notification unit configured to notify of a short transmission time field in which data is transmitted at a short transmission time interval which is a transmission time interval shorter than one subframe period in a subframe, and notify of information regarding the short transmission time interval for another communication apparatus in a control field transmitted in units of subframes.

(2)

The wireless communication apparatus according to (1), in which the notification unit notifies of existence of a plurality of the short transmission time fields in one subframe.

(3)

The wireless communication apparatus according to (1) or (2), in which the notification unit notifies of presence or absence of data of the short transmission time interval in the short transmission time field in the control field.

(4)

The wireless communication apparatus according to (3), in which the notification unit notifies of the short transmission time field in a semi-static manner and dynamically notifies of the presence or absence of data of the short transmission time interval.

(5)

The wireless communication apparatus according to any one of (1) to (4), in which the notification unit notifies the other communication apparatus of a location of data of the short transmission time interval in the short transmission time field in the control field.

(6)

The wireless communication apparatus according to any one of (1) to (5), in which the notification unit notifies of information regarding the short transmission time interval in another subsequent subframe in the control field.

(7)

The wireless communication apparatus according to any one of (1) to (5), in which the notification unit notifies of information regarding the short transmission time interval in the same subframe in the control field.

(8)

The wireless communication apparatus according to any one of (1) to (7), in which the control field is a physical downlink control channel (PDCCH).

(9)

A wireless communication apparatus including:

a reception unit configured to receive a short transmission time field in which data is transmitted at a short transmission time interval which is a transmission time interval shorter than one subframe period in a subframe, and receive information regarding the short transmission time interval from another communication apparatus in a control field transmitted in units of subframes.

(10)

The wireless communication apparatus according to (9), in which the reception unit receives presence or absence of data of the short transmission time interval in the short transmission time field in the control field.

(11)

The wireless communication apparatus according to (9), in which the control field is a physical downlink control channel (PDCCH).

(12)

A wireless communication method including:

notifying of a short transmission time field in which data is transmitted at a short transmission time interval which is a transmission time interval shorter than one subframe period in a subframe; and notifying of information regarding the short transmission time interval for another communication apparatus in a control field transmitted in units of subframes.

(13)

A wireless communication method including:

receiving a short transmission time field in which data is transmitted at a short transmission time interval which is a transmission time interval shorter than one subframe period in a subframe; and receiving information regarding the short transmission time interval from another communication apparatus in a control field transmitted in units of subframes.

(14)

A computer program causing a computer to execute:

notifying of a short transmission time field in which data is transmitted at a short transmission time interval which is a transmission time interval shorter than one subframe period in a subframe; and notifying of information regarding the short transmission time interval for another communication apparatus in a control field transmitted in units of subframes.

(15)

A computer program causing a computer to execute:

receiving a short transmission time field in which data is transmitted at a short transmission time interval which is a transmission time interval shorter than one subframe period in a subframe; and receiving information regarding the short transmission time interval from another communication apparatus in a control field transmitted in units of subframes.

(16)

A wireless communication system including:

a first communication apparatus; and a second communication apparatus, in which the first communication apparatus includes a notification unit configured to notify of a short transmission time field in which data is transmitted at a short transmission time interval which is a transmission time interval shorter than one subframe period in a subframe, and notify of information regarding the short transmission time interval for the second communication apparatus in a control field transmitted in units of subframes, and the second communication apparatus includes a reception unit configured to receive a short transmission time field in which data is transmitted at the short transmission time interval, and receive information regarding the short transmission time interval from the first communication apparatus in a control field transmitted in units of subframes.

REFERENCE SIGNS LIST 1 system
100 base station
200 terminal apparatus

The invention claimed is:

1. A wireless communication apparatus comprising:
circuitry configured to:
notify in a semi-static manner of a short transmission time field in which data is capable of being transmitted at a short transmission time interval which is a transmission time interval shorter than one subframe period in a subframe,
dynamically set whether the data of the short transmission time interval is actually transmitted in the short transmission time field,
dynamically notify that the short transmission time field will be transmitted in the short transmission time interval,
notify of information regarding the short transmission time interval for another communication apparatus in a control field transmitted in units of subframes, and
notify of a presence or an absence of data of a subsequent short transmission time interval in the short transmission time field in the control field, wherein the presence or the absence of data relate to the subsequent short transmission time interval in a subsequent subframe.

2. The wireless communication apparatus according to claim 1,
wherein the circuitry is further configured to notify of existence of a plurality of the short transmission time fields in one subframe.

3. The wireless communication apparatus according to claim 1, wherein the circuitry is further configured to notify of presence or absence of data of the short transmission time interval in the short transmission time field in the control field.

4. The wireless communication apparatus according to claim 3,
wherein the circuitry is further configured to notify of the presence or absence of data of the short transmission time interval.

5. The wireless communication apparatus according to claim 1, wherein the circuitry is further configured to notify the other communication apparatus of a location of data of the short transmission time interval in the short transmission time field in the control field.

6. The wireless communication apparatus according to claim 1,
wherein the circuitry is further configured to notify of information regarding the short transmission time interval in another subsequent subframe in the control field.

7. The wireless communication apparatus according to claim 1,
wherein the circuitry is further configured to notify of information regarding the short transmission time interval in the same subframe in the control field.

8. The wireless communication apparatus according to claim 1,
wherein the control field is a physical downlink control channel (PDCCH).

9. The wireless communication apparatus according to claim 1,
wherein the information regarding the short transmission time interval comprises a location of a resource to be received in the short transmission time interval.

10. The wireless communication apparatus according to claim 1,
wherein the circuitry is further configured to transmit the data in the short transmission time interval.

11. The wireless communication apparatus according to claim 10,
wherein the circuitry is further configured to receive an acknowledgement that the data transmitted in the short transmission time interval was received.

12. A wireless communication apparatus, wherein circuitry is configured to receive in a semi-static manner a first notification of a short transmission time field in which data is capable of being transmitted at a short transmission time interval which is a transmission time interval shorter than one subframe period in a subframe, dynamically receive a second notification that the short transmission time field will be transmitted in the short transmission time interval, receive information regarding the short transmission time interval from another communication apparatus in a control field transmitted in units of subframes, and receive a notification of a presence or an absence of data of a subsequent short transmission time interval in the short transmission time field in the control field, wherein the presence or the absence of data relate to the subsequent short transmission time interval in a subsequent subframe, wherein the another communication apparatus dynamically sets whether the data of the short transmission time interval is actually transmitted in the short transmission time field.

13. The wireless communication apparatus according to claim 12,
wherein the circuitry is further configured to receive presence or absence of data of the short transmission time interval in the short transmission time field in the control field.

14. The wireless communication apparatus according to claim 12,
wherein the control field is a physical downlink control channel (PDCCH).

15. A wireless communication method comprising:
notifying in a semi-static manner of a short transmission time field in which data is capable of being transmitted at a short transmission time interval which is a transmission time interval shorter than one subframe period in a subframe;
dynamically setting whether the data of the short transmission time interval is actually transmitted in the short transmission time field,
dynamically notifying that the short transmission time field will be transmitted in the short transmission time interval,
notifying of information regarding the short transmission time interval for another communication apparatus in a control field transmitted in units of subframes, and
notifying of a presence or an absence of data of a subsequent short transmission time interval in the short transmission time field in the control field, wherein the presence or the absence of data relate to the subsequent short transmission time interval in a subsequent subframe.

16. A wireless communication method comprising:
receiving in a semi-static manner a first notification of a short transmission time field in which data is transmitted at a short transmission time interval which is a transmission time interval shorter than one subframe period in a subframe;
dynamically receiving a second notification that the short transmission time field will be transmitted in the short transmission time interval;
receiving information regarding the short transmission time interval from another communication apparatus in a control field transmitted in units of subframes; and
receiving a notification of a presence or an absence of data of a subsequent short transmission time interval in the short transmission time field in the control field, wherein the presence or the absence of data relate to the subsequent short transmission time interval in a subsequent subframe,
wherein the another communication apparatus dynamically sets whether the data of the short transmission time interval is actually transmitted in the short transmission time field.

17. A non-transitory computer readable medium storing a computer program for causing a computer to execute:
notifying in a semi-static manner of a short transmission time field in which data is capable of being transmitted at a short transmission time interval which is a transmission time interval shorter than one subframe period in a subframe;
dynamically setting whether the data of the short transmission time interval is actually transmitted in the short transmission time field,
dynamically notifying that the short transmission time field will be transmitted in the short transmission time interval,
notifying of information regarding the short transmission time interval for another communication apparatus in a control field transmitted in units of subframes, and notifying of a presence or an absence of data of a subsequent short transmission time interval in the short transmission time field in the control field, wherein the presence or the absence of data relate to the subsequent short transmission time interval in a subsequent subframe.

18. A non-transitory computer readable medium storing a computer program for causing a computer to execute:
receiving in a semi-static manner a first notification of a short transmission time field in which data is transmitted at a short transmission time interval which is a transmission time interval shorter than one subframe period in a subframe;
dynamically receiving a second notification that the short transmission time field will be transmitted in the short transmission time interval,
receiving information regarding the short transmission time interval from another communication apparatus in a control field transmitted in units of subframes, and
receiving a notification of a presence or an absence of data of a subsequent short transmission time interval in the short transmission time field in the control field, wherein the presence or the absence of data relate to the subsequent short transmission time interval in a subsequent subframe,
wherein the another communication apparatus dynamically sets whether the data of the short transmission time interval is actually transmitted in the short transmission time field.

19. A wireless communication system comprising:
a first communication apparatus; and
a second communication apparatus;
wherein the first communication apparatus includes circuitry configured to
notify in a semi-static manner of a short transmission time field in which data is capable of being transmitted at a short transmission time interval which is a transmission time interval shorter than one subframe period in a subframe, and notify of information regarding the short transmission time interval for the second communication apparatus in a control field transmitted in units of subframes,
dynamically set whether the data of the short transmission time interval is actually transmitted in the short transmission time field,
dynamically notify that the short transmission time field will be transmitted in the short transmission time interval, and
notify of a presence or an absence of data of a subsequent short transmission time interval in the short transmission time field in the control field, wherein the presence or the absence of data relate to the subsequent short transmission time interval in a subsequent subframe, and
the second communication apparatus includes second circuitry configured to
receive the short transmission time field in which data is transmitted at the short transmission time interval, and receive information regarding the short transmission time interval from the first communication apparatus in a control field transmitted in units of subframes.

* * * * *